United States Patent
Hayes, Jr.

(10) Patent No.: US 11,540,340 B2
(45) Date of Patent: *Dec. 27, 2022

(54) SYSTEM AND METHOD FOR ANALYZING MESSAGES AND INITIATING COMMUNICATION SESSIONS

(71) Applicant: LIVEPERSON AUTOMOTIVE, LLC, Alpharetta, GA (US)

(72) Inventor: Marc F. Hayes, Jr., Roswell, GA (US)

(73) Assignee: LIVEPERSON AUTOMOTIVE, LLC, New York, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/000,951

(22) Filed: Aug. 24, 2020

(65) Prior Publication Data
US 2021/0045172 A1    Feb. 11, 2021

Related U.S. Application Data

(63) Continuation of application No. 16/453,342, filed on Jun. 26, 2019, now Pat. No. 10,791,585, which is a
(Continued)

(51) Int. Cl.
*H04W 76/14*   (2018.01)
*H04W 8/00*    (2009.01)
(Continued)

(52) U.S. Cl.
CPC ............ *H04W 76/14* (2018.02); *G06Q 30/02* (2013.01); *G06Q 30/0242* (2013.01);
(Continued)

(58) Field of Classification Search
None
See application file for complete search history.

(56) References Cited

U.S. PATENT DOCUMENTS 5,663,808 A     9/1997 Park
6,223,165 B1    4/2001 Lauffer
(Continued)

OTHER PUBLICATIONS

Non-Final Office Action dated Jan. 5, 2015 for U.S. Appl. No. 13/754,142, 11 pages.
(Continued)

*Primary Examiner* — Michael J Moore, Jr.
*Assistant Examiner* — Gautam Sharma
(74) *Attorney, Agent, or Firm* — Polsinelli LLP

(57) ABSTRACT

Systems and methods are described herein for analyzing messages and other information provided in relation to a web communication, a mobile application communication session, a phone communication, or another type of communication. For example, a system and method are provided for initiating a text message communication session between an agent and a user. A two-way communication session may be facilitated between the user and the agent. A mobile telephone number disclosed by the user during the two-way communication session may be detected, and a text message communication session between the user and the agent may be initiated if a mobile telephone number was detected. Availability status associated with a provider of items or services may also be analyzed to determine an agent for communicating with the user.

18 Claims, 45 Drawing Sheets

Related U.S. Application Data continuation of application No. 16/018,718, filed on Jun. 26, 2018, now Pat. No. 10,383,162, which is a continuation of application No. 15/392,481, filed on Dec. 28, 2016, now Pat. No. 10,034,319, which is a continuation of application No. 14/948,017, filed on Nov. 20, 2015, now Pat. No. 9,572,189, which is a continuation-in-part of application No. 13/754,179, filed on Jan. 30, 2013, now abandoned, and a continuation-in-part of application No. 13/754,209, filed on Jan. 30, 2013, now abandoned, and a continuation-in-part of application No. 13/754,142, filed on Jan. 30, 2013, now abandoned, said application No. 13/754,179 is a continuation-in-part of application No. 11/409,279, filed on Apr. 20, 2006, now Pat. No. 8,386,320, said application No. 13/754,209 is a continuation-in-part of application No. 11/409,279, filed on Apr. 20, 2006, now Pat. No. 8,386,320, said application No. 13/754,179 is a continuation-in-part of application No. 11/408,864, filed on Apr. 20, 2006, now Pat. No. 8,374,915, said application No. 13/754,142 is a continuation-in-part of application No. 11/409,279, filed on Apr. 20, 2006, now Pat. No. 8,386,320, and a continuation-in-part of application No. 11/408,864, filed on Apr. 20, 2006, now Pat. No. 8,374,915, said application No. 13/754,209 is a continuation-in-part of application No. 11/408,864, filed on Apr. 20, 2006, now Pat. No. 8,374,915.

(60) Provisional application No. 60/713,394, filed on Sep. 1, 2005, provisional application No. 60/673,143, filed on Apr. 20, 2005.

(51) Int. Cl.
*H04W 4/14* (2009.01)
*H04L 51/043* (2022.01)
*G06Q 30/02* (2012.01)
*H04L 51/58* (2022.01)

(52) U.S. Cl.
CPC ..... *G06Q 30/0253* (2013.01); *G06Q 30/0256* (2013.01); *G06Q 30/0267* (2013.01); *G06Q 30/0276* (2013.01); *H04L 51/043* (2013.01); *H04L 51/58* (2022.05); *H04W 4/14* (2013.01); *H04W 8/005* (2013.01)

(56) References Cited

U.S. PATENT DOCUMENTS

| | | |
|---|---|---|
| 6,909,708 B1 | 6/2005 | Krishnaswamy |
| 6,925,444 B1 | 8/2005 | McCollom et al. |
| 7,263,526 B1 | 8/2007 | Busey et al. |
| 7,526,438 B1 | 4/2009 | Harper et al. |
| 7,580,850 B2 | 8/2009 | Lurie |
| 8,249,920 B2 | 8/2012 | Smith |
| 8,341,018 B2 | 12/2012 | Malik et al. |
| 8,374,915 B2 | 2/2013 | Hayes, Jr. et al. |
| 8,386,320 B2 | 2/2013 | Hayes, Jr. et al. |
| 9,572,189 B2 * | 2/2017 | Hayes, Jr. ............. H04W 8/005 |
| 10,034,319 B2 | 7/2018 | Hayes, Jr. |
| 10,383,162 B2 | 8/2019 | Hayes, Jr. |
| 10,791,585 B2 | 9/2020 | Hayes, Jr. |
| 2001/0040942 A1 * | 11/2001 | Glowny ............ H04M 3/42221 |
| 2001/0054004 A1 | 12/2001 | Powers |
| 2001/0056473 A1 * | 12/2001 | Arneson ............. G06F 16/9574 709/217 |
| 2002/0010757 A1 | 1/2002 | Granik et al. |
| 2003/0126205 A1 * | 7/2003 | Lurie ................... G06Q 10/109 709/204 |
| 2003/0191689 A1 | 10/2003 | Bosarge et al. |
| 2004/0044558 A1 * | 3/2004 | Ohwa ................ G06Q 30/0277 358/1.15 |
| 2004/0162778 A1 * | 8/2004 | Kramer ................ G06Q 20/102 705/40 |
| 2004/0162882 A1 * | 8/2004 | Mora .................... H04L 69/329 709/207 |
| 2005/0027711 A1 * | 2/2005 | Krokosz ............ G06F 16/24557 |
| 2005/0065837 A1 * | 3/2005 | Kosiba ............... G06Q 30/0202 705/7.31 |
| 2005/0091111 A1 * | 4/2005 | Green ..................... G06Q 30/02 705/14.59 |
| 2006/0026067 A1 * | 2/2006 | Nicholas ............ G06Q 30/0261 705/14.58 |
| 2006/0106711 A1 * | 5/2006 | Melideo ............. G06Q 30/0273 705/37 |
| 2006/0178943 A1 * | 8/2006 | Rollinson .......... G06Q 30/0601 705/26.1 |
| 2007/0077949 A1 | 4/2007 | Henderson et al. |
| 2007/0136140 A1 | 6/2007 | Smith |
| 2007/0150344 A1 | 6/2007 | Sobotka et al. |
| 2010/0076837 A1 | 3/2010 | Hayes, Jr |
| 2012/0047011 A1 | 2/2012 | Rippetoe et al. |
| 2012/0066044 A1 | 3/2012 | Honnef et al. |
| 2013/0254036 A1 | 9/2013 | Trinh et al. |
| 2014/0012661 A1 | 1/2014 | Hayes |
| 2014/0012678 A1 | 1/2014 | Hayes, Jr. |
| 2014/0046768 A1 | 2/2014 | Hayes |
| 2016/0198509 A1 | 7/2016 | Hayes, Jr. |

OTHER PUBLICATIONS

Non-Final Office Action dated Jan. 30, 2015 for U.S. Appl. No. 13/754,179, 15 pages.
Non-Final Office Action dated Jan. 5, 2015 for U.S. Appl. No. 13/754,209, 11 pages.
Final Office Action dated Aug. 25, 2015 for U.S. Appl. No. 13/754,142, 16 pages.
Final Office Action dated Aug. 21, 2015 for U.S. Appl. No. 13/754,209, 19 pages.
Final Office Action dated Sep. 2, 2015 for U.S. Appl. No. 13/754,179, 16 pages.
Pre-Interview First Office Action dated Jun. 7, 2016 for U.S. Appl. No. 14/948,017; 17 pages.
Notice of Allowance dated Sep. 28, 2016 for U.S. Appl. No. 14/948,017; 7 pages.
Notice of Allowance dated Mar. 26, 2018 for U.S. Appl. No. 15/392,481; 8 pages.
Notice of Allowance dated Mar. 29, 2019 for U.S. Appl. No. 16/018,718; 8 pages.
Notice of Allowance dated May 26, 2020 for U.S. Appl. No. 16/453,342; 9 pages.

* cited by examiner

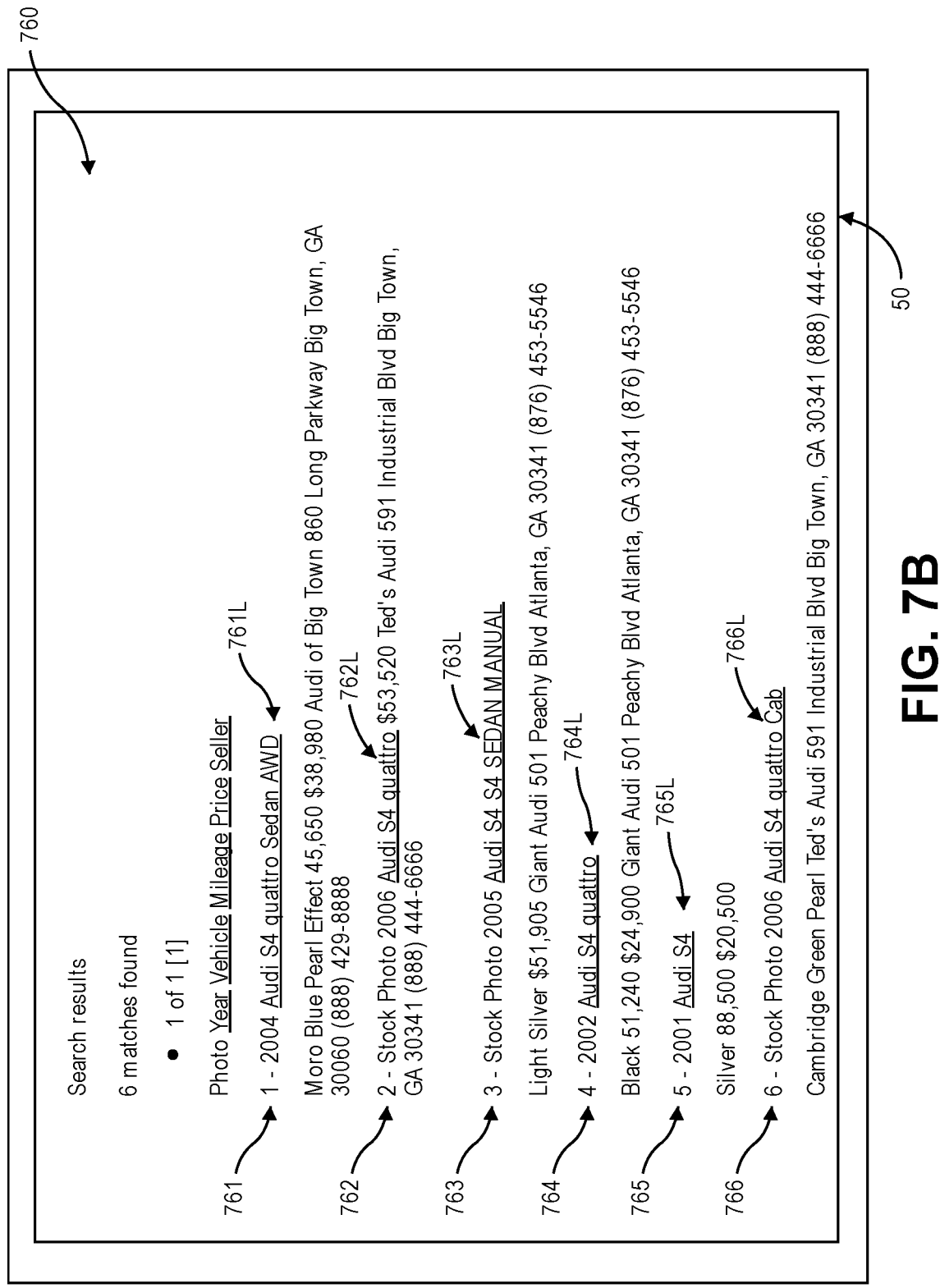

```
<a
onclick="javascript:window.open('http://applications.contac
tatonce.com/caoclientcontainer.aspx?ProviderId=261&Merchant
Id=219&PlacementId=1&Location=Tallahassee&PriceRangeLow=$75
0&PriceRangeHigh=$1000&
OriginationUrl='+encodeURIComponent(location.href), '','resi
zable=yes,toolbar=no, menubar=no, location=no, scroolbars=no, s
tatus=no, height=400, width=600');return false;"
  href="#"><img
src="http://applications.contactatonce.com/getagentstatusim
age.aspx?ProviderId=261&MerchantId=219&PlacementId=1"
border="0" onerror="this.height=0;this.width=0;"/></a>
```

*Sample Integration Markup for Instant Messaging*

FIG. 9D

```
<a href="#"
onclick="javascript:window.open('http://applications.contac
tatonce.com/emailclientcontainer.aspx?ProviderId=261&Mercha
ntId=219&PlacementId=1&Location=Tallahasse&OriginationUrl='
+encodeURIComponent(location.href),'','resizable=yes,toolba
r=no,menubar=no,location=no,scrollbars=no,status=no,height=
750,width=775,top=100');return false;">
<img src="/images/email.gif" class="contact_button"
border="0"/></a>
```

*Sample Integration Markup for Instant Messaging*

FIG. 9E

```
<a href="#"
onclick="javascript:window.open('http://applications.contac
tatonce.com/calloutclientcontainer.aspx?ProviderId=261&Merc
hantId=219&PlacementId=1&Location=Tallahasse&OriginationUrl
=;+encodeURIComponent(location.href),'','resizable=yes,tool
bar=no,menubar=no,location=no,scrollbars=no,status=no,heigh
t=325,width=525,top=100');return false;">
<img src="/images/click_to_call.gif" class="contact_button"
border="0"/></a>
```

Sample Integration Markup for Instant Messaging

FIG. 9F

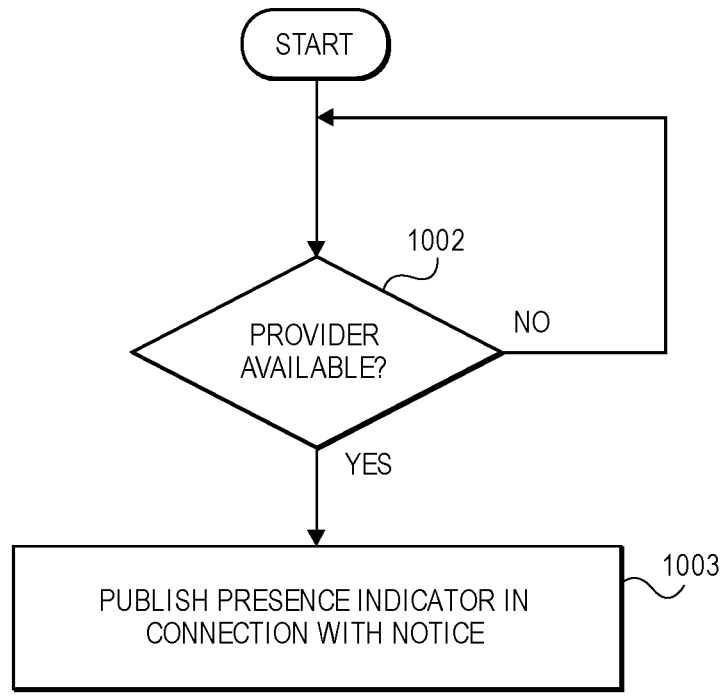

FIG. 10

Vehicle Details

Back to Search Results | New Search | Print this page

2004 Audi S4 quattro Sedan AWD

Click on photo to enlarge.

Price: $38,980

Mileage: 45,650

VIN: WAUPL68E44A202670  Stock #: UUT26431

Engine: 4.2L 8 cyl Fuel Injection

Features:
- Interior Color: Black ; Exterior Color: Moro Blue Pearl Effect
- 6 Speed Transmission ; Air Bag

Comments:
This 2004 Audi S4 4dr quattro Sedan AWD features a 4.2L V8 DOHC 40V 8cyl Gasoline engine. It is equipped with a 6 speed manual transmission. The vehicle is Moro Blue Pearl Effect with a Black Leather interior. It is offered with the remaining factory warranty. Contact Bob Smith for more information. Phone: 800-123-1234 or Email: gogo@cars-cars.com; 180 Main Parkway Marietta, GA 30060

Contact Dealer

FIG. 11E

SYSTEM AND METHOD FOR ANALYZING MESSAGES AND INITIATING COMMUNICATION SESSIONS

CROSS-REFERENCE TO RELATED APPLICATIONS

This application is a continuation of U.S. application Ser. No. 16/453,342, filed Jun. 26, 2019, which is a continuation of U.S. application Ser. No. 16/018,718, filed Jun. 26, 2018, which is a continuation of U.S. application Ser. No. 15/392,481, filed Dec. 28, 2016, which is a continuation of U.S. application Ser. No. 14/948,017, filed Nov. 20, 2015, which is a continuation-in-part of U.S. application Ser. No. 13/754,142, filed on Jan. 30, 2013, which is a continuation-in part of U.S. application Ser. No. 11/409,279, filed on Apr. 20, 2006 and which is also a continuation-in-part of U.S. application Ser. No. 11/408,864, filed on Apr. 20, 2006. U.S. application Ser. No. 14/948,017, filed Nov. 20, 2015 is also a continuation-in-part of U.S. application Ser. No. 13/754,179, filed on Jan. 30, 2013, which is a continuation-in part of U.S. application Ser. No. 11/409,279, filed on Apr. 20, 2006 and which is also a continuation-in-part of U.S. application Ser. No. 11/408,864, filed on Apr. 20, 2006. U.S. application Ser. No. 14/948,017 is also a continuation-in-part of U.S. application Ser. No. 13/754,209, filed on Jan. 30, 2013, which is a continuation-in part of U.S. application Ser. No. 11/409,279, filed on Apr. 20, 2006 and which is also a continuation-in-part of U.S. application Ser. No. 11/408,864, filed on Apr. 20, 2006. U.S. application Ser. No. 11/409,279, filed Apr. 20, 2006, and U.S. application Ser. No. 11/408,864, filed Apr. 20, 2006, each claim priority under 35 U.S.C. § 119(e) to U.S. Provisional Application No. 60/673,143, filed Apr. 20, 2005 and to U.S. Provisional Patent Application No. 60/713,394, filed Sep. 1, 2005. The subject matter of each of the foregoing patent applications is incorporated herein by reference in its entirety for all purposes.

TECHNICAL FIELD

The present application is generally related to demand based messaging by analyzing message communications. More particularly, the present application is directed to a system and method of analyzing messages to determine when to initiate a communication session for demand based messaging.

BACKGROUND

Messages and other information transmitted using web or on-line communications, mobile application communications, phone communications, or another type of communication carry various types of information. For example, as users participate in a communication session, large amounts of data are transmitted among devices involved in the communication session.

BRIEF SUMMARY

Systems and methods are described herein for providing demand based messaging by analyzing messages and other information provided in relation to a web communication, a mobile application communication session, a phone communication, or another type of communication. For example, a system and method are provided for initiating a text message communication session between an agent and a user. A two-way communication session may be facilitated between the user and the agent. A mobile telephone number disclosed by the user during the two-way communication session may be detected, and a text message communication session between the user and the agent may be initiated if a mobile telephone number was detected. Availability status associated with a provider of items or services may also be analyzed to determine an agent for communicating with the user.

In another example, a system and method are provided for initiating a text message communication session between an agent and a user. A telephone call may be received from a calling device associated with the user. The calling number may be identified, and at least one agent may be identified to handle the telephone call. A text message communication session between the calling device and the agent may be initiated if the calling device is determined to be a mobile device. Availability status associated with a provider of items or services may also be analyzed to determine an agent for communicating with the user.

In yet another example, a system and method are provided for initiating a text message communication session between an agent and a user. A notice may be transmitted to a mobile device associated with the user. A signal may be received from the mobile device indicating that the user has activated a displayed link associated with the notice. The signal may also include contextual information associated with the user's use of the mobile device. A text message communication session may be initiated between the mobile device and an agent. A text message alert may be provided to the agent with the contextual information associated with the user. Availability status associated with a provider of items or services may also be analyzed to determine an agent for communicating with the user.

Other systems, methods, features, and advantages of the present application will be or become apparent to one with skill in the art upon examination of the following drawings and detailed description. It is intended that all such additional systems, methods, features, and advantages be included within this description, be within the scope of the present application, and be protected by the accompanying claims.

BRIEF DESCRIPTION OF THE DRAWINGS

The application can be better understood with reference to the following drawings. The components in the drawings are not necessarily to scale, emphasis instead being placed upon clearly illustrating the principles of the present application. Moreover, in the drawings, like reference numerals designate corresponding parts throughout the several views.

FIG. 7A-FIG. 7C are diagrams depicting a system and method for publication of notices.

FIG. 9A-FIG. 9F are diagrams depicting an embodiment of the application wherein a user can request a real time 2-way communication with a provider via active links published in conjunction with a notice.

FIG. 10 is a diagram showing a flowchart generally depicting details of publishing a presence indicator based upon the availability of a provider.

FIG. 11A-FIG. 11F are diagrams depicting a process of receiving a request for and initiating a 2-way real time communications session with a user.

DETAILED DESCRIPTION

Figure 1:
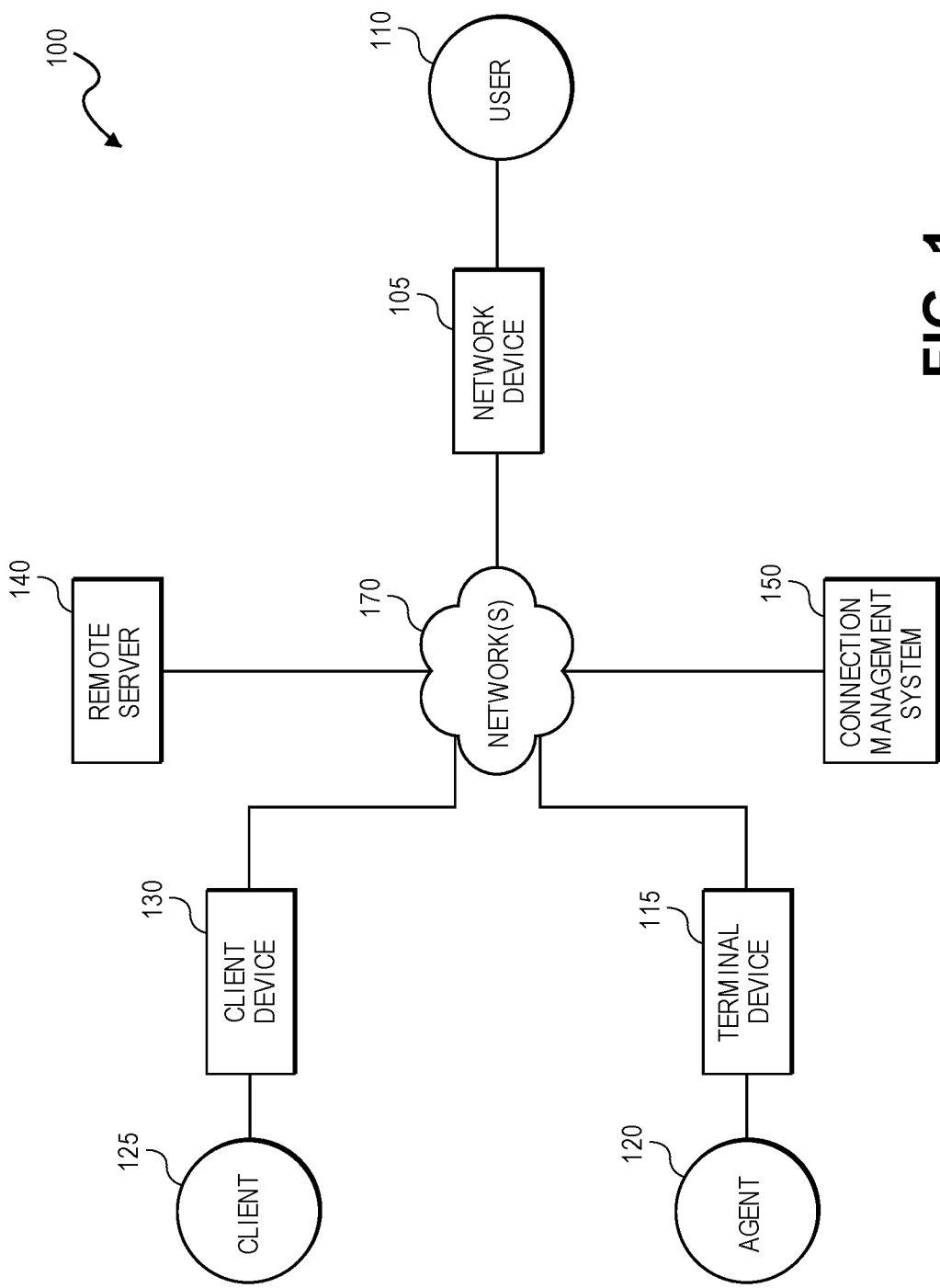
FIG. 1 shows a block diagram of an embodiment of a network interaction system.

In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Certain aspects and features of the present disclosure are related to systems and methods for analyzing communications and initiating communication sessions over the Internet, mobile application platforms, and over other suitable communications networks. For example, a messages exchanged during a two-way communication session can be analyzed to determine whether a telephone number is associated with a mobile device. An option can then be provided (e.g., to a device of an agent, provider proxy, or other party) to initiate a text message communication (e.g., a short messaging service (SMS) text message, or other suitable text message communication). In another example, when a telephone call is received, a calling number (of a calling device) and a called number (e.g., of a device of an agent or provider proxy, or other party) are identified. It can be determined whether the calling number belongs to a mobile device. An option can then be provided (e.g., to a device of an agent or provider proxy, or other party) to initiate a text message communication (e.g., a short messaging service (SMS) text message, or other suitable text message communication). In yet another example, a communication including a notice can be sent to a mobile device for display and can include a link that is selectable to initiate a text message communication. Context information can be obtained when the link is selected to provide relevant information to a recipient of the text message communication (e.g., a device of an agent or provider proxy, or other party).

Availability status data of an agent can also be analyzed and used in certain embodiments. In one embodiment, a method (and a corresponding system and computer-program product) includes accessing availability status data associated with a plurality of providers. Agents are associated with the plurality of providers, and the availability status data includes information indicating an availability status of the agents to participate in a communication session. The method further includes obtaining availability status data associated with a provider from the plurality of providers. One or more agents are associated with the provider, and the availability status data includes information indicating an availability status of the one or more agents to participate in a communication session. The method further includes using the availability status data associated with the provider to determine that an agent associated with the provider is available to participate in the communication session. The agent determined to be available is associated with a device. The method includes facilitating a two-way communication session between the device associated with the agent and a user device, and analyzing one or more messages exchanged during the two-way communication session. In some examples, the analyzing is performed using pattern recognition. The method further includes detecting a telephone number from the one or more messages exchanged during the two-way communication session. In some examples, the telephone number is detected from the one or more messages using the pattern recognition. The method includes determining that the telephone number is a mobile telephone number associated with a mobile device, and providing an alert when the telephone number is a mobile telephone number. The alert includes an option to initiate a mobile text message communication session between the device associated with the agent and the mobile device associated with the mobile telephone number.

In another embodiment, a method (and a corresponding system and computer-program product) includes receiving, on a computing device, a telephone call, and identifying a calling number and a called number associated with the telephone call. The calling number is associated with a calling device making the telephone call. The method further includes using the called number to determine a provider from a plurality of providers. One or more agents are associated with the provider, and an agent is associated with a device. The method includes accessing availability status data associated with the plurality of providers. Agents are associated with the plurality of providers, and availability status data includes information indicating an availability status of the agents to participate in a communication session. The method includes obtaining availability status data associated with the determined provider. The availability status data includes information indicating an availability status of the one or more agents to participate in a communication session with the calling device. The availability status data associated with the determined provider is used to determine that an agent associated with the determined provider is available to participate in a communication session. The calling number is used to determine whether the calling device is a mobile device, and an alert is provided when the calling device is determined to be a mobile device. The alert includes an option to initiate a mobile text message communication session between a device associated with the available agent and the calling device.

In yet another embodiment, a method (and a corresponding system and computer-program product) includes accessing availability status data associated with a plurality of providers. Agents are associated with the plurality of providers, and availability status data includes information indicating an availability status of the agents to participate in a communication session. The method further includes obtaining availability status data associated with a provider from the plurality of providers. One or more agents are associated with the provider, and the availability status data includes information indicating an availability status of the one or more agents to participate in a communication session with a mobile device. The method includes using the availability status data associated with the provider to determine that an agent associated with the provider is available to participate in the communication session. The agent determined to be available is associated with a device. The method further includes transmitting a notice including a link. When the notice is received by the mobile device, the link is selectable to initiate a text message communication between the mobile device and the device associated with the agent. An electronic notification is received when the link is selected. The electronic notification includes contextual information that includes search information associated with the mobile device and at least one or more of a provider identifier or a notice identifier. The method includes storing the contextual information in a context data store, and receiving the text message communication. The text message communication includes at least one or more of the provider identifier or the notice identifier. The method includes searching the context data store for the contextual information associated with the mobile device. The searching is performed using at least one or more of the provider identifier or the notice identifier. The contextual information is obtained from the context data store, and a text message alert is provided including the search information associated with the mobile device. When the text message alert is received at the device associated with the agent, the text message alert facilitates communication between the agent and the mobile device.

These illustrative examples are given to generally introduce aspects and features of the subject matter discussed herein, and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). An agent may also be referred to herein as a provider proxy. In certain embodiments, the network interaction system 100 can include a client device 130 associated with a client 125.

In certain embodiments, a user 110 can be an individual exploring a site or page or accessing a service provided by a remote server 140. A client 125 can be an entity that provides, operates, or runs the site or the service, or individuals employed by or assigned by such an entity to perform the tasks available to a client 125 as described herein. The agent 120 can be an individual, such as a support agent or associate tasked with providing support or information to the user 110 regarding the site or service (e.g., information about items available at an online venue). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual searching from a personal computing device, a client 125 can be a company that offers published items, and an agent 120 can be an associate employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication. This determination may depend, at least in part, on a topic associated with the communication, a sentiment score associated with the communication or a past related communication, a predicted (e.g., relative or absolute) response latency for terminal device 115 and/or a type of communication channel associated with the communication (e.g., instant message, message, email, phone). Selecting an established communication channel may promote consistency and reduce the need to relay information from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's knowledge base corresponds to a communication topic, an availability of an agent at a given time and/or over a channel type, a language match between a user and agent, and/or a personality analysis.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining and assessing one or more categories or tags of a current or past communication or communication series. For example, a communication can be assigned a category for each of (for example) a topic, channel type (e.g., email, SMS message, real-time chat, phone call or asynchronous message), language, complexity level, sentiment, and/or whether/which file type is attached, and a terminal-device selection can be biased towards terminal devices associated with similar, same or complementary knowledge bases, channel-type availability, language, skill level, sentiment, and/or file-type capabilities. Availability status data of an agent can also be analyzed to determine an appropriate terminal device (as discussed in detail with respect to at least FIG. 8A-FIG. 13C). The communication analysis can include determining and applying a rule to the communication received from a device or application in order to influence routing determinations.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a selectable link or hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item, connection management system 150 can automatically transmit an additional message to terminal device 115 containing additional information about the item (e.g., quantity of items in stock, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, topic and/or skill matching, or other suitable rules. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

In some examples, connection management system 150 can facilitate an initial match and routing between network device 105 and a first terminal device 115. For example, a message received in a communication from network device 105 can be routed to the first terminal device 115. As another example, communication management system 150 can transmit a communication to the first terminal device that includes or is indicative of a request or instruction to transmit a communication (e.g., initiating a communication session) to network device 105.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
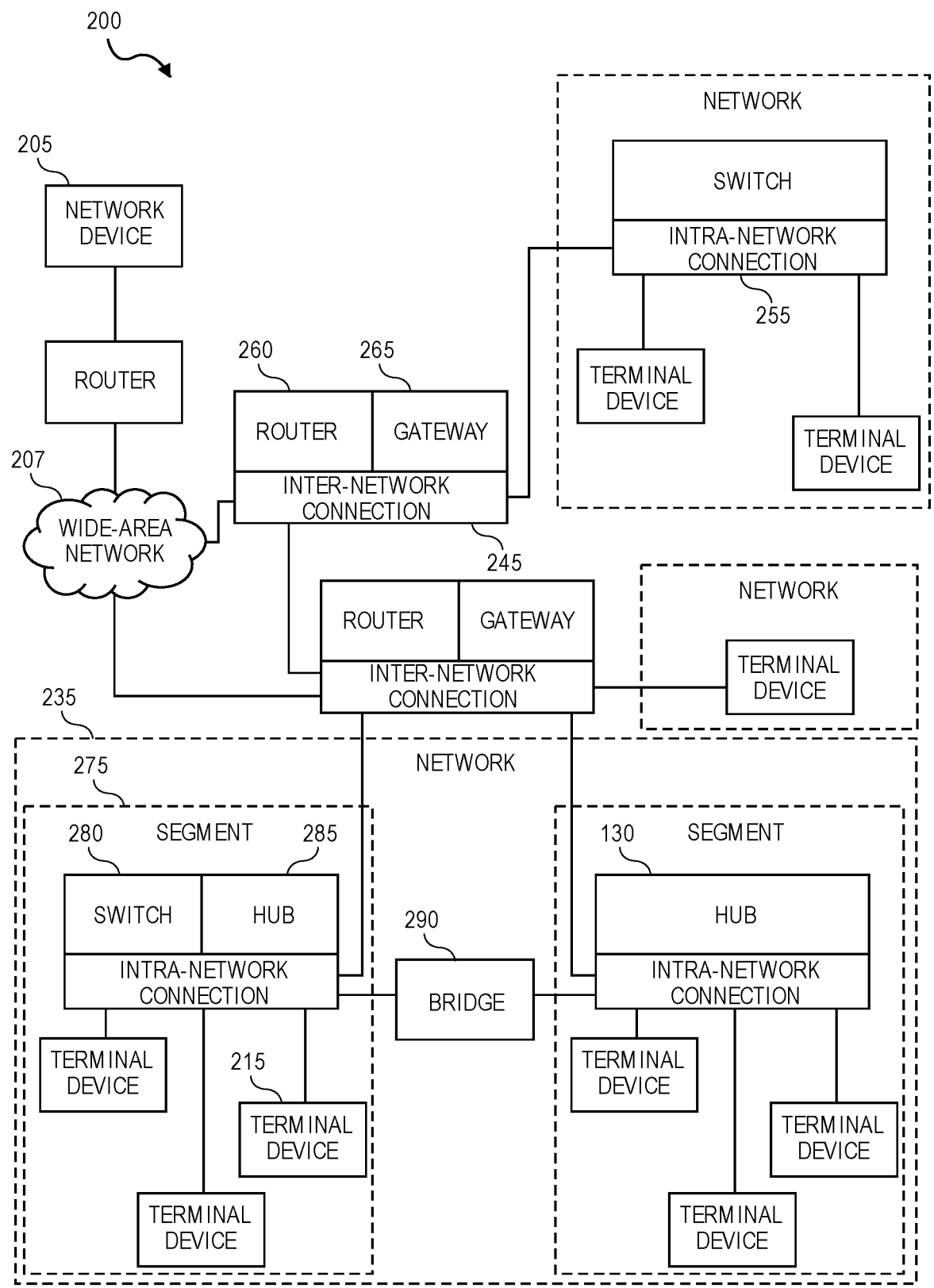
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore).

However, in some instances, it is not immediately apparent which terminal device (or even which network) is to participate in a communication from a network device.

To illustrate, a set of terminal devices may be configured so as to provide similar types of responsive communications. Thus, it may be expected that an inquiry in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
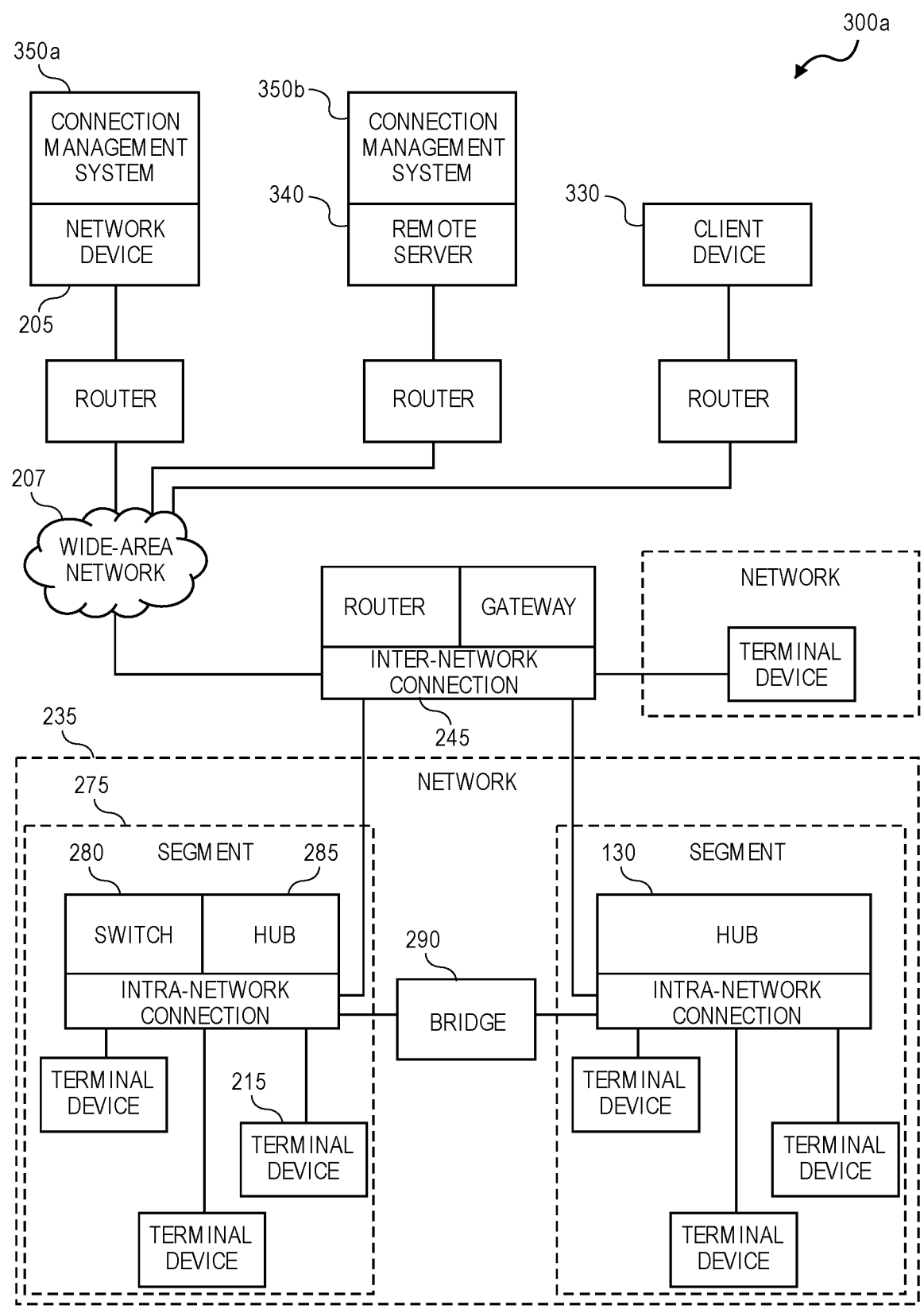
FIG. 3A-FIG. 3C show block diagrams of other embodiments of a network interaction system that includes a connection management system.
Figure 3B:
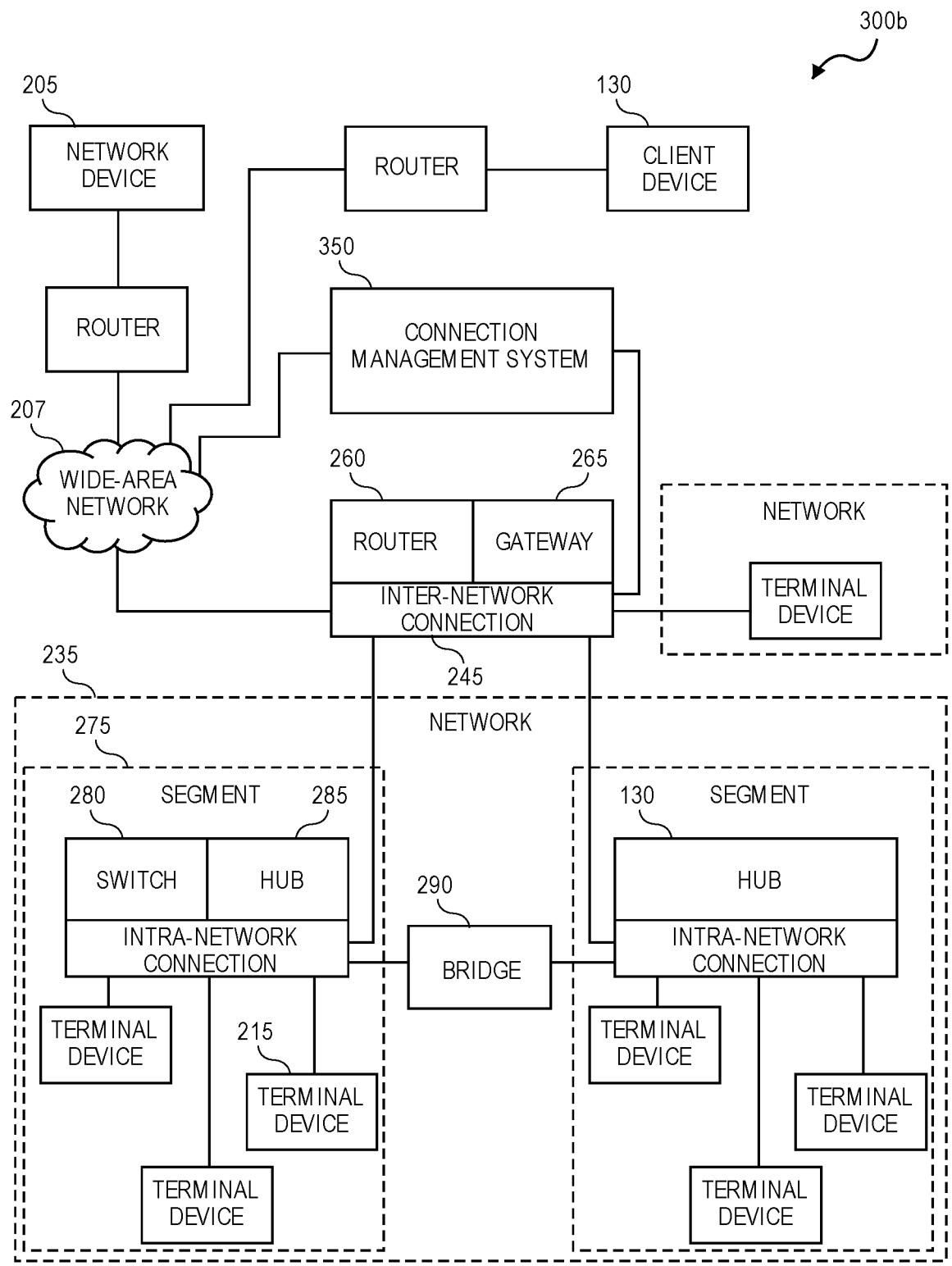
Figure 3C:
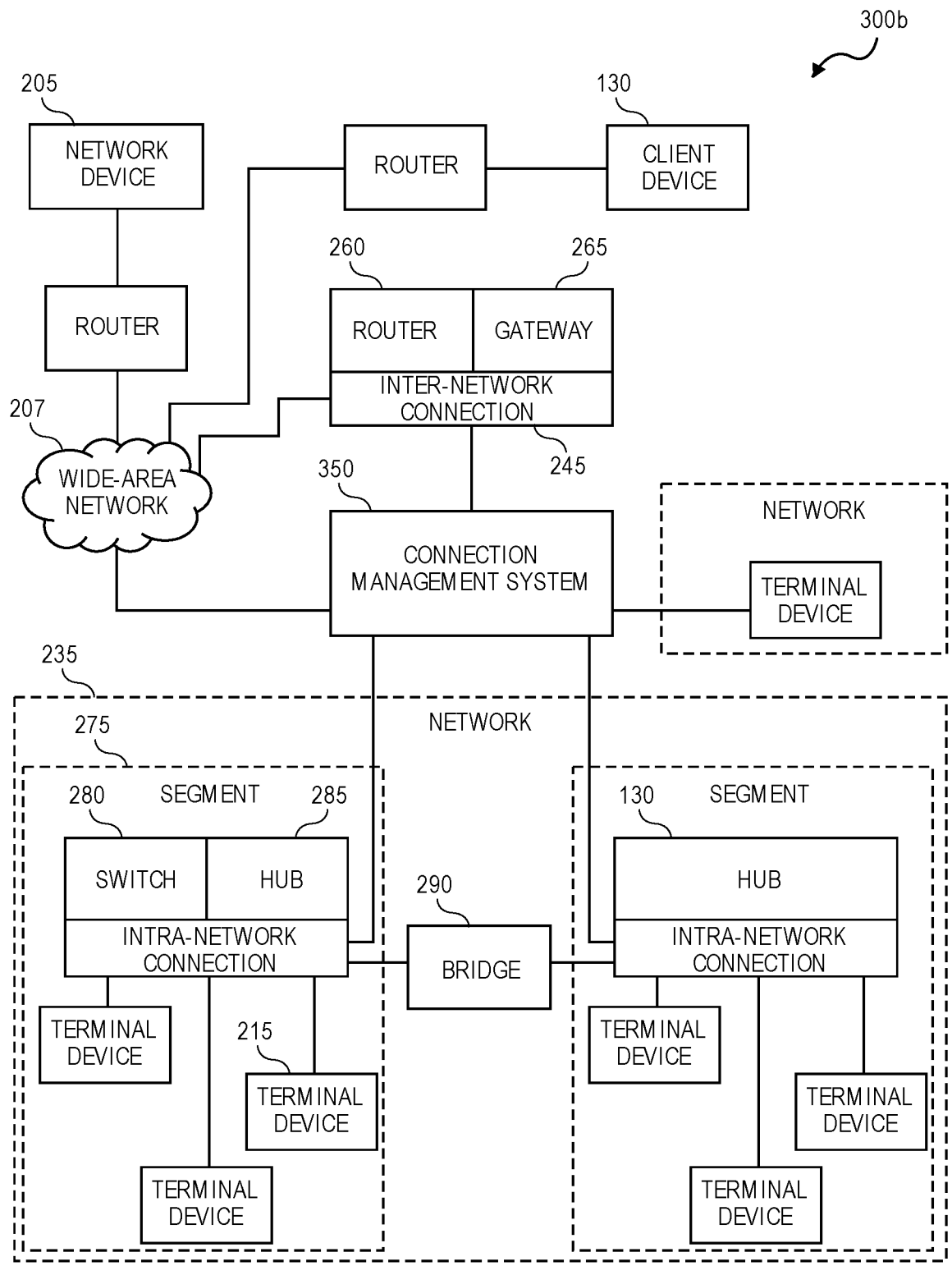

FIGS. 3A-3C show block diagrams of other embodiments of a network interaction system 300a-c that includes a connection management system. Each of the depicted systems 300a-c show only two local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
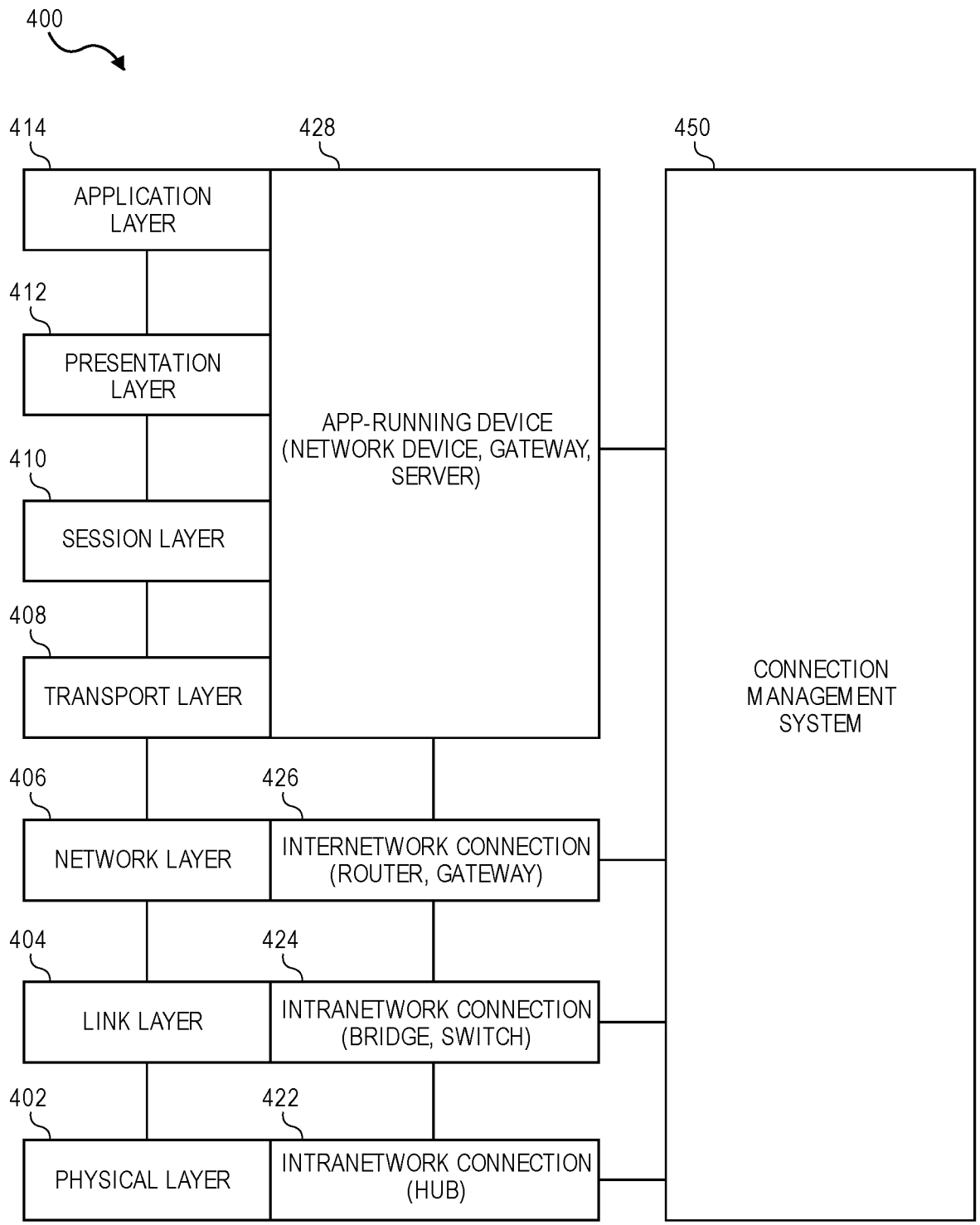
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting.

Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
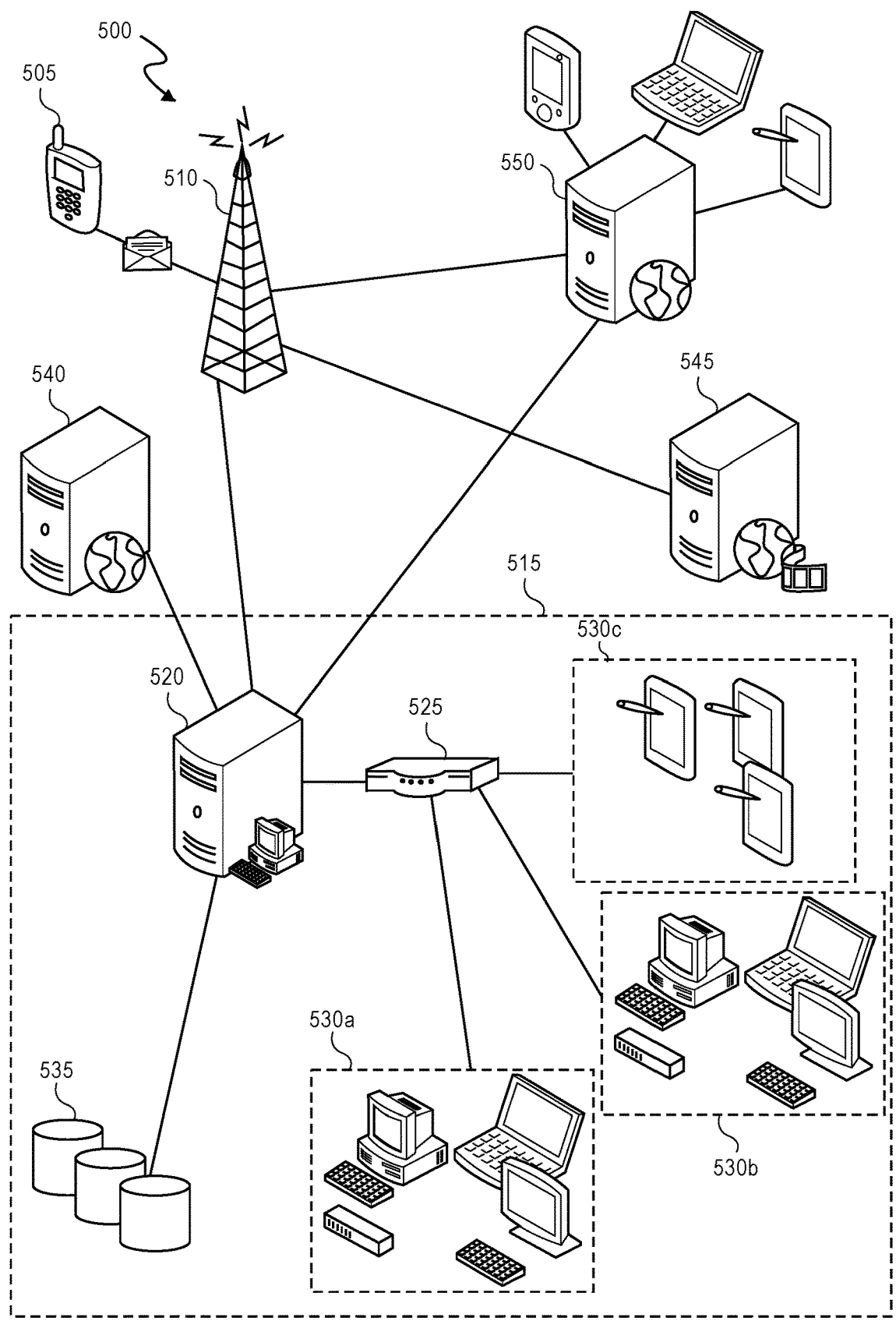
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or dispersed. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, transaction history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical item details, news, current item offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
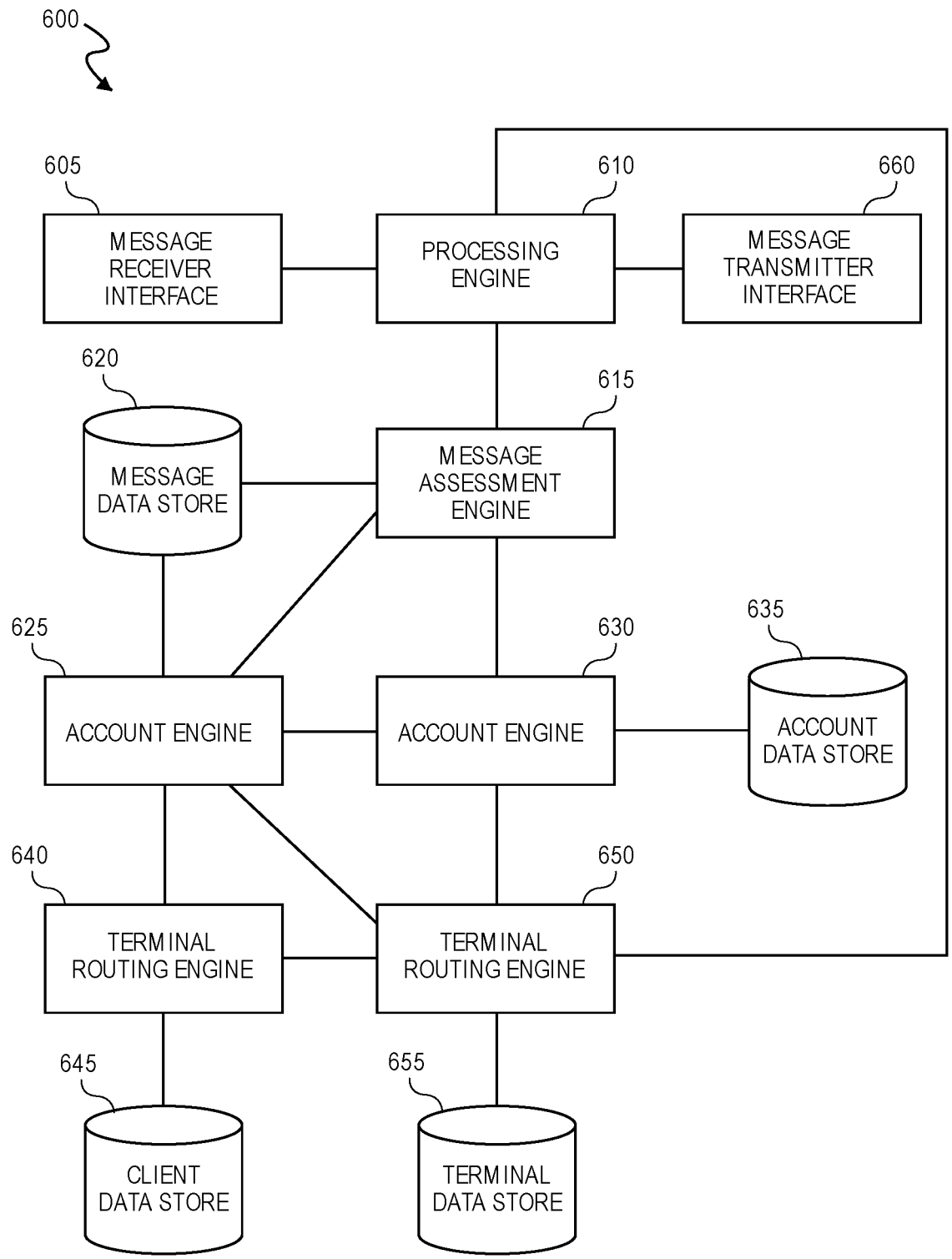
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular application (or app) page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or application page (e.g., a mobile application or app) associated with the client; the message can include or be associated with a destination address associated with a client; or the message can include or be associated with an identification of an item or service associated with the client (e.g., being offered by the client, having been obtained by the client or being one that the client services). To illustrate, a network device may be presenting an application page of a particular client, which may offer an option to transmit a communication to an agent. Upon receiving user input corresponding to a message, a communication may be generated to include the message and an identifier of the particular client. The message can be routed to a particular terminal device or particular set of terminal devices (e.g., terminal devices used by agents or provider proxies).

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity and urgency. A difference between categorizing and tagging a message can be that categories can be limited (e.g., according to a predefined set of category options), while tags can be open. A topic can include, for example, an item, a service, a technical issue, a use question, a complaint, a refund request or a transaction request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can inquiry message data store 620 to retrieve inquiry-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to assign to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This continuous channel can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message inquiry. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and the threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device.

Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, item, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general inquiry. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/ or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges (or communications sessions) does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Providers of items and services can use any of the systems described above with regard to FIG. 1-FIG. 6. For example, users can access (using a device or mobile application platform) published items and services from providers over the Internet, and can communicate with agents (or provider proxies) using the systems described above. Users can find and learn about ideas and information from sources in other far corners of the world. Further, users are able to locate sources for items or services. Various messages are exchanged using the Internet, carrying large amounts of data and information.

Figure 7A:
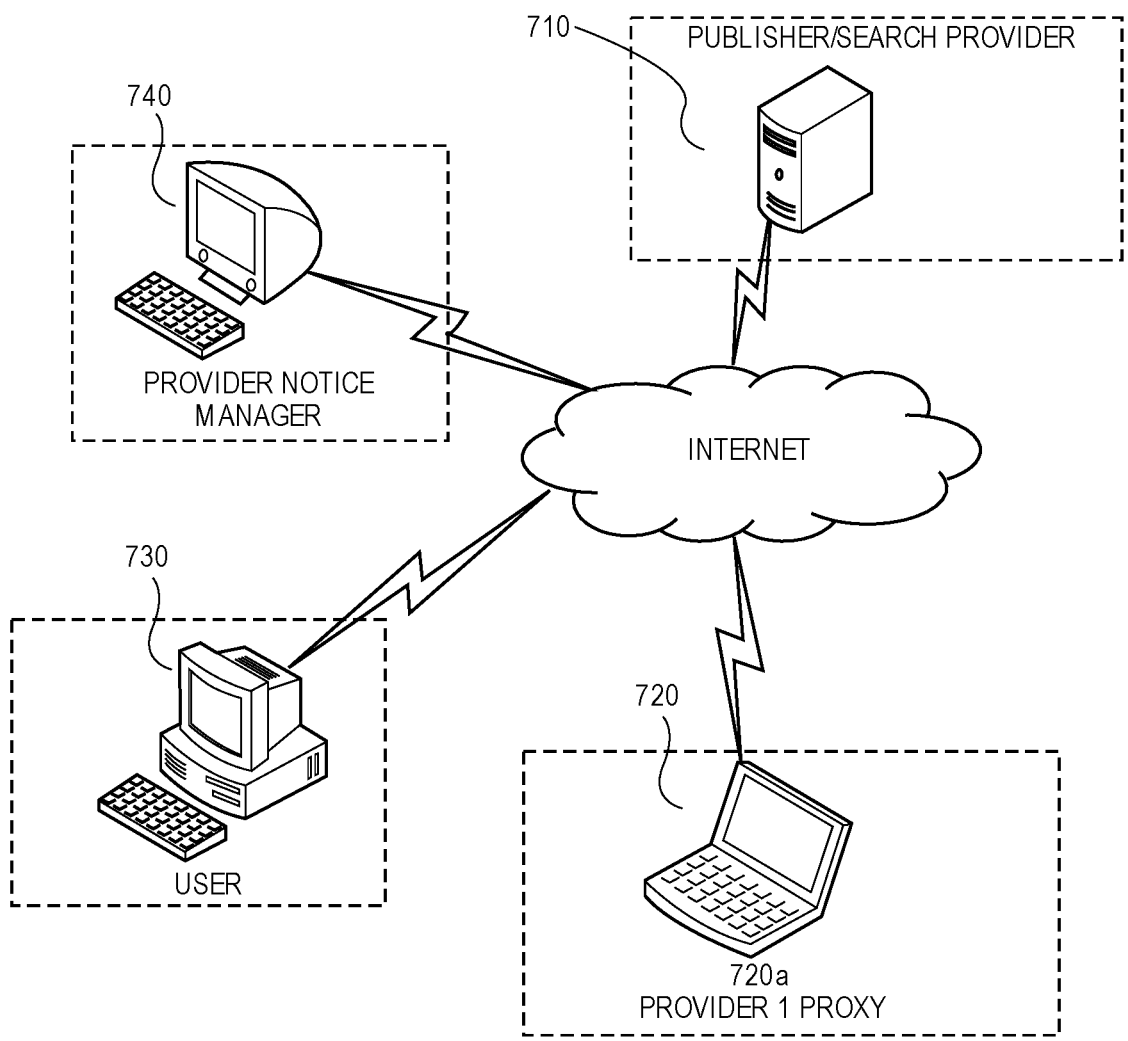

FIG. 7A is a diagram depicting the various systems involved in allowing a user 730 to conduct inquiries for identifying items (or notices for items) that meet the user's criteria. Typically, the user 730 will use a computer configured to run, for example, a web browser for reading web pages published by various publishers 710 and distributed via an associated web server. Typically, a provider 740 will have access to certain publishing controls hosted by the publisher 710 to allow the provider to place content and other descriptive item information for publishing by the publisher 710. Some published material will incorporate, for example, an instant messaging link to allow a user to engage a proxy of the provider in a one-on-one textual communication or message exchange. If the provider proxy is not logged onto the Internet and their Instant Messenger system, or otherwise able to accept a page from a user, the user will not be able to get the information they desire.

FIG. 7B is a diagram depicting an example of results 760 pertaining to a user inquiry or inquiry on a display device 50. The results 760 are a listing of published items meeting an inquiry.

This listing is in summary format and contains few details pertaining to the published item. In order to view further details of a published item, it is necessary for the user to select a link published within the summary of each published item. In this example, the results 760 include a listing of six items 761-766. Each of the listed items 761-766 include links 761L-766L that can be activated (selected) to cause a web page containing the detailed notice of the published item to be displayed.

Figure 7C:
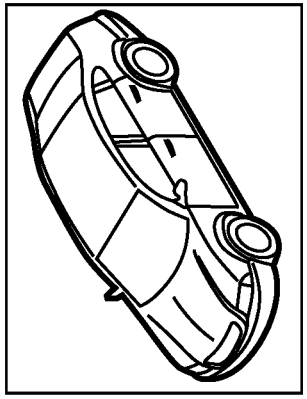

FIG. 7C is a diagram depicting an example of a notice 770. In this example, notice 770 is displayed when link 761L (sec FIG. 7B) is activated/selected by a user. The published notice includes a photograph 772 of the item and text 774 describing the item. This text includes telephone 776 and e-mail contact information to allow a user to contact the provider with any questions they may have. Neither of these means of communication allow for near immediate communication. In fact, the user is likely to spend substantial time either waiting on hold for someone to answer the telephone or waiting on someone to respond to an e-mail inquiry. Further, whether or not a user actually makes contact with a provider may not be trackable, and may thus be difficult to qualify as, for example, an opportunity or lead.

Providers can incorporate the ability for users to initiate 2-way communications with the providers. This has been done by making use of known instant messaging (IM) technologies. Instant Messaging allows near instant internet-based communication between two parties using the same network and/or service provider. Communication methods typically include text-based chat, voice over Internet protocol (VoIP) as well as other methods, such as, for example, file transfer, streaming video/audio, application sharing and other methods. Use of IM in the item publication realm has been limited to publication of a "contact icon," in relation to a particular notice, that if selected/activated, will allow a user to initiate, for example, a 2-way textual communication. Unfortunately, if the provider (provider proxy) is not available to receive and engage in the 2-way communication, the users' time is wasted and the provider has lost a potential opportunity. Further, as typical instant messaging systems require a user to select a specific named person in order to initiate a 2-way "chat" session, it is difficult to use instant messaging in notices for published items since a user often does not want to communicate with a specific named person but, rather, anyone associated with the provider who will actually be able to assist them in answering their questions.

Numerous commercial applications of wireless messaging exist today including, for example, interactive pagers using various communication methods and protocols, mobile phone based text communication including those using the Short Message Service (SMS) protocol and Multimedia Message Service (MIAS) protocol.

Figure 8A:
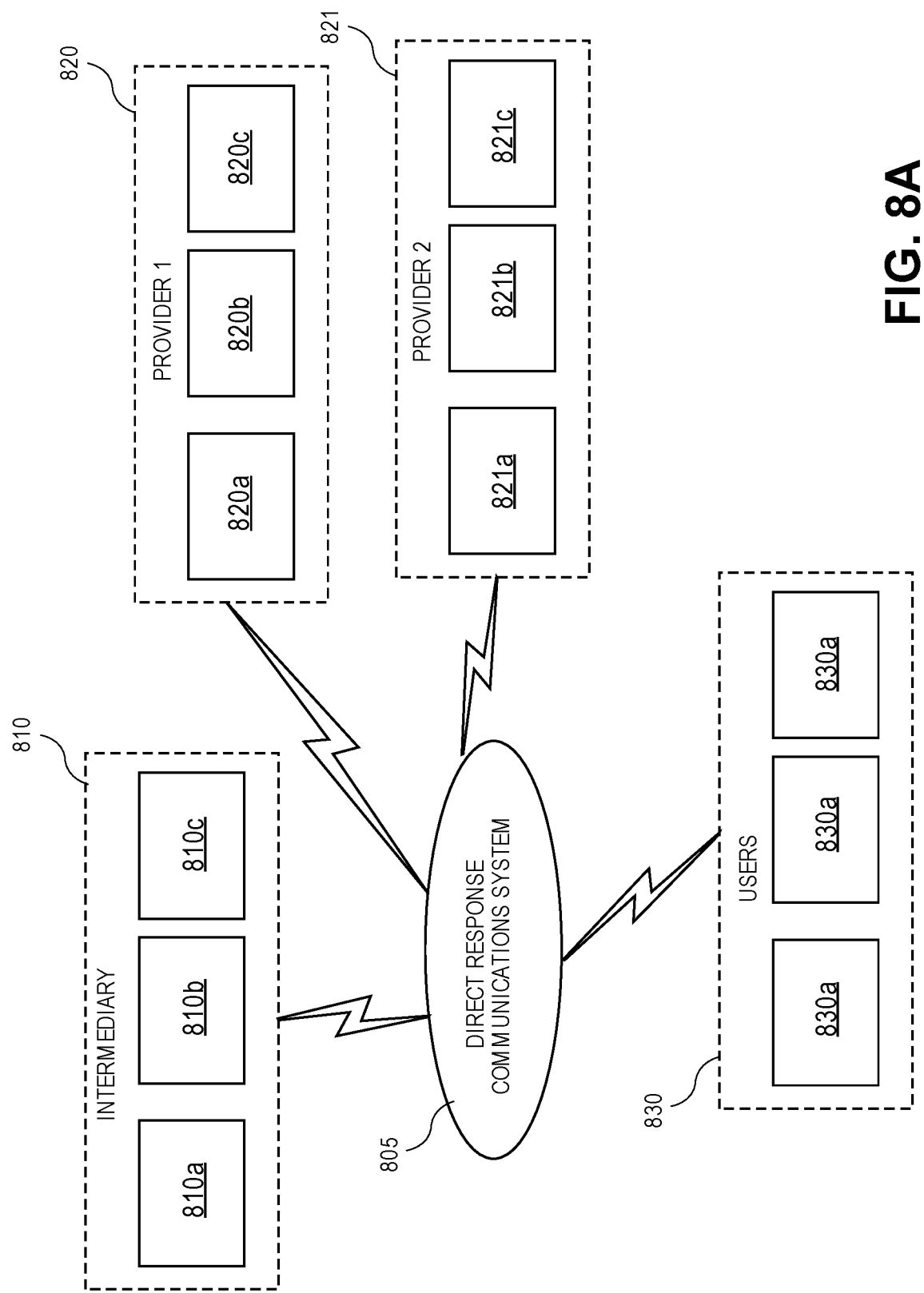
FIG. 8A-FIG. 8I are diagrams depicting a system for publication of notices and results of inquiries according to the present application.
Figure 8B:
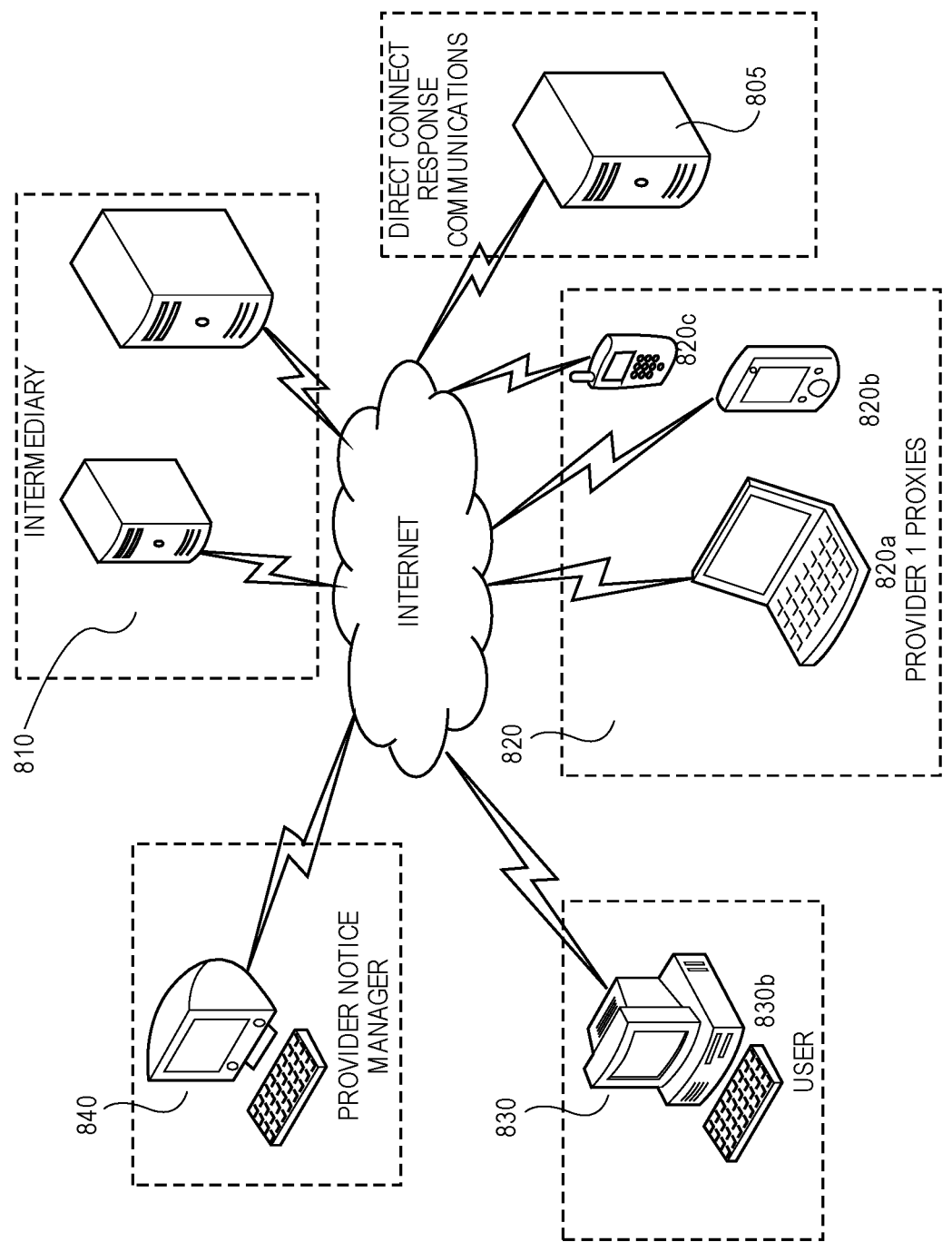

FIG. 8A and FIG. 8B are diagrams depicting one implementation of a system according to the present application. A direct response communication system (DRCS) 805 is provided. The DRCS 805 may be configured to work in conjunction with an intermediary 810 so as to control 2-way communications between providers 820, 821 and users 830. Each provider 820 and 821 is provided with a system to allow one or more proxies of the provider 1 (820a, 820b, 820c) and provider 2 (821a, 821b and 821c) to log-on to the system 805 for purposes of receiving and responding to inquiries from users 830a, 830b or 830c. Intermediary 810 may be, for example, a search provider, item notice publisher or other party.

FIG. 8B illustrates how the direct response communication system may be connected with the intermediary 810, providers 820 and 821 and users 830 via a network, such as the Internet. Providers may have one or more proxies log-in to the direct response communication system (DRCS) 805 via one of a variety of message capable devices (MCD). Message capable devices may include, for example, but are not limited to, personal computers, mobile and handheld devices, such as for example, interactive pagers, instant messaging devices, personal digital assistants (PDA), mobile telephones, smartphones, such as the Palm model Treo 650, Nokia model 9300 or RIM model Blackberry 8700 g, and. the like. Using these message capable devices, it is possible for a provider proxy to receive and respond to inquiries from online users via engaging in 2-way real time communications sessions established and controlled by the DRCS 805. From the initial request from the user, to the close of a 2-way communication session, one embodiment of the DRCS 805 provides for the tracking and recording of all events and communication content.

Figure 8C:
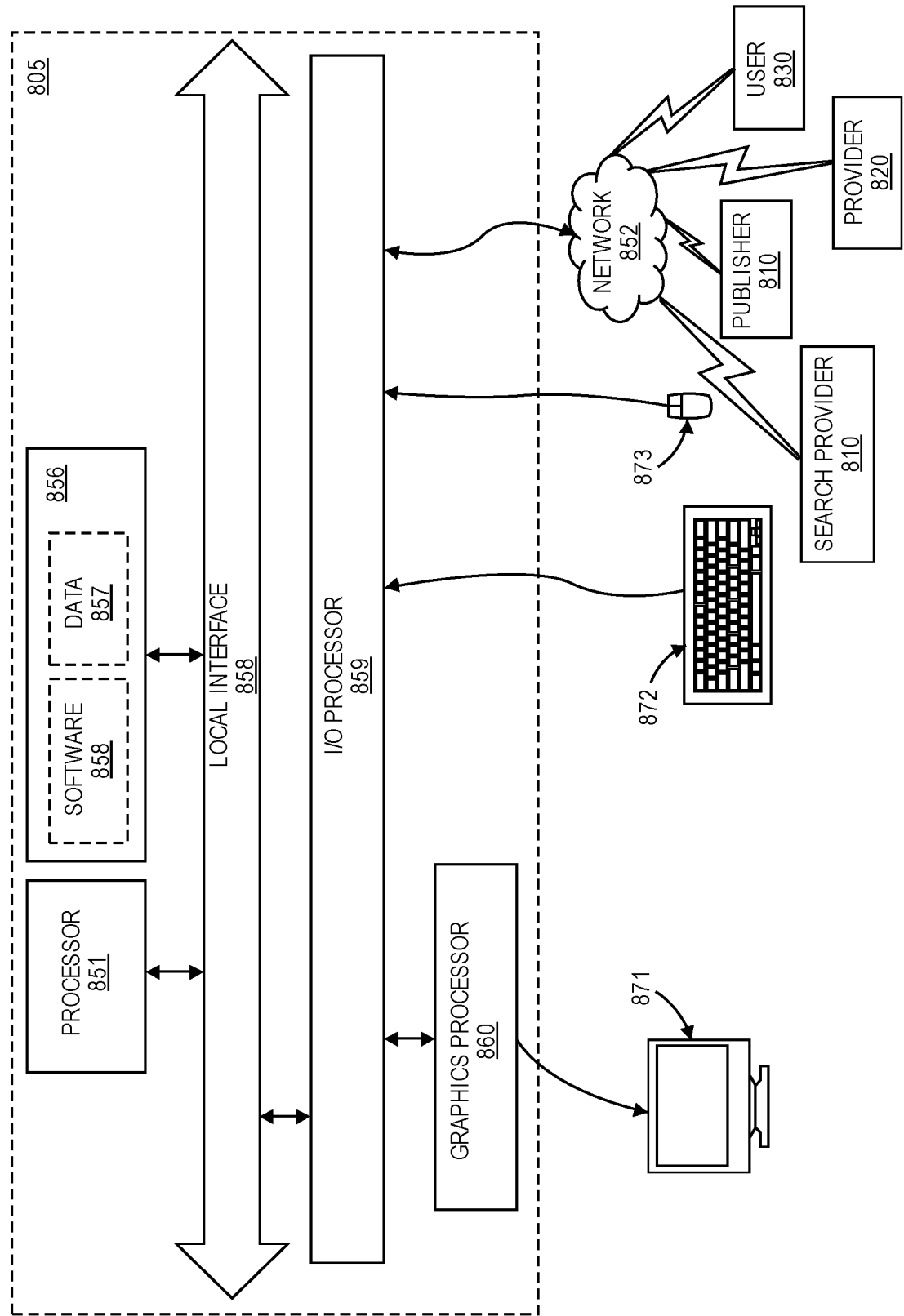

FIG. 8C illustrates an embodiment of a direct response communication system (DRCS) 805. In this embodiment, DRCS 805 includes a processor 851, a local interface bus 858, storage memory 856 for storing electronic format instructions (software) 858 and data 857. Storage memory 856 may include both volatile and non-volatile memory. An input/output interface 859 may be provided for interfacing with and communicating data received from/to, for example, a network 852, such as, for example, the Internet, or input devices such as a keyboard 872 or pointing device 873. Input/output interface 859 may also be configured to interface with, for example, graphics processor 860. Graphics processor 860 may be provided, for carrying out the processing of graphic information for display in accordance with instructions from processor 851.

Processor 851 accesses data stored in memory 856 in accordance with, for example, software 858 stored on memory 856. Processor 851 may be configured to receive user input from an input device such as keyboard 872 or pointing device 873 and generate instructions and/or queries based upon the use input. Processor 851 may also be configured to place the command into a predetermined format, such as, for example, extensible mark-up language (XML) format, in accordance with software 858 stored in memory 856. Processor 851 may be further configured to forward data, instructions and/or queries to, for example, an intermediary 810, a user 830 and/or a provider 820 via a network 852. Additionally processor 851 may be configured to forward data, instructions and/or queries to, for example, an intermediary 810, a user 830 and/or a provider 820 via a network 852.

Figure 8D:
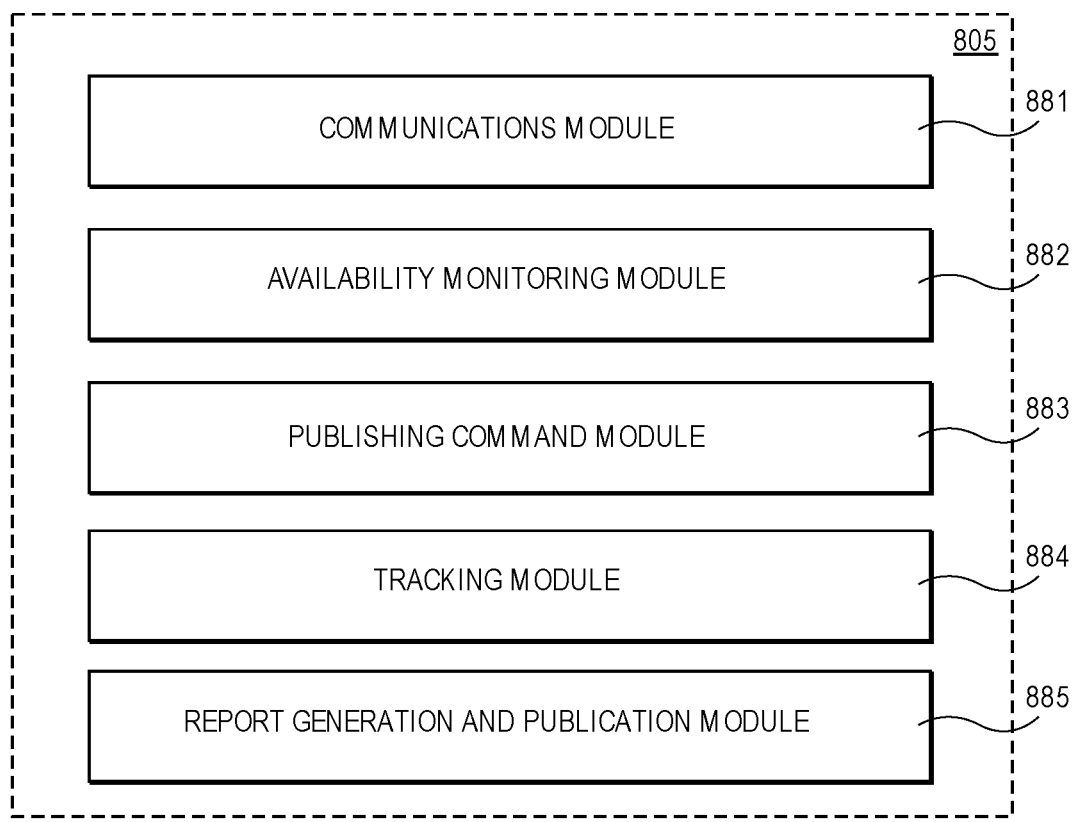

FIG. 8D-FIG. 8G are diagrams depicting further details of an embodiment of DRCS 805. FIG. 8D shows the DRCS 805 to include a communications module 881, and availability monitoring module 882, publishing command module 883, tracking module 884 and a report generation and publication module 885.

Figure 8E:
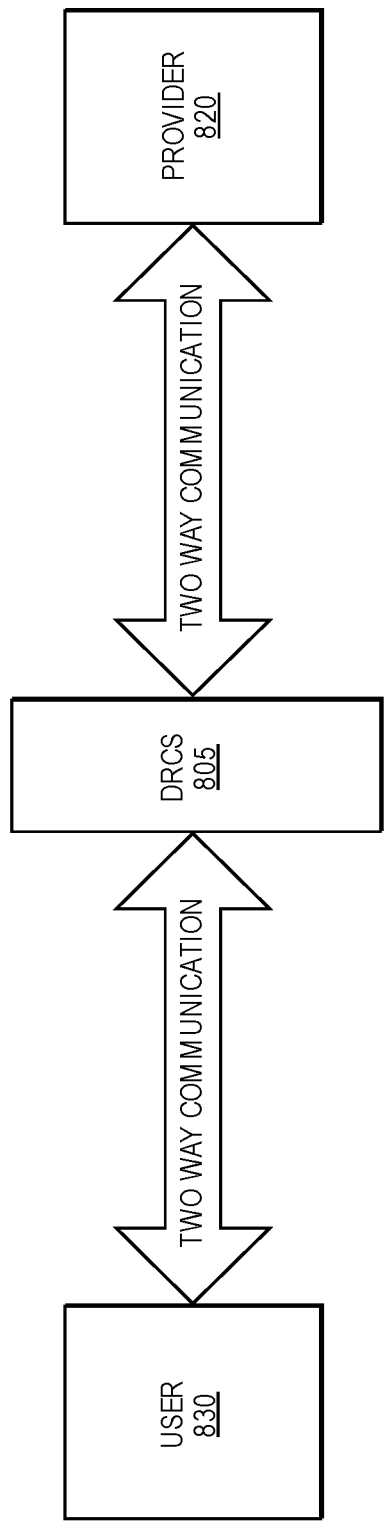
Figure 8F:
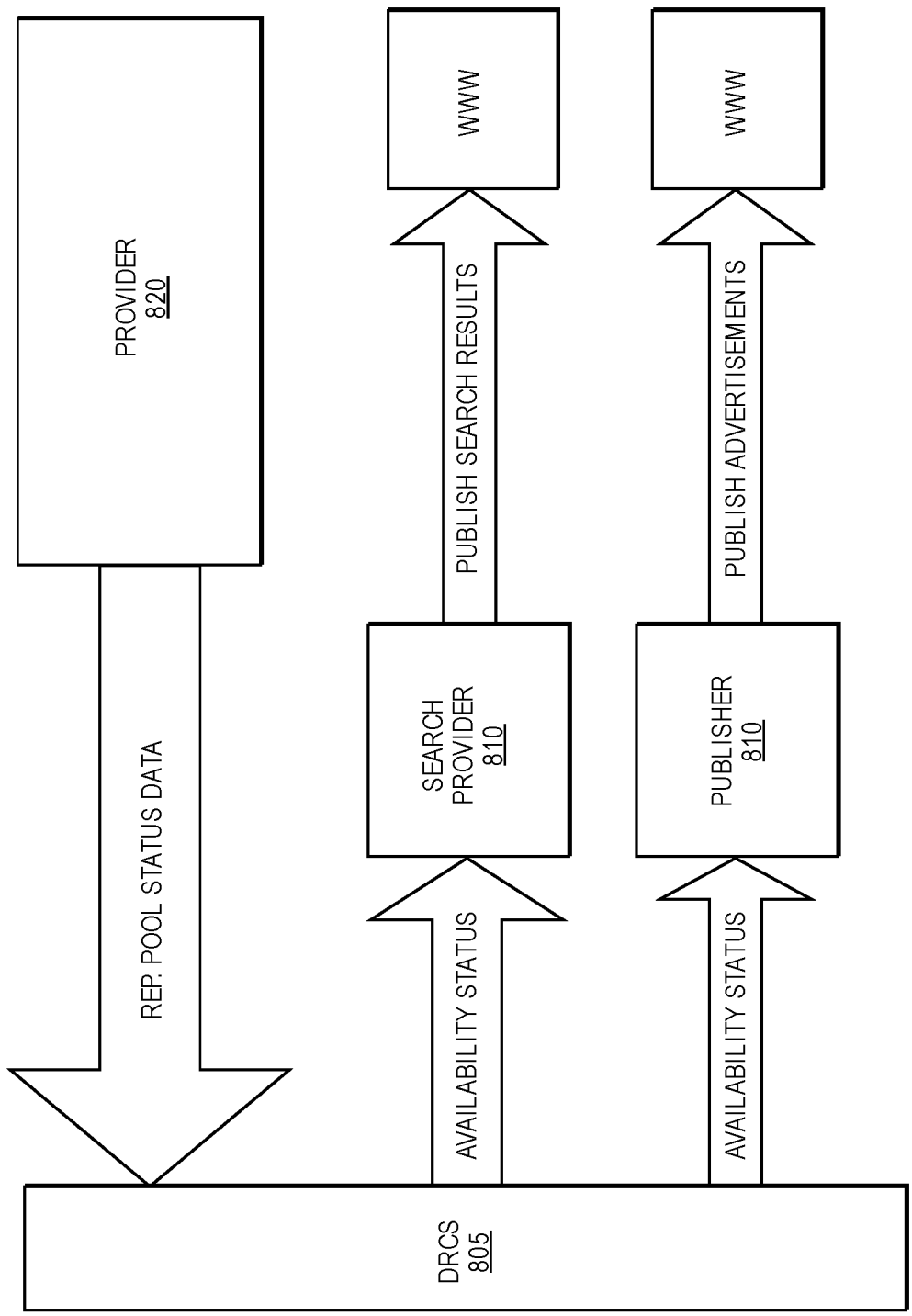
Figure 8G:
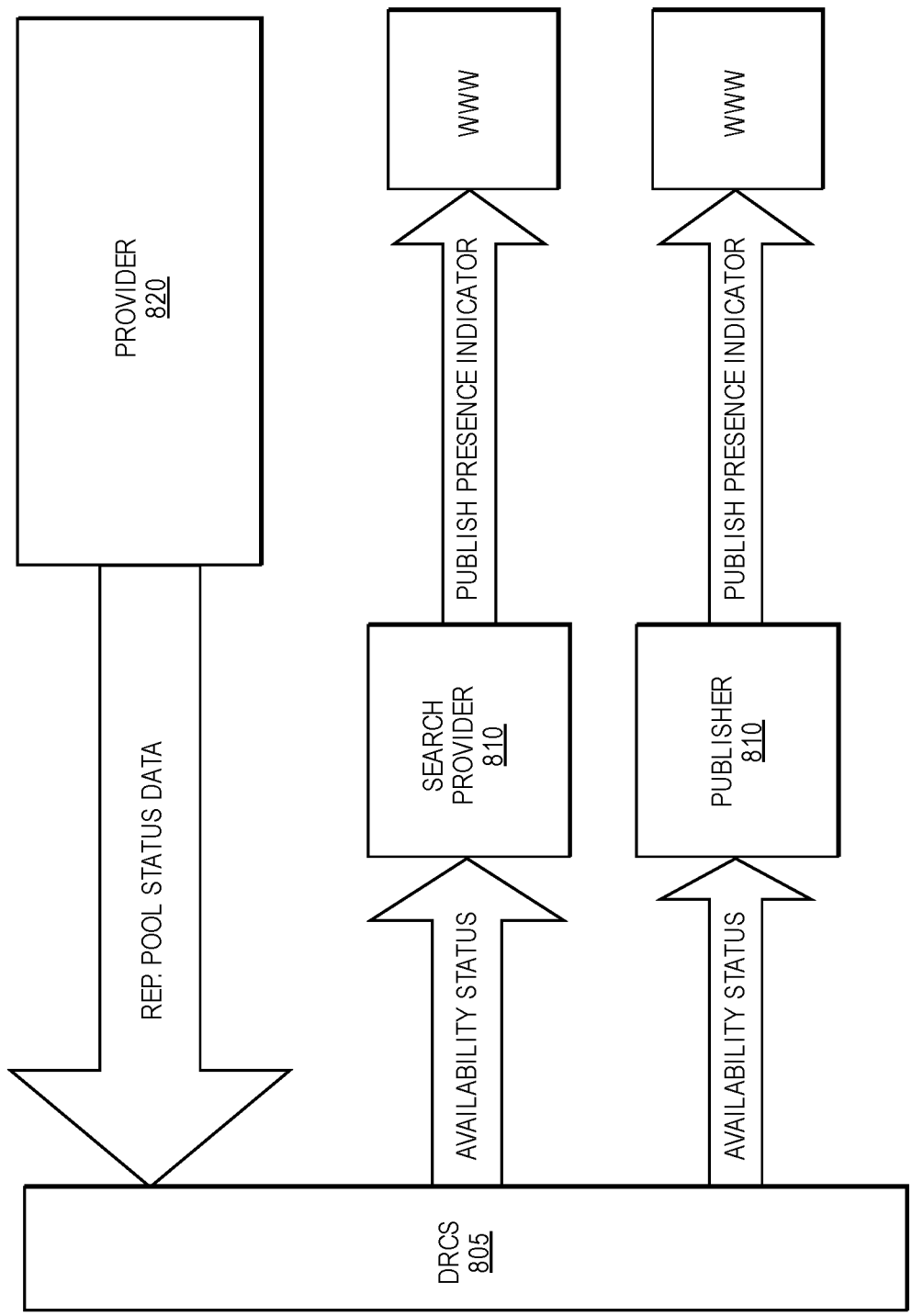

With reference to FIG. 8E-FIG. 8G communications module 881 is provided to establish and control 2-way real time communications sessions between a user 830 and a provider 820. The communications module 881 may be configured to establish and control real time communications sessions such as, for example, text messages, created and exchanged via, for example, instant messenger technologies, SMS, MMS, internet relay chat (IRC), or other text message communication techniques. Further the communications module 881 may be configured to establish and control real time communications sessions such as, for example, audible voice communications via, for example, VOW. Further, the communications module 881 may be configured to establish and control real time communications such as, for example, video chat.

The communications module 881 may be configured to cause data and instructions concerning a 2-way communications to be exchanged with, for example, a user message capable device (MCD) to display, for example appropriate communications windows and controls on the user MCD. The communications module 881 may be configured to cause data and instructions concerning a 2-way communications to be exchanged with a user MCD to display appropriate communications windows and controls on the user MCD. Similarly, the communications module 881 may be configured to cause data and instructions concerning a 2-way communications to be exchanged with, for example, a provider via a message capable device (MCD) to display, for example appropriate communications windows and controls on a MCD associated with/used by a provider proxy. The communications module 881 may also be configured to cause data and instructions concerning a 2-way communications to be exchanged with a user MCD to display appropriate communications windows and controls on the user MCD.

Figure 9A:
Figure 9B:
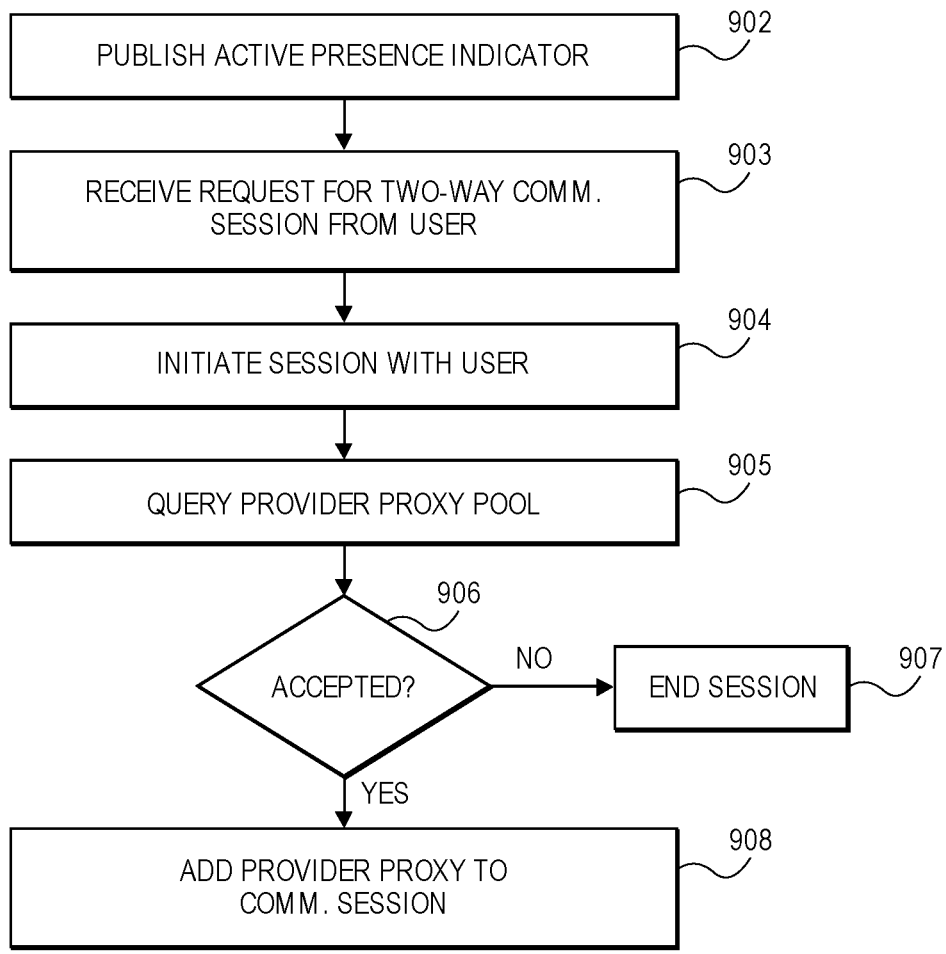
Figure 9C:
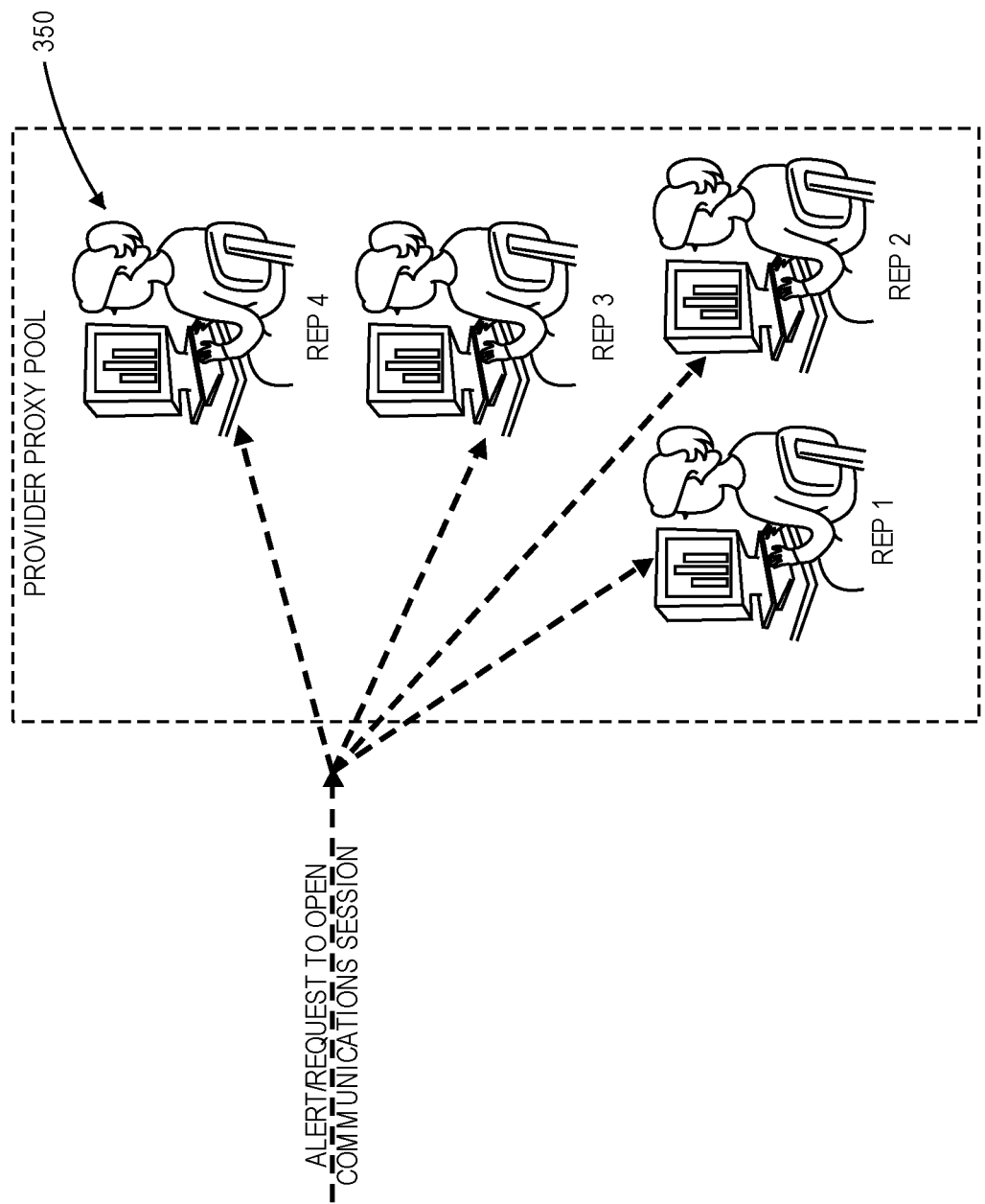

In a further embodiment, the communications module 881 is configured to send an alert or inquiry to a provider 820, via sending the alert or inquiry, over a network 852 (FIG. 8C) to one or more MCD devices associated with or otherwise used by one or more provider proxies within a given provider proxy pool (FIG. 9C). The alert or inquiry is generated upon receipt of a request from a user to initiate a 2-way communications session with the provider.

With reference to FIG. 8F and FIG. 8G, availability monitoring module 882 is provided to monitor the status of various predefined factors (status data) relevant to one or more provider proxies within a given provider proxy pool. Based upon the status of various predefined factors, the availability monitoring module 882 will determine, based upon predetermined criteria, the "availability" of a provider. In one embodiment, a provider is deemed available in real-time, if it is determined that the provider (via a provider proxy) is likely to be able to respond to a request for and in engage in a 2-way communication, in real time, with a user concerning an item published by the provider. The availability status may then be reported to one or more intermediaries 810, such as, for example, online item notice publishers and/or search providers or the like. The availability status can be used for demand-based messaging purposes. In turn, the intermediaries 810 may control whether or not a notice or presence indicator will be served up for publication at a given time, based upon the availability status of a given provider as determined and indicated by the availability monitoring module 882. Demand-based messaging can be performed based on the presence indicator or notice with a presence indicator.

Publishing command module 883 may be configured to receive the availability status of a provider as determined by the availability monitoring module 882. The publishing command module may be further configured to determine whether or not a given availability status meets certain criteria set by, for example, a provider or publisher. For example, the publishing command module 883 may determine, given the availability status of a provider, whether or not the probability of the provider establishing a 2-way communication session with a user is above or below a preset threshold. If the probability is above the threshold, for example, the publishing command module 883 may be configured to report the availability status to one or more intermediaries 810, such as, for example, item notice publishers and/or search providers or the like. In turn the intermediaries 810 may determine and control whether or not a notice or presence indicator will be served up for web publication at a given time, based upon the availability status of a given provider as determined and indicated by the availability monitoring module 882. Alternatively, the publishing command module 883 may be configured to issue a command to publish or not publish to an intermediary 810, based upon certain predetermined criteria established by, for example, the provider 820 or an intermediary 810.

Tracking module 884 is provided and configured to monitor and record certain predefined events or actions relevant to a notice and/or initiation of a 2-way communication session, as well as, for example the content of any 2-way communication. It may also be configured to cause a request for user information to be issued, and to record the user information provided.

Report generation and publication module 885 is provided to generate and/or publish one or more reports relevant to data and events tracked and/or recorded by the tracking module 884. These reports may be configured to meet the needs/desires of, for example, intermediaries, such as, publishers, search providers, providers of items or services, or any other party. Reports may be published via printing or serving up online to a limited access site. Further, reports may be published in real time to reflect the current state of factors concerning a given provider or provider notice.

Figure 8H:
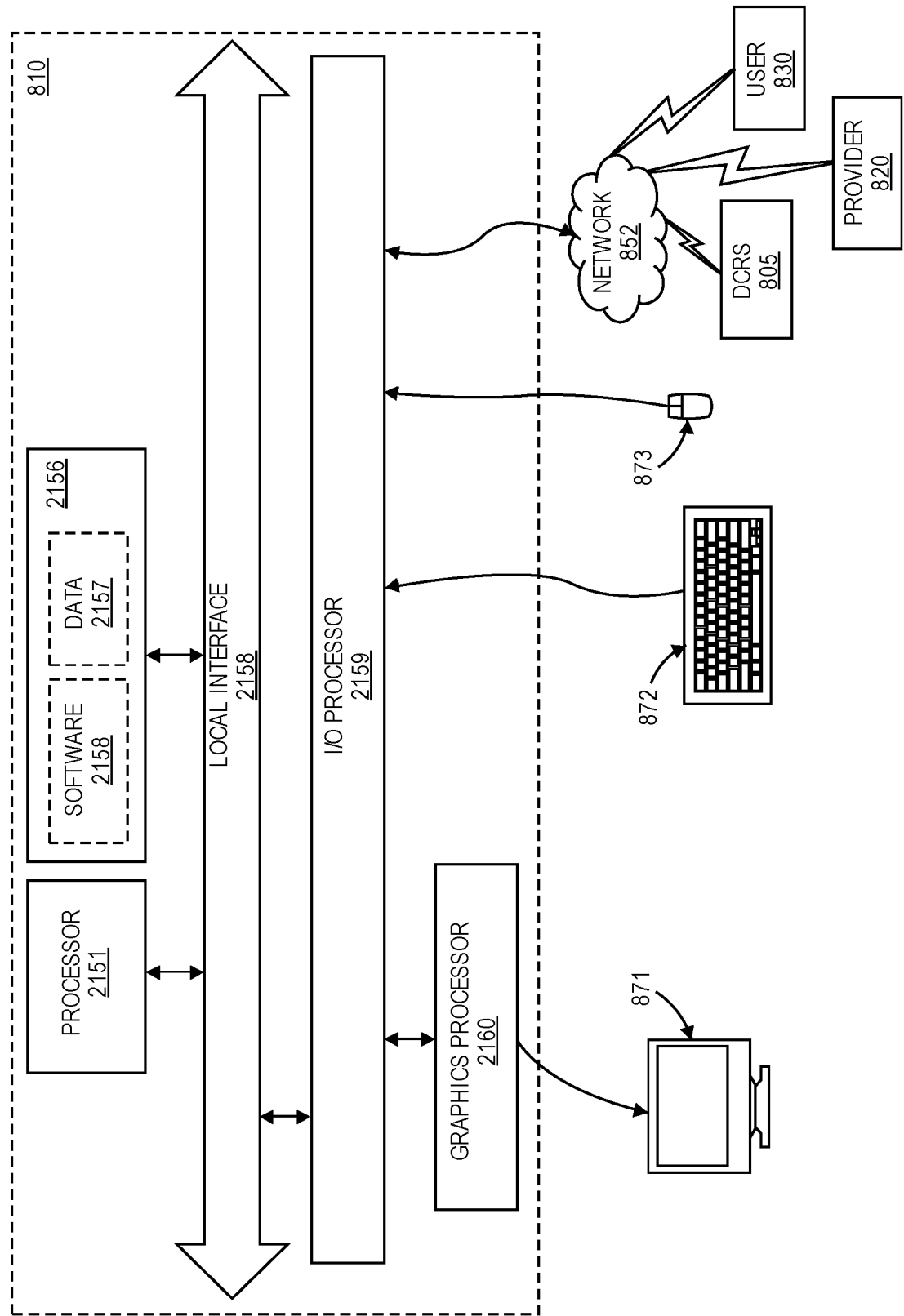

FIG. 8H illustrates an embodiment of an intermediary system 810. In this embodiment, intermediary 810 includes a processor 2151, a local interface bus 2158, storage memory 2156 for storing electronic format instructions (software) 2158 and data 2157. Storage memory 2156 may include both volatile and non-volatile memory. An input/output interface 2159 may be provided for interfacing with and communicating data received from/to, for example, a network 2152, such as, for example, the Internet, or input devices such as a keyboard 872 or pointing device 873, input/output interface 2159 may also be configured to interface with, for example, graphics processor 2160. Graphics processor 2150 may be provided for carrying out the processing of graphic information for display in accordance with instructions from processor 2151.

Processor 2151 accesses data stored in memory 2156 in accordance with, for example, software 2158 stored on memory 2156. Processor 2151 may be configured to receive user input from an input device such as keyboard 872 or pointing device 873 and generate instructions and/or queries based upon the user input. Processor 2151 may also be configured to place the command into a predetermined format, such as, for example, extensible mark-up language (XML) format, in accordance with software 2158 stored in memory 2156. Processor 2151 may be further configured to forward data, instructions and/or queries to, for example, a user 830 and/or a provider 820 via a network 852. Additionally processor 2151 may be configured to forward data, instructions and/or queries to, for example, a user 830 and/or a provider 820 via a network 852.

The software 8158 may include, for example, one or more applications, configured to carry out various processes or process steps according to the methodology depicted by the flowcharts of FIGS. 9B, 10, 11A, 11D, 12A, 12B, 12C, 13A, 13B and/or 13C.

In one embodiment, the intermediary system 810 is configured to receive status data concerning a pool of provider proxies and to determine whether such status data indicates that it is likely that a provider proxy will be able to accept and engage in a two-way real time communication with a user if they should initiate a request for a two-way real time communication. In a further embodiment the intermediary system 810 is configured to receive an indicator of provider availability. In another embodiment, the intermediary system 810 is configured to determine the availability of a provider based upon status data pertaining to a given pool of provider proxies. In yet a further embodiment, the intermediary system 810 may be configured to publish a notice at a given time based upon the availability of a provider or an indication of the availability of a provider. In yet a further embodiment the intermediary system 810 may be configured to publish a presence indicator in conjunction with a published notice, based upon the availability of a provider or an indication of the availability of a provider. In yet a further embodiment the intermediary system 810 may be configured to publish results of an inquiry inclusive of a given published notice based upon the availability of a provider or an indication of the availability of a provider. In yet a further embodiment the intermediary system 810 may be configured to publish a script, as a component of the notice, that requests the DRCS 805 to dynamically publish a presence indicator on behalf of the intermediary 810.

The intermediary system 810 may be configured to request data from, for example, a provider 820, a user 830 and/or a DRCS 805. Similarly, the intermediary system 810 may be configured to send and/or receive data and/or queries from, for example, a user 830. The intermediary system 810 can be implemented in hardware, software, firmware, or a combination thereof, in one embodiment(s), the intermediary system 810 is implemented in software or firmware that is stored in a memory and that is executed by a suitable instruction execution system. If implemented in hardware, as in an alternative embodiment; the intermediary system 810 can be implemented with any one or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPG.A), etc.

The flow charts of FIGS. 9B, 10, 11A, 11D, 12A, 12B, 12C, 13A, 13B and/or 13C show the architecture, functionality, and operation of possible implementations of the software 2158 (FIG. 8H). In this regard, each block represents a module, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in the reverse order, depending upon the functionality involved. The software program stored as software 2158, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner necessary, and then stored in a computer memory.

Figure 8I:
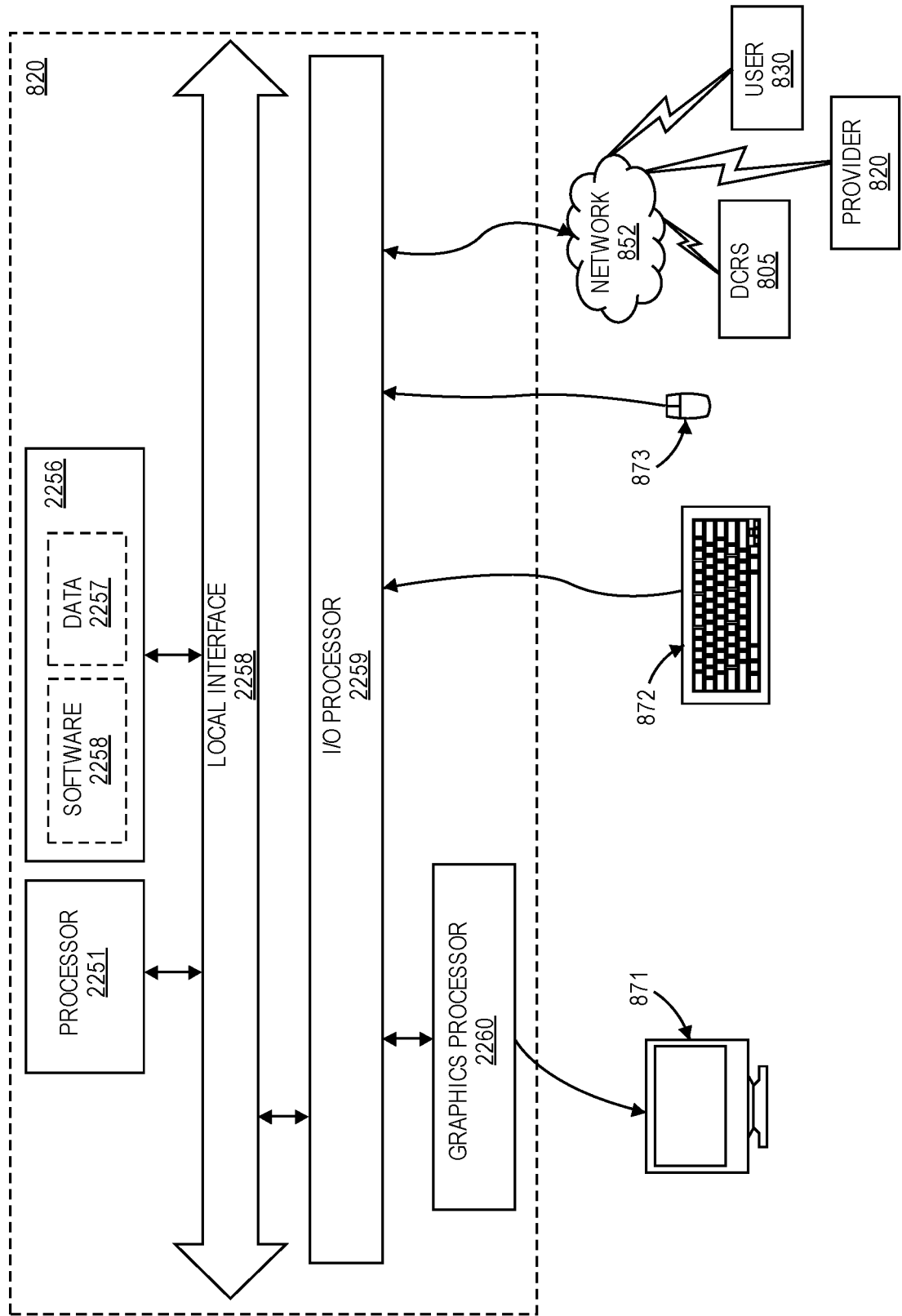

FIG. 8I illustrates an embodiment of a MCD associated with provider 820 (provider system 820). In this embodiment, provider system 820 includes a processor 2251, a local interface bus 2258, storage memory 2256 for storing electronic format instructions (software) 2258 and data 2257. Storage memory 2256 may include both volatile and non-volatile memory. An input/output interface 2259 may be provided for interfacing with and communicating data received from/to, for example, a network 2252, such as, for example, the Internet, or input devices such as a keyboard 872 or pointing device 873, input/output interface 2259 may also be configured to interface with, for example, graphics processor 2260. Graphics processor 2260 may be provided for carrying out the processing of graphic information for display in accordance with instructions from processor 2251.

Processor 2251 accesses data stored in memory 2256 in accordance with, for example, software 2258 stored on memory 2256. Processor 2251 may be configured to receive user input from an input device such as keyboard 872 or pointing device 873 and generate instructions and/or queries based upon the user input. Processor 2251 may also be configured to place the command into a predetermined format, such as, bar example, extensible markup language (XML) format, in accordance with software 2258 stored in memory 2256. Processor 2251 may be further configured to forward data instructions and/or queries to, for example, a user 830 and/or an intermediary 820 or DRCS 805 via a network 852. Additionally processor 2251 may be configured to forward data, instructions and/or queries to, for example, a. user 830 and/or an intermediary 820 or DRCS 805 via a network 852.

The software 2258 may include, for example, one or more applications, configured to carry out various processes or process steps according to the methodology depicted by the flowcharts of FIGS. 9B, 10, 11A, 11D, 12A, 12B, 12C, 13A, 13B and/or 13C.

In one embodiment, the provider system 830 is configured to receive alerts or queries from a DRCS 805 and to allow a user to engage in a two-way real time communication with, for example, a user. In a further embodiment the provider system 830 is configured to accept a request from a user for a two-way communication session. The provider system 830 may be configured to allow for two-way communications sessions that are carried out via exchange of one or more text messages, such as SMS or instant messaging. Further provider system 830 may be configured to allow for a two-way communications session carried out via a two way voice session.

One aspect of the application provides a means for a user viewing a published notice to obtain answers to questions they may have of the provider by initiating/requesting, a 2-way real time communications session with a proxy of the provider (a provider proxy).

In use, one implementation of the present application would allow a user 832 to access, for example, a search engine provided by an intermediary 810 and enter an inquiry to gather information pertaining to an item. In turn, a listing of results may be returned. The list of results will typically be in a summary or limited information format and include a link that would allow a user to access further details concerning a particular item that are published on another page, by selecting the link.

In the case of published notices, by selecting a link in the list of the results, the user could access the full notice that contains, for example, details concerning a published item of interest. In one implementation of the application, the notice would include a presence indicator that could be activated (selected) to initiate a request for assistance using demand-based messaging (using, for example, a 2-way communications session).

In one embodiment, a "presence indicator" is incorporated into and published as a part of a notice, and indicates that a proxy is available for demand-based messaging. The presence indicator may be configured as an active, selectable link, that when activated (selected) will send a request to the provider associated with a particular notice to engage in a 2-way communication. Alternatively, a presence indicator may be published in conjunction with displayed results.

FIG. 9A is a diagram depicting a published notice 920. In addition to textual information 922 and photograph 923 describing the published item, this notice 920 includes a presence indicator 926 that is displayed as an active icon, in this example, the presence indicator includes the text "Live Help" to let a user known that they may obtain additional help about the item by selecting the icon.

The 2-way communications mode may be, for example, a form of instant messaging (IM) in which textual messages are exchanged over a network in a back and forth fashion, via use of MCDs. There are several known forms of instant messaging that have been implemented by companies such as for example, Mirabillis.®, America Online (AOL).®., Google.®., Verichat. and Yahoo!.®.

FIG. 9C is a diagram depicting how a request may be simultaneously broadcast to multiple proxies (REP 1-REP 4) within a pool of provider proxies. Unlike typical instant messaging systems, the present application is configured to cause a pool of people (provider proxies), unknown and unidentifiable to the user, to be alerted/paged via a MCD when a user initiates a 2-way communications session. The page can be broadcast to all proxies within the pool and can be accepted by which ever proxy is able to accept the page first.

By allowing an alert to be simultaneously sent to multiple proxies of the provider when a user makes an inquiry, the chances that the provider will be able to actually respond to the user inquiry are greatly increased, since the chances of one of many people being able to respond at any given time are greater than the chances that any single person will be able to respond at any given time. In this way the value of the notice can be increased.

The size of the proxy pool may vary by provider, or throughout the day at any given provider. Of course, it is not necessary that there be more than one person in the pool of proxies, however, in general, the more the better since it makes it more likely that someone associated with the provider can respond promptly.

A 2-way communications session may be initiated by a user by selecting a presence indicator. The presence indicator may be, for example, a predetermined link or active icon (contact link) that is displayed in conjunction with a given notice. FIG. 9B is a flowchart describing an embodiment of the method the method of the present application. With reference to FIG. 9A and FIG. 9B, a presence indicator 926 is published (902). This presence indicator can be included within the bounds of the notice for a given item.

The system may be configured to simultaneously alert a pool of proxies of the provider of a pending inquiry. The first proxy in the pool to accept the inquiry will be the person who communicates with the user via the DRCS 805. The proxy may or may not use the same communications means (text chat, VoIP, SMS, MMS, etc.) engaged by the user. In those instances where the user and the provider proxy are using dissimilar communication means, the DRCS 805 may provide the requisite translation between the dissimilar communication means.

A user may initiate a request for a 2-way communications session by selecting a presence indicator published in connection with a given notice. The request is then sent to the DRCS 805. In turn, the DRCS 805 receives the request (902) and initiates a 2-way communications session with the user (904). With reference to FIG. 9C, an inquiry may then be, for example, simultaneously sent to one or more various message capable devices (MCD) associated with, or otherwise used by one or more proxies of the provider (provider proxy pool 950) to see if anyone is able to engage in the requested 2-way communications session. The first proxy in the pool to accept the inquiry will be the person who responds to the DRCS 805 using their respective MCD.

If the inquiry is accepted by a proxy (906), the proxy accepting the inquiry will be added to the 2-way communications session (908) at which point the proxy can communicate with the user via, for example, exchanging textual messages. If the inquiry is not accepted by a proxy, the communications session is terminated (907).

Once a request is received from a user, an alert may alternatively be sent sequentially to each provider proxy within the proxy pool. If the first proxy does not respond, the next proxy in the pool may be sent the alert. This can continue until the alert is answered or all of the proxies within the pool have failed to respond.

In one embodiment, the DRCS 805 integrates with a web site published by an intermediary 810 via use of, for example, HTML anchor tags that are incorporated into, for example, underlying HTML scripting associated with the web site and associated web pages.

These anchor tags may be provided for one or more entry points into the system and/or functionality provided or established by the DRCS 805 system. These entry points may be configured to accommodate, for example, two-way communication sessions, such as real time text messaging, active e-mail or select-to-initiate a telephone call, VoIP call or other voice communication.

These anchor tags can share a common structure for each entry point. In one embodiment, the anchor tags may be configured to include, for example, certain fixed required components, certain variable required components, as well as optional opportunity context components. TABLE 2 sets out further details of the fixed required components, variable required components and optional opportunity content components, for one possible implementation of the present application.

TABLE 2

| Anchor Tag Components | |
|---|---|
| Component | Description |
| Fixed Required Components | |
| Onclick window open | Specifies the application entry point for ContactAtOnce |
| ProviderId | Uniquely identifies the Online Notice Publisher or Provider |
| Variable Required Components | |
| ProviderID or MerchantId | Uniquely identifies the Provider location |
| PlacementId | Identifies a specific location that a presence indicator will be placed |
| Optional Opportunity Context Components | |
| Location | Search Location |
| Price Range | Price Range Low of Search Low & High |
| model | Item model or ID |
| brand | Manufacturer/Item Type |

Optional opportunity context components may be configured to pass opportunity related information to, for example, a provider upon receipt of two-way communication request from a user. Receipt of opportunity related information and delivery of such information to the provider may be tracked and reported by the DRCS 805.

FIG. 9D is a diagram illustrating one example of scripting that may be used to incorporate anchor tags on a published site for providing the functionality of instant messaging. In one embodiment, images chosen to serve as, for example, presence indicators will not be loaded on the intermediary server system. The <img src>component will dynamically render a presence indicator based on the real-time availability of the provider 820, as determined by, for example, the DRCS 805. An image displayed (rendered) when a provider 820 is "online" (available) may be different than the image rendered when the provider 830 is "offline" (not available). An argument provided in the javascript, for example, for launching a communication session window (conversation window) for the window name (the onclick of the <A> element) can be a null value. In some embodiments, the URI for the published web site will not be html encoded. More particularly, the &'s separating inquiry arguments will not be converted to &.

FIG. 9E is a diagram illustrating one example of scripting that may be used to incorporate anchor tags on a published web site for providing the functionality of active e-mail. In one embodiment, chosen images will not be loaded, on the intermediary server system. FIG. 9F is a diagram illustrating one example of scripting that may be used to incorporate anchor tags on a published web site for providing the functionality of selecting-to-call wherein a user may initiate a two-way voice communication session by selecting an icon. In one embodiment, chosen images will not be loaded on the intermediary server system.

Presence indicator Displayed Based on Availability

A further aspect of the application takes into account the availability of a provider to receive and respond to user inquiries in determining whether or not to publish a presence indicator in association with a notice. In one embodiment, a contact link is used as not only a means for initiating a 2-way communication sessions with a provider, but also as a presence indicator which indicates that the provider is available to receive and respond to inquiries from users. When the provider is available, the contact link is displayed in connection with the notice. When the provider is not available, the contact link will not be displayed, thus preventing users from attempting to initiate a 2-way communication session that has no chance of completion due to the fact that the provider is not available to receive it, nor respond.

An indication of the provider's availability may be provided in several ways. In one embodiment, if the system determines that the provider is "available", the system may have a presence indicator published within the boundaries of the published notice. This presence indicator may be, for example, an active icon or web hyper-link that, when selecting, causes a request for a 2-way communication session to be sent to the DRCS 805. In some embodiments, the presence indicator will include, or otherwise be made up of, some type of textual, graphic or symbolic information to let a user viewing the notice know that they may obtain additional information by selecting the presence indicator.

FIG. 10 is a diagram showing a flowchart describing one aspect of the methodology of the present application. Where a notice has been requested for display, the system will determine whether or not that provider associated with the notice is available to respond to inquiries/requests for 2-way communications from a user (1002). If it is determined that the provider is available, a presence indicator will be published in connection with the provider's notice (1003). If it is determined that the provider is not available, a presence indicator will not be published in connection with the provider's notice. In another embodiment when the provider is not available, the presence icon will include, or otherwise be made up of, some type of textual, graphic or symbolic information to let a user viewing the notice know that the provider is not currently available. In this way, it is possible to avoid having users make requests for communications sessions when it is determined that no one associated with the provider will be able to respond.

Figure 11A:
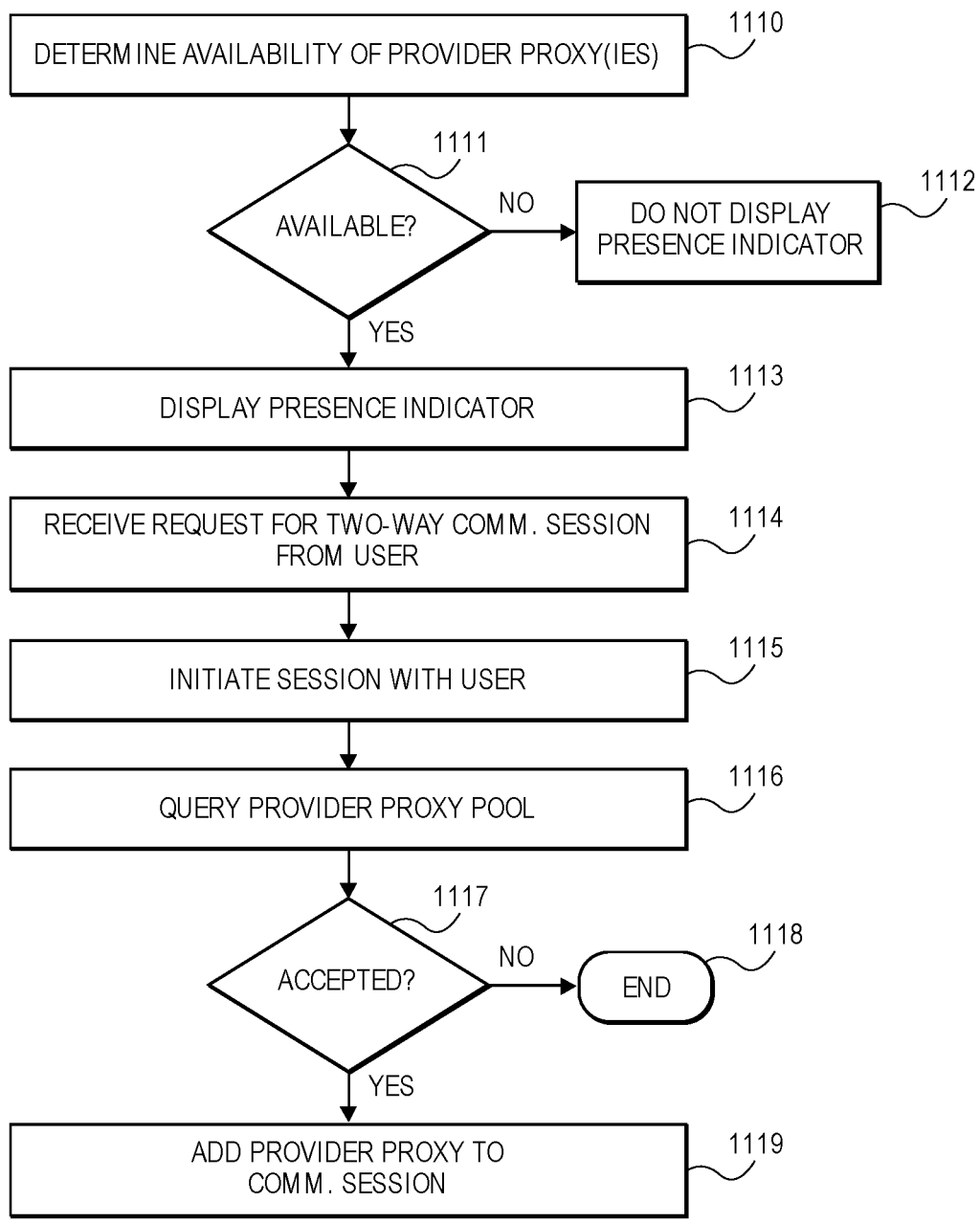
Figure 11B:
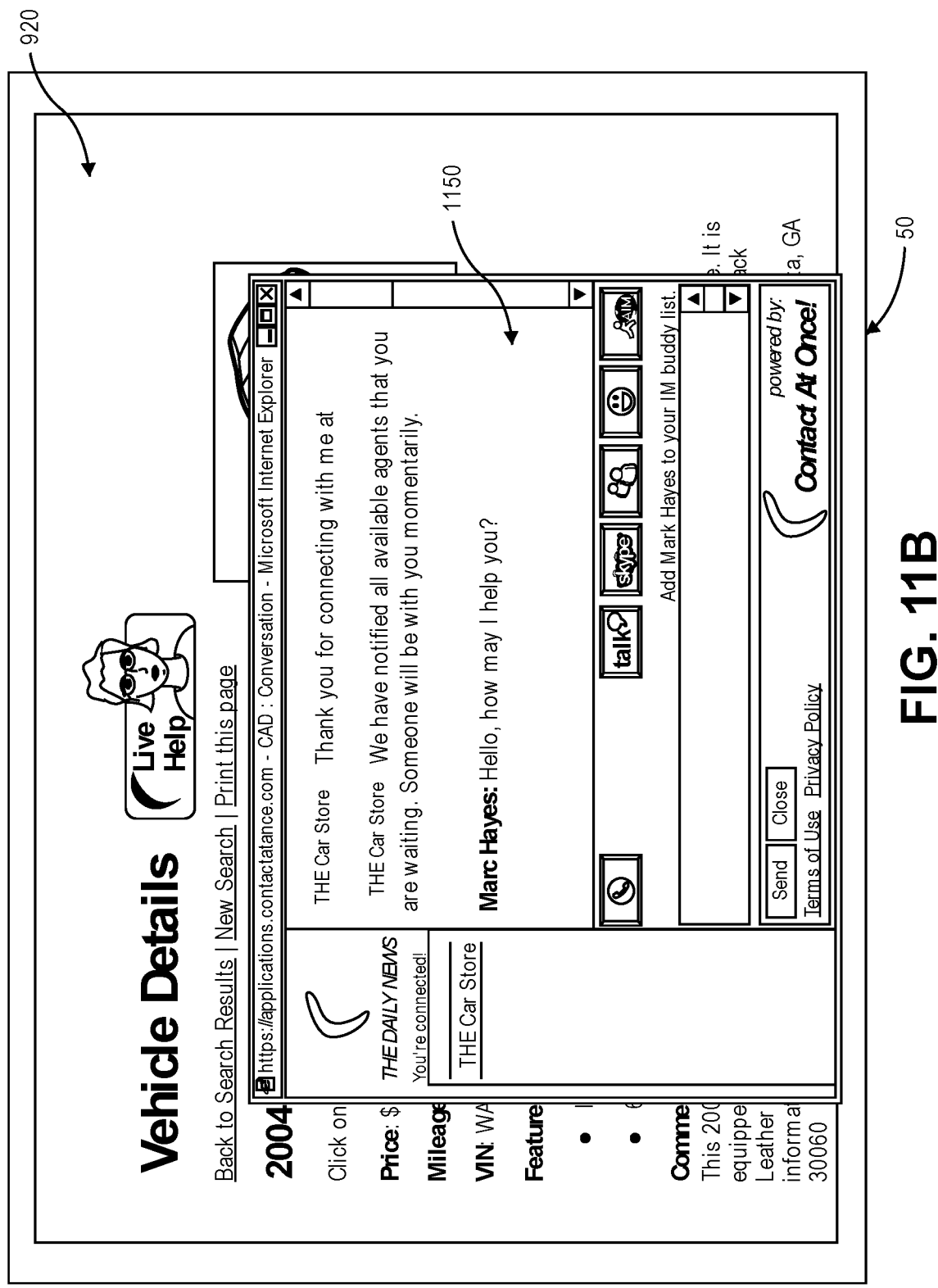

FIG. 11A is a diagram describing a further embodiment of the methodology of the application in which the availability of the provider, or a proxy of the provider, to actually receive and respond to user inquires in real-time is taken into account. A provider's availability is determined (1111). Availability may be determined based on the status of one or more predetermined factors, such as, for example, whether or not a proxy is actually logged into the DRCS 805 system. If it is determined that the provider is available, the DRCS 805 system will cause a presence indicator to be displayed in connection with a notice (1113) when the notice is served/published for user viewing. When a user views the notice, the presence indicator can be configured so that the user will understand that they may obtain additional information or help by selecting the presence indicator or a related specified selectable link. An example of a presence indicator 926 published in connection with a notice has been discussed above with respect FIG. 9A. When the presence indicator or specified related selectable link is selected (activated), it causes the DRCS 805 system to issue a request for a 2-way communication session to the provider. The provider receives the request for 2-way communication (1114). A 2-way communication session is initiated with the user (1115). The session is initiated by generating a session window 1150 on the user's MDC display window 920 as depicted in FIG. 11B. A request is issued to a pool of provider proxies (1116) to engage in the 2-way communication session. Only one proxy need respond to satisfy the request and allow the communication session to commence. If the request is accepted (1117) by a provider proxy, the provider is added to the communication session previously initiated (1119). Otherwise, the session is ended where no one within the proxy pool responds within a predetermined period of time (1118).

Figure 11C:
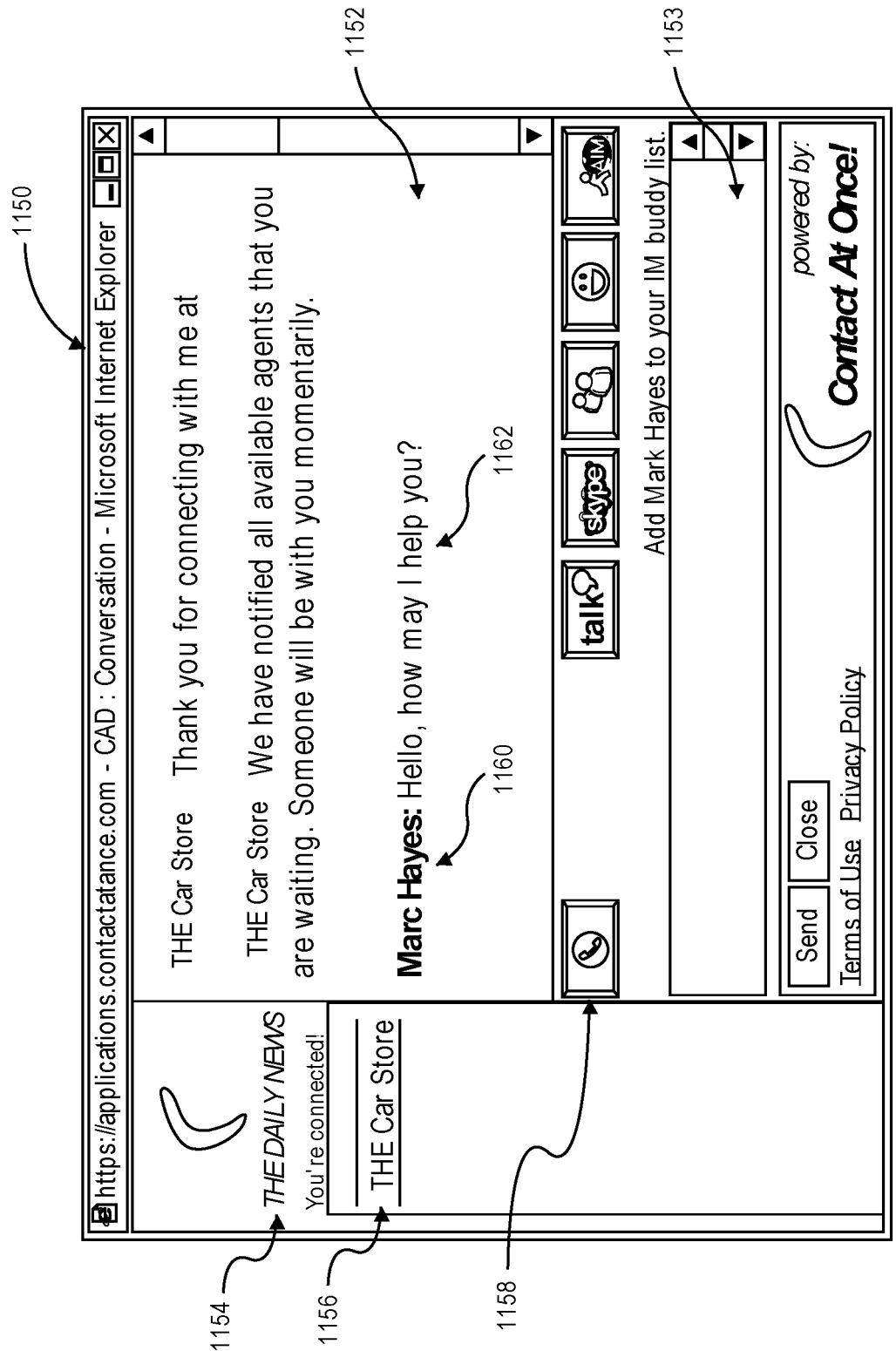

FIG. 11C is a diagram showing further details of the session window 1150. In one implementation, the session window 1150 includes is session transcript window 1152 and a text entry box 1153 to allow the user to enter text questions/comments to be forwarded to a provider proxy that has been added to the session. In this case, the transcript window 1152 already includes text of a question 1162 that has been received from an identified provider proxy 1160. The session window 1150 may also be configured to provide the user with additional information concerning the party/parties involved in the 2-way communication session. In this example, identification of an intermediary (publisher) 1154 is provided, as well as identification of the provider 1156.

Intervention Window

In a further embodiment of the application, a contact link 1182 is provided and published in conjunction with a given online notice 920 as shown in FIG. 11E. The contact link 1182, when selected (activated) by a user 830, causes an intervention window 1190 to be displayed as shown in FIG. 11F when a provider proxy 820 is available to engage in a 2-way communication session with a user 830. The intervention window 1190 may incorporate one or more links for initiating one or more various types of communication sessions with an available, provider proxy 820. In the example depicted in FIG. 11F, the intervention window 1190 includes links 1191, 1192 and 1193. The link 1191 may be configured to allow a user 830 to initiate, for example, a telephone call to the provider proxy 830. Link 1192 may be configured to allow a user 830 to initiate, for example, a 2-way instant messaging (IM) session with the provider proxy 820. Similarly, link 1193 may be configured to allow a user 830 to initiate, for example, a callback from the provider proxy 830. In one embodiment, the intervention window 1190 only appears if a provider proxy is currently available to respond to a user inquiry.

In some examples, only those links 1191-1193 corresponding to communications methods that are currently available to the provider proxy 820 at a given time are included (displayed) in the intervention window 1190. For example, if the provider proxy is not able to receive telephone calls but only instant messaging messages, then only link 1192, corresponding to instant messaging, would be included and displayed as a part of intervention window 1190. In alternate embodiment, where the contact link 1182 is selected by a user 830 at a time when a provider proxy 820 is not available, the intervention window 1190 may be configured to provide, for example, an e-mail form that will allow a user to send a message to the provider for response at a time when the provider is available.

Provider Availability

Availability may be based on definite factors, such as the provider's hours of operation or whether or not there are any provider proxies in the proxies pool 950 (FIG. 9C) are logged into the DRCS 805. If, for example, the provider is closed after 6:00 PM, the system may be configured to cause publishing of the presence indicator with the notices of the provider to be stopped. Alternatively, the system may be configured to stop displaying the provider's notice in its entirety at times outside of the provider's normal hours of operation.

Provider availability may be based on one or more factors. In general, a provider or provider proxy is available if they are able to engage in 2-way communications sessions initiated by users. Typically a provider is represented by one or more persons. In the context of the present application, a provider proxy pool 950 (FIG. 9C) is comprised of one or more persons associated with a provider who are logged onto the DRCS 805 via, for example, a MCD.

Some real-time factors that DRCS 805 may monitor include, for example, the current time of day; whether or not a provider proxy is logged into the system; how many provider proxies are logged into the system; how many logged-in provider proxies are currently engaged in communication with a user; the specific type of Message Capable Device (MCD) that the proxies have logged into the DRCS 805 with.

Merely being logged into the system for having a proxy logged into the system) may satisfy the criteria for "availability." However, during any period of time, most providers will be engaged with activities other than waiting for a user to request a 2-way communication session. Because of this it is possible that when a user does request a 2-way communication session, the logged-on provider/proxy will not actually be able to respond at the given time because they are tied up with other matters. In view of this, it is beneficial to obtain a more accurate assessment of whether or not a provider proxy will actually be able to respond to a request for a 2-way communication at a given time.

One way to more accurately assess the providers' "availability" is by monitoring factors other than just whether or not the provider is logged-in. For example, factors such as whether or not a provider proxy is, at the time, currently engaged in another 2-way communication session or not (and thus busy). Additional factors may also be considered, including, but not limited to whether or not the provider is within close proximity of a MCD that is logged on to the system and capable of receiving requests for 2-way communication sessions. Proximity or motion sensors may be used to monitor the proximity near a given logged in MCD. The output of these proximity or motion sensors may provide another factor that can be taken into consideration in determining whether or not a proxy is able to respond (or not) and thus, whether or not the provider is available.

Further factors that may be considered include, but are not limited to: the number of provider proxies within the pool of provider proxies (the more proxies there are, the more likely one will be available at any given time); the time of day (if it is after business hours, it is less likely that even an apparently logged-in proxy will be available to respond, as well as the duration of time that has elapsed since the last interaction with a given MCD. It is also not uncommon for people to leave the proximity of a MCD without logging out of the system); the day of the week; the provider hours of operation, or other suitable factors.

TABLE 1 generally describes one method of determining the availability status of a provider. In this table, two factors are used to determine the "availability" of a provider: 1) whether or not provider proxies are logged-in (online) and 2) whether or not the provider proxies are busy with other matters, at a given time. Whether or not a proxy is busy may be determined by monitoring any one or more of the factors discussed above.

TABLE 1

Determination Of Availability
Provider Proxy Pool

| TIME | REP 1 Online? | Not Busy? | REP 2 Online? | Not Busy? | REP 3 Online? | Not Busy? | AVAILABILITY STATUS |
|---|---|---|---|---|---|---|---|
| 0 | NO | — | NO | — | NO | — | Unavailable |
| 1 | YES | YES | NO | — | NO | — | Available |
| 2 | YES | NO | NO | — | NO | — | Unavailable |
| 3 | YES | YES | YES | YES | NO | — | Available |
| 4 | NO | — | NO | — | YES | YES | Available |
| 5 | NO | — | NO | — | NO | — | Unavailable |

It can be seen that any time at which one or more provider proxies are determined to be logged-in and not busy, the provider is deemed to be available. For greater assurances that a proxy will actually be able to respond promptly, other criteria may also be adopted. For example, in order to be deemed available, it may be necessary for there to be predetermined minimum number of proxies within the pool who are both logged in and not busy. Alternatively, a predetermined minimum percentage of the provider proxy pool may be required in order for the provider to be deemed available.

In one implementation, the history of each provider proxy in receiving and responding to requests for 2-way communications may be taken into account as a factor for purposes of determining availability. Where a proxy has a history of successfully accepting requests for 2-way communications, it may be assumed that when that proxy is logged in they will likely be able to respond, thus making the provider more likely to be "available." Conversely, where the history of provider proxies does not show a pattern of success in accepting requests for 2-way communications, it is perhaps more likely that the provider should be deemed "unavailable" when one or more of those proxies are a part of the provider proxy pool.

In a further embodiment of the application, availability is established based upon whether or not the probability of provider being successful in accepting, and engaging in a real-time 2-way communications session is above or below some predetermined threshold. The system and method determines availability by establishing the likelihood that a proxy of a provider would actually be able to receive and engage in a 2-way communication session, such as a text message exchange, with a user. This may be determined, based on various factors, including, but not limited to, for example, the number of provider proxies within a pool of provider proxies, the number of proxies actually logged-in at a given time, the number of logged-in provider proxies who are currently on the telephone; the number of other simultaneous inquiries that proxies within the pool are engaged in at the time, or other suitable factors. If the likelihood that a proxy from the pool would be able to respond is above a predetermined availability threshold, the system will cause, for example, the "presence indicator" to be published in the notice or allow the notice to be published or included in search results at a given time. The threshold value may be varied based upon provider or publisher preferences. Fees associated with publication of notices may be raised or lowered based upon the established availability threshold. In this way, the chances the provider will be able to respond to a user are greatly increased. Where the provider desires greater certainty with respect to their ability to respond to user inquires, the publisher may generate greater notice revenues by charging higher lees for notice. The flowchart of FIG. 11D generally describes this embodiment of the application.

Figure 11D:
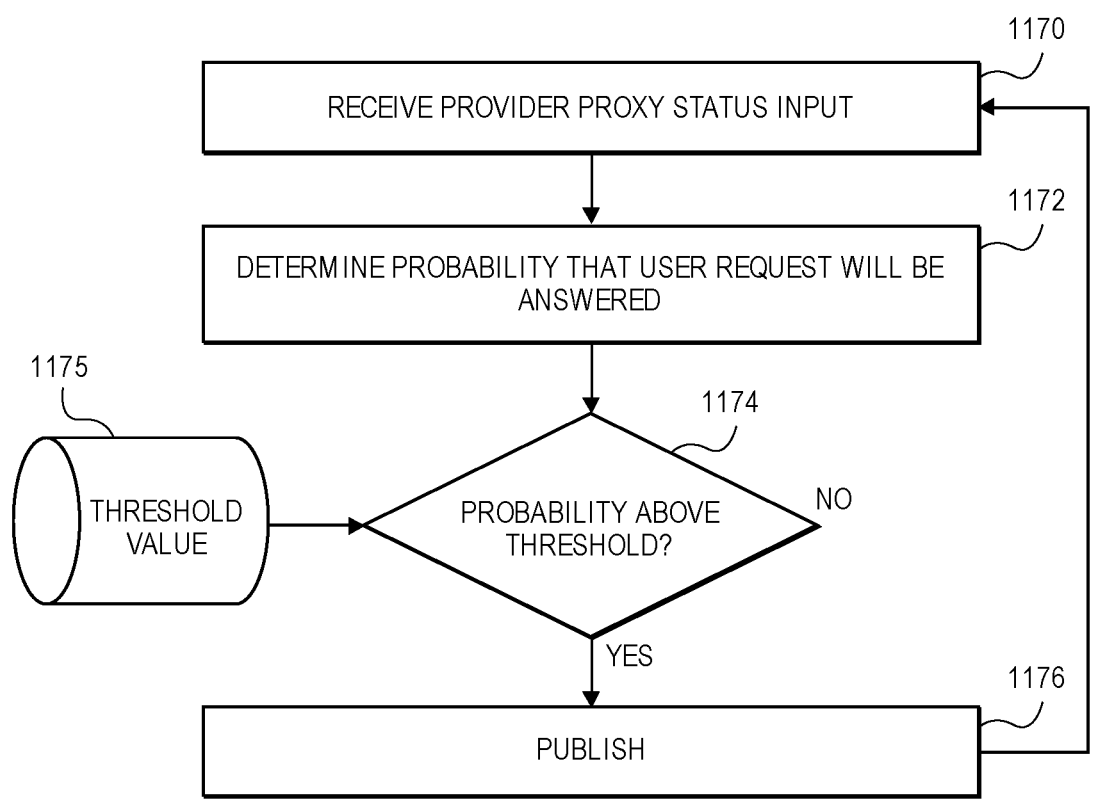
Figure 11F:
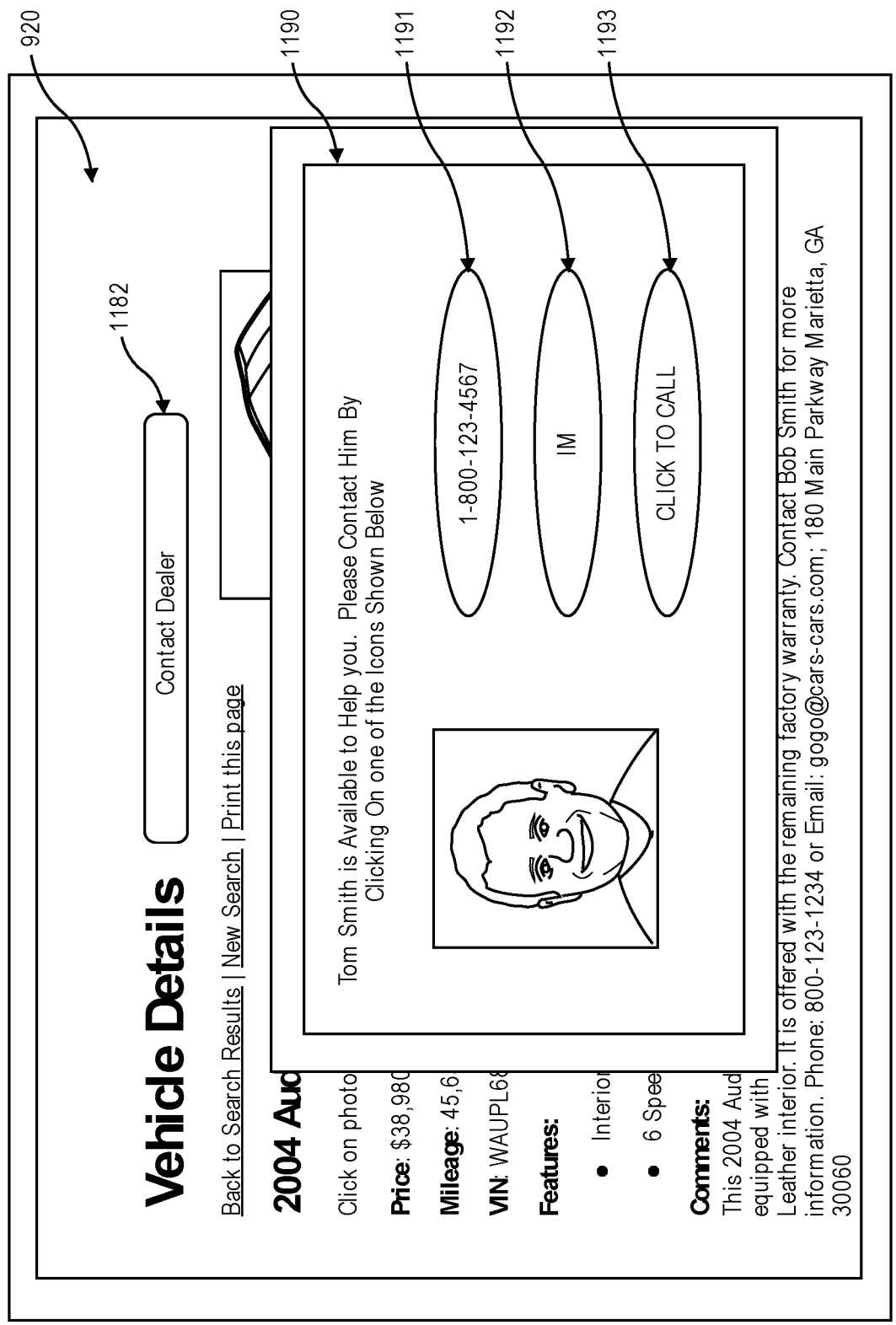

With reference to FIG. 11D, the status of monitored factors pertaining to a provider/provider proxy is received (1170). Based upon the received information, the probability that the provider could actually respond to a user request at the given time is determined (1172). The probability is compared with a predetermined threshold value 1175 (1174). If the probability meets or exceeds the threshold value, then publication of the provider's notices may be carried out at the time or included as a part of search results for specific user search queries (1176).

Presence Optimized Publishing

A further aspect of the application takes into account the availability of a provider to actually receive and respond to user inquiries when generating and providing results relevant to a user inquiry at a given time. In short the -presence/availability of a provider can be used to optimize the timing and placement when publishing notices.

The system can accommodate either or both selection-based or opportunity-based item notice publication. With selection-based systems, the system allows notices to be served/published based upon, for example, the listed amount and/or select-through-rate. For example, in this way the system allows for maximizing returns for the intermediary/search provider/publisher.

With opportunity-based systems, an intermediary, such as a publisher, is paid by a provider for every opportunity that results from a notice that the provider places with the publisher. To qualify as an opportunity, at least the identity of a person or entity potentially interested in obtaining an item or service should typically be obtained by the provider as a result of the notice. Other information may also be required, such as mailing address, telephone number, or other information.

In the context of opportunity-based systems, the present system allows for return optimization by factoring in the "availability" of a provider to actually answer or otherwise respond to an online inquiry from a user, since an unanswered call from a user is generally not an opportunity that can be allocated by the intermediary/publisher. In one embodiment, the system continuously monitors the status of certain real time factors related to the provider and publishes an indication of the provider's "availability" (whether or not the provider is actually available or otherwise likely to respond to an inquiry from a user). This has been previously discussed above with respect to Table 1.

Systems and methods described herein allow for a presence optimized paid search (POPS) to be conducted online by a user in a manner that increases the chances that a provider can turn an inquiry from the user into a valid opportunity or actual exchange of a published item. For example, when a provider is available, notices for that provider may be included in a list of results and/or sorted toward the top of the list of the results. Otherwise, when the provider is not available, notices for that provider may be left out of a list of results, and/or sorted toward the top of the list of the results since the provider will not be able to respond to the user inquires at the time. This methodology is generally described by the flowchart of FIG. 12A.

Figure 12A:
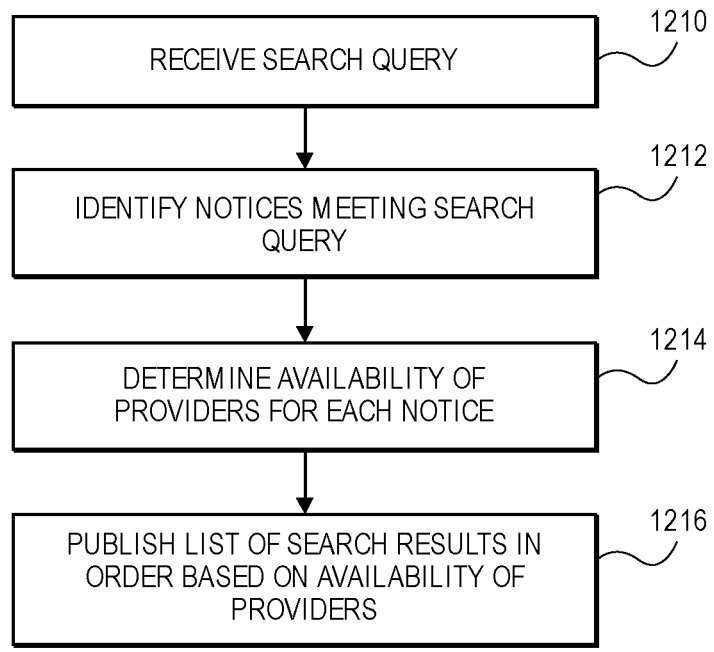
FIG. 12A-FIG. 12C are diagrams depicting a process for publishing a notice or presence indicator based upon the availability of a provider.

With reference to FIG. 12A, an inquiry is received (1210). Notices meeting an inquiry are identified (1212). A determination of the availability of the providers for each notice is made (1214). A list of results to the inquiry is then published based upon the availability of providers (1216). In one embodiment, those providers who are not available will not have their notices listed in the published results. In another embodiment, those providers are available will have their notices presented higher in the published results than those providers that are not available.

Figure 12B:
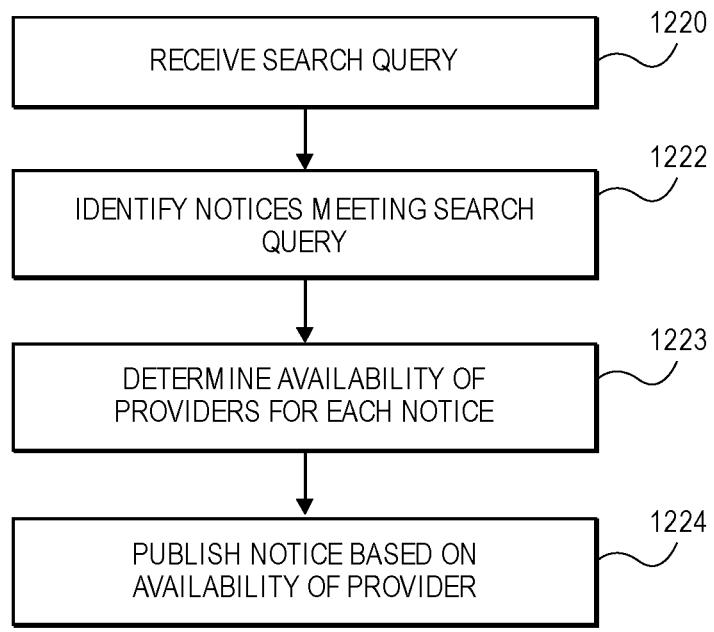

A further aspect of the application takes into account the availability of a provider to receive and respond to user inquiries in determining whether or not a notice will be served/published at a particular time. FIG. 12B is a flowchart depicting a further embodiment of the methodology of the present application. Notices meeting an inquiry are identified (1222). A determination of the availability of the provider at a given time is made (1224). The notice may then be published based upon the availability of providers (1216). In one embodiment, where the provider is determined to not be available, their notices will not be published at that time.

POPS enables search providers to optimize notice serving (publication) and placement by taking the provider's "availability" to respond to an online inquiry into account in determining when and/or where to serve/publish a notice. In short, where it is not useful for providers to have notices published when the providers are not available to respond in real time to inquiries, it may be desirable not to have the provider notices published. This avoids unnecessary notice fees for the provider, and increases the value of the notice service.

Where a provider (or provider proxy) is available to actually respond to an inquiry, the probability of the user receiving a prompt response is greatly increased. For the publisher, the inquiry initiated by the user, as well as the response from the provider to the user, are track-able and may be treated as billable events for purposes of determining rates for notices. Further, each of these events may be recorded as documentation of the occurrence of the event.

In the case were the system determines that a provider is "not available" to respond to a user, the system may cause a providers notice to simply not be served/published by the intermediary until it is determined that the provider is available. Alternatively, where the system determines that the provider is not available, the provider notice may be served/published on line, however without any presence indicator being published in connection with the notice. In this way, users viewing the notice will not be encouraged to attempt to obtain additional information at times when the provider cannot respond or the likelihood of the provider responding is low.

Figure 12C:
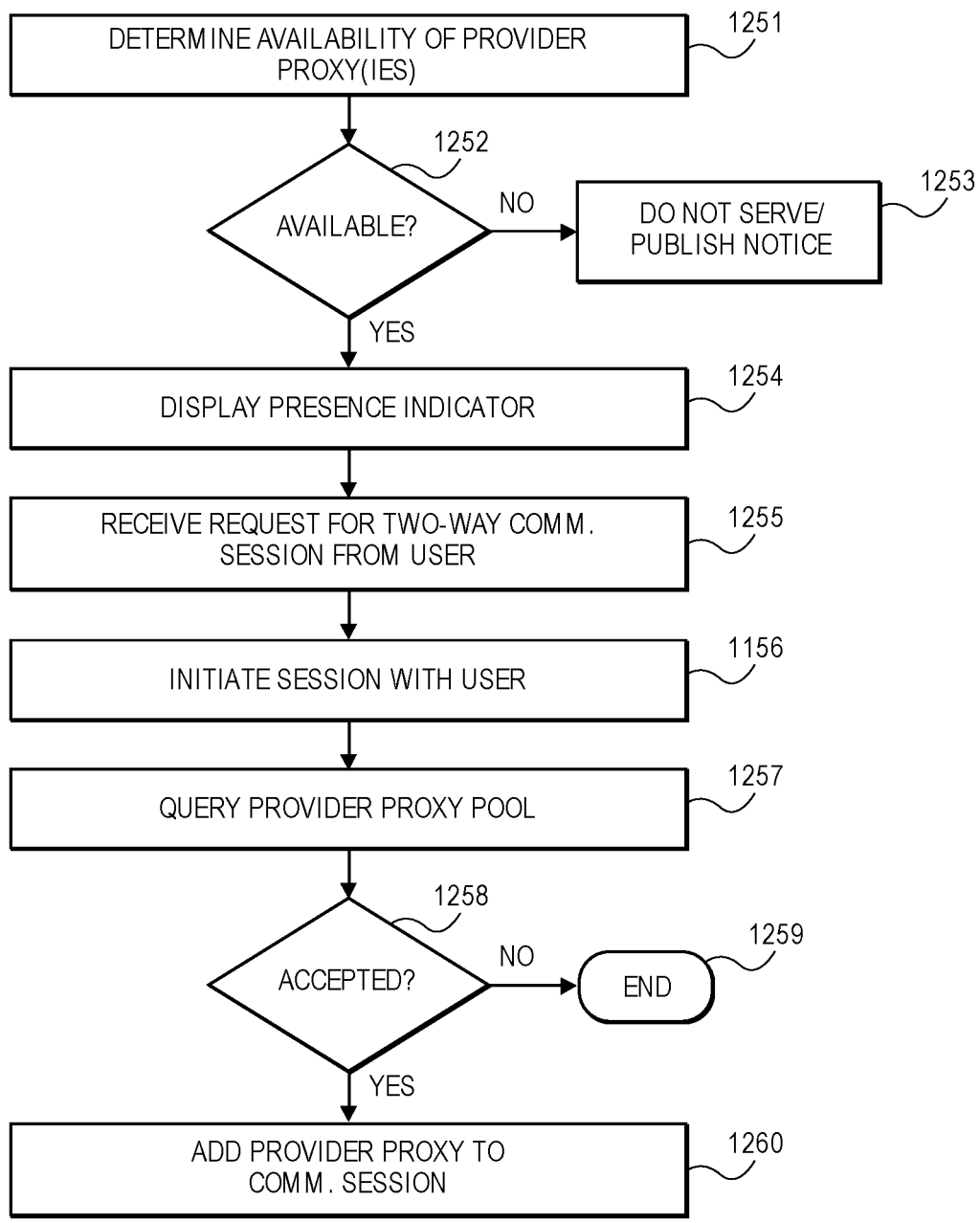

FIG. 12C is a diagram showing a flowchart that generally describes an embodiment of the present application. In the embodiment, a notice and presence indicator is published/served at a given time only if it is determined that the provider (as represented by available provider proxies) is available to respond and engage in real time 2-way communications. In this embodiment, a determination is made as to the availability of provider proxies (1251). If the provider is not available, notices associated with the provider will not be published at a given time (1253). Alternatively, no presence indicator will be displayed in connection with a provider notice or the notice will not be included in search results. Where the provider is available, a presence indicator will be displayed in conjunction with a provider notice (1254), which can allow demand-based messaging. Where a request for a 2-way real-time communication session is requested (1255) (as a result of the activation of a displayed presence indicator), a session will be initiated with the user (1256). The provider proxy pool will be queried (1257). When the inquiry is accepted (1258), the accepting provider proxy will be added, via an MCD associated with the proxy, to the open session with the user. If the proxy pool does not respond, the session with the user may be closed (1259).

Developing/Substantiating Opportunities

An opportunity is far more likely to result when a provider actually responds to an inquiry from a user. Further, certain information must be obtained by the provider in order to qualify a potential opportunity. In order to increase the chances that each user inquiry will yield an actual opportunity, the system may be configured to seek certain information from the user. In one embodiment, the system and method may provide for collecting information from a user before alerting a provider of a user inquiry stemming from a provider notice. Information collected from the user may be recorded. In this way, it is possible to further distinguish actual opportunity from false or fraudulent selections.

This information can also be information necessary to qualify a user contact as an opportunity or lead, such as, for example, a name and contact information. In order to establish opportunities, the application attempts to collect information from a user who has requested a 2-way communication session.

Before bringing a provider proxy into the session, a pop-up window or fly-in is generated and displayed on, for example, a user's MCD. This window can set out a questionnaire-like form with blanks for the user to fill in with particular requested information. This methodology is generally represented by the flowcharts of FIG. 13A-FIG. 13C.

Figure 13A:
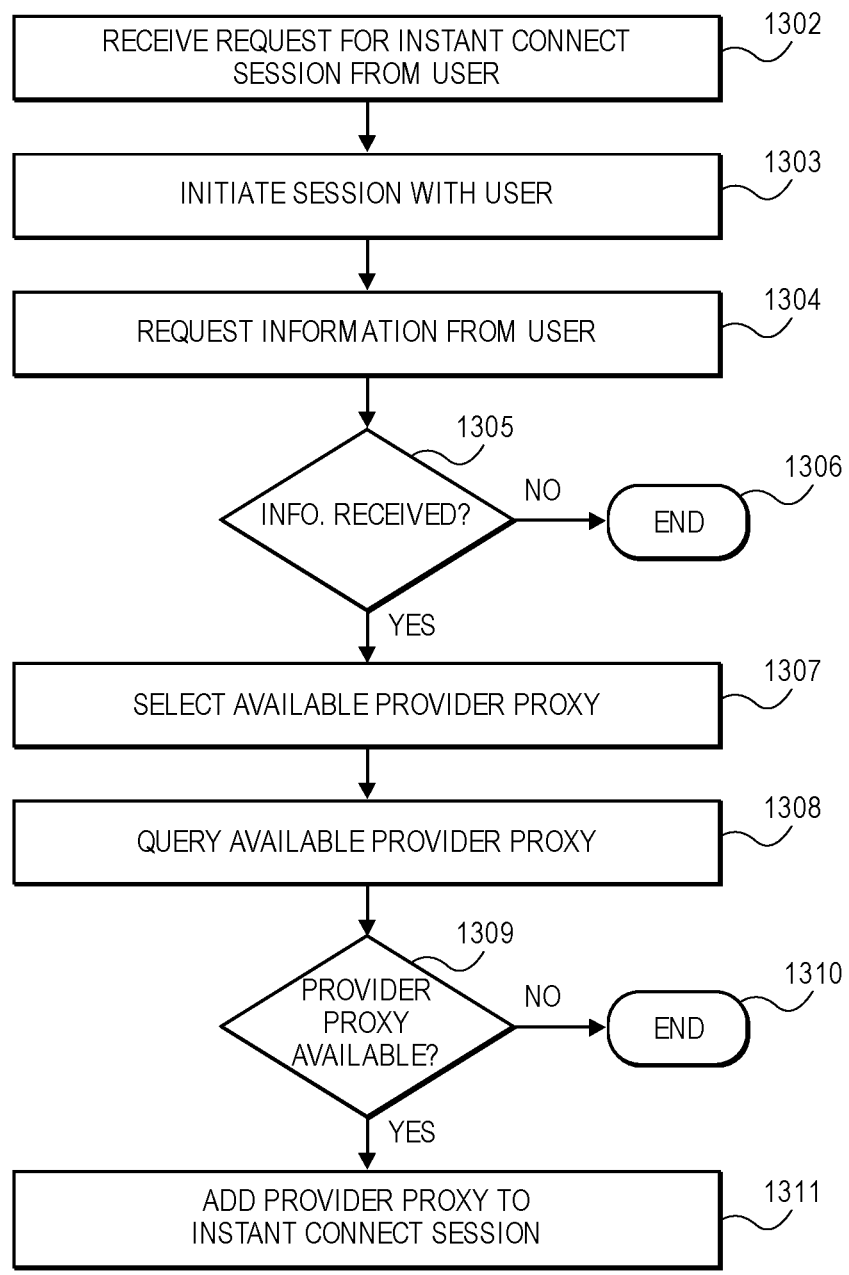
FIG. 13A-FIG. 13C are diagrams depicting a process for qualifying and substantiating opportunities.

With reference to FIG. 13A, a request for a 2-way communication session is received (1302). A communication session is initiated with the user (1303), via opening a questionnaire window to seek information from a user (1304). When the information is received (1305) from the user, the system selects a provider proxy from a pool of provider proxies (1307) and queries the selected proxy to join communication session (1308). If the proxy is available, the system adds the proxy to the communication session (1311). Otherwise the session may be terminated (1310).

Figure 13B:
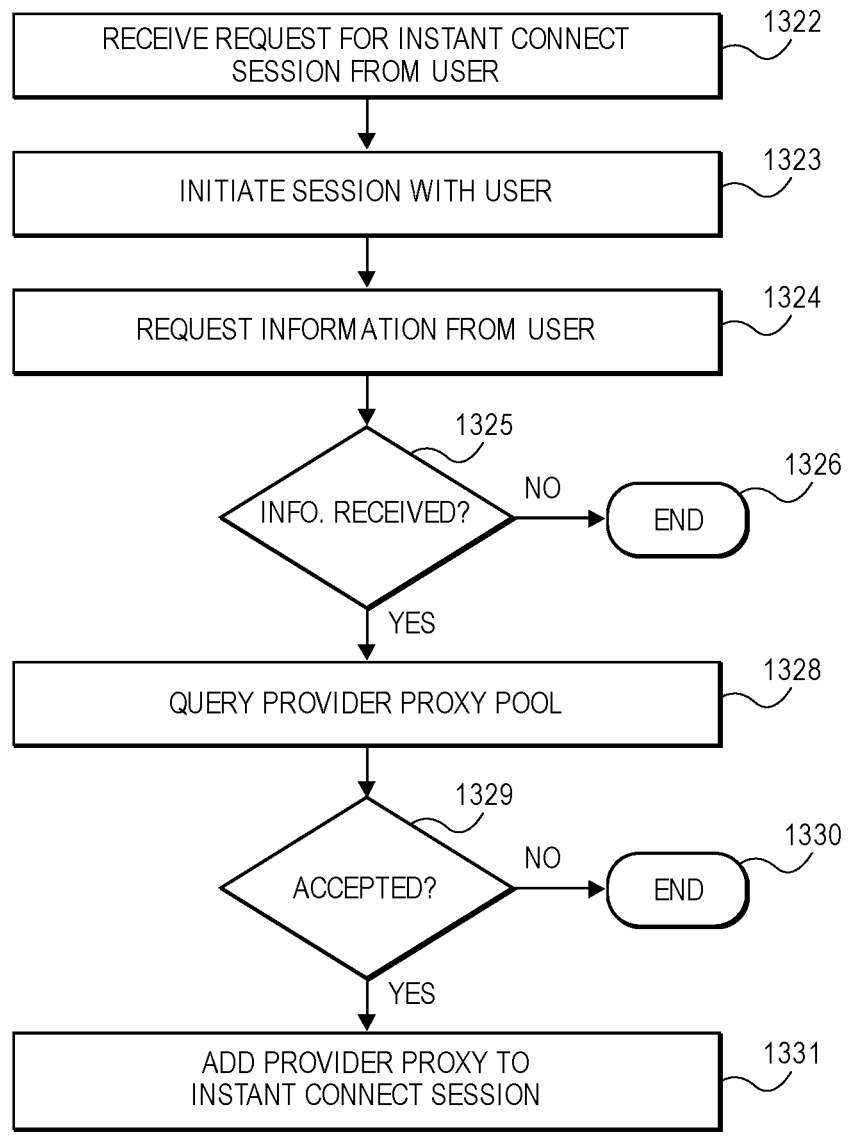

FIG. 13B shows a flowchart generally depicting an embodiment wherein the status of proxies within the provider proxy pool is monitored and when a user request is received, the alert is sent to a provider proxy who is determined to be available. A request from a user is received (1322). A session is initiated with the user (1323). Information is requested from the user, for example, name and contact information (1324). A provider proxy determined to be available is selected (1327) and an inquiry is sent to the selected proxy (1328) via an MCD associated with the selected proxy. If the inquiry/request is accepted by the selected proxy (1329), the selected provider proxy is added to the session with the user (1331).

Figure 13C:
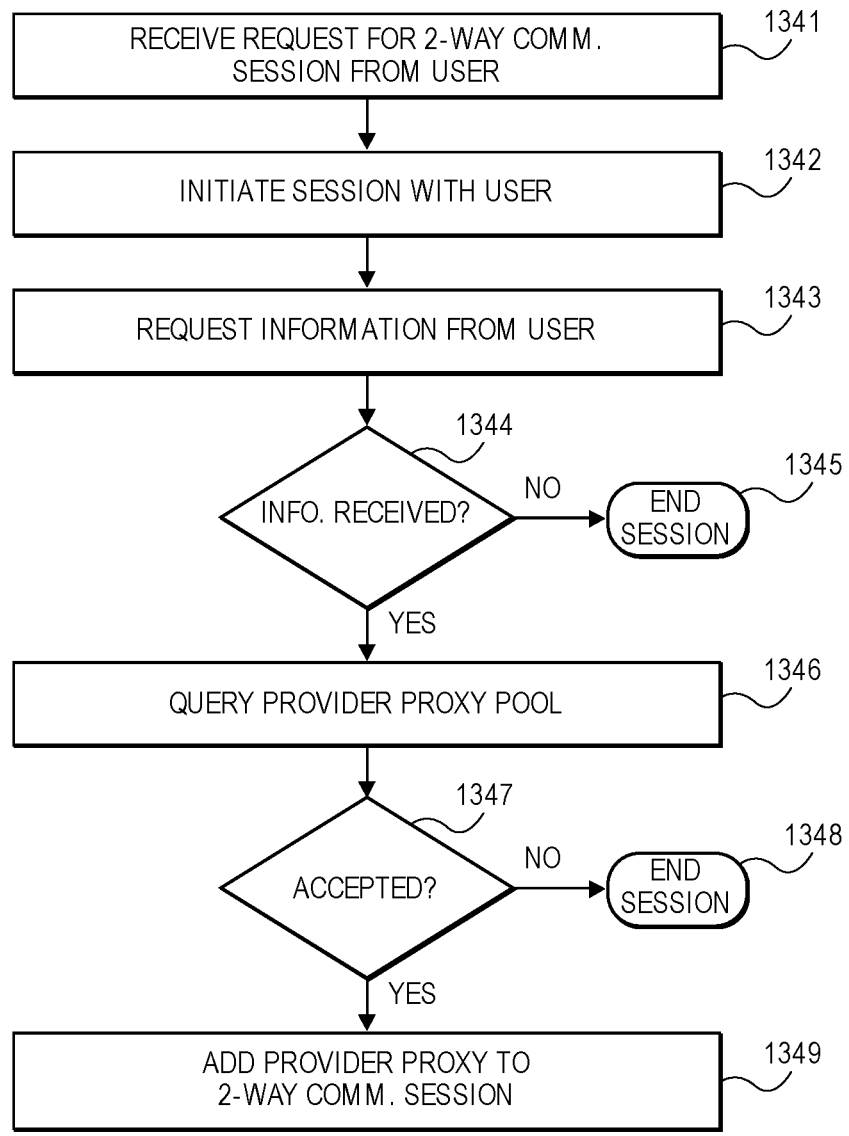

FIG. 13C shows a flowchart, generally depicting an embodiment wherein the status of proxies within the provider proxy pool is monitored and when a user request is received, the pool is queried. The request is then handed to the provider proxy that is first to accept the inquiry/request and the proxy is added to a session with a requesting user. A request from a user is received (1341). A session is initiated with the user (1342). Information is requested from the user, for example, name and contact information (1343). The proxy pool is queried (1346). Once the inquiry/request is accepted by a proxy (1347), the provider proxy is added to the session with the user (1349).

In another embodiment when a user request is received, an alert/request is then sent to each member of the provider proxy pool in sequential order until a provider proxy accepts the inquiry/request. Once a provider proxy accepts the inquiry/request they are added to a session with a requesting user, Tracking and Reporting In yet a further embodiment, a system and method is provided to track certain predetermined events relative to a selection originating from a given notice, result listing or presence indicator. These tracked events may be used to provide a record related to each notice and can be used to substantiate the authenticity of, for example, a particular selection (or click-through). In one embodiment, when a presence indicator is selected, the fact that it is activated or selected is noted and recorded. Subsequently, if a 2-way communication with a provider proxy is consummated, such event is also noted and recorded. Further, the content of any 2-way communication between the user and a provider proxy may be recorded. By having these types of track-able events recorded, it is much easier to discern those selections that are genuine, or otherwise rise to the level of an actual "opportunity" from those that are fraudulent or otherwise bogus.

The system is further configured to generate and provide reports of all track-able information, as well as statistics and usage information based upon the track-able events and collected user information.

The processor 851 may be further configured to carry out any one or more of the functions carried out by the communication module 891, the availability module 882, the publishing module 883, the tracking module 884 and/or the reporting module 885 in accordance with, for example, software 858 stored in memory 856. The software 858 may include, for example, one or more applications, configured to carry out various processes or process steps according to the methodology depicted by the flowcharts of FIGS. 9B, 10, 11A, 11D, 12A, 12B, 12C, 13A, 13B and/or 13C.

In one embodiment, the DRCS 805 is configured to facilitate demand-based messaging. The DRCS 805 is configured to receive status data concerning a pool of provider proxies and to determine whether such status data indicates that it is likely that a provider proxy will be able to accept and engage in a 2-way real time communication with a user if they should initiate a request for a 2-way real time communication. In a further embodiment the DRCS 805 is configured to provide an indicator of a provider's availability to a publisher of online notices and/or an online search provider. In another embodiment, the DRCS 805 is configured to receive a request for a 2-way communication session and to provide an alert/inquiry to a provider proxy pool. If the alert/inquiry is accepted by a proxy within the pool, the DRCS 805 is configured to add the provider proxy to a 2-way communication session.

The DRCS 805 may be configured to request data from, for example, a provider 820, a user 830 and/or an intermediary 810. Similarly, the DRCS 805 may be configured to receive data and/or queries from, for example, a user 830. The DRCS 805 can be implemented in hardware, software, firmware, or a combination thereof. In one embodiment(s), the DRCS 805 is implemented in software or firmware that is stored in a memory and that is executed by a suitable instruction execution system. If implemented in hardware, as in an alternative embodiment, the DRCS 805 can be implemented with any one or a combination of the following technologies, which are all well known in the art: a discrete logic circuit(s) having logic gates for implementing logic functions upon data signals; an application specific integrated; circuit having appropriate logic gates; a programmable gate array(s) (PGA); a fully programmable gate array (FPGA); or other suitable technology.

Tracked Call Alert with Text Invitations

In a further embodiment of the application, an alert is presented to a provider proxy upon receipt of a telephone call from a user calling from a mobile telephone. The alert may include notification that the telephone number provided by the user is a mobile number. In one embodiment, the alert will include an option for the provider proxy to initiate a text-based communication session with that user. In one embodiment, the option to initiate a text-based communication will be pre-configured with "opt in" messaging text to ensure compliance with applicable regulations and industry best practices for proactive text based communications.

The alert is conditionally sent at beginning of a telephone call placed on the Public Switched Telephone Network (PSTN). First a telephone call is initiated to a telephone number provided by a call tracking vendor. The call is intended for a provider. The call tracking vendor issues an electronic notification ("post back") to the System indicating that a telephone call has been initiated to the provider. This electronic notification includes such information as the calling telephone number and the called telephone number. Such post backs are widely available from many commercially available Call Tracking services.

The System determines the Provider by looking up the "called number" from the post back. The System evaluates the "calling number" to determine if it is a mobile phone number. That evaluation may be done using commercially available services that identify phone types based on the telephone number. The System determines if Provider Proxies are available. If Provider Proxies are available then the alert is sent. The alert will thus be received at approximately the same time as the Provider Proxies' telephone begins to ring signaling a phone call has been placed.

In one embodiment, the alert contains pre-defined text messages that the Provider Proxies may send to the user that request consent of the user to further text-based communications between the provider/provider proxy and the user specifically to include the user's mobile phone supporting SMS and/or MMS messaging. Such opt in messages will ensure compliance with applicable law concerning pro-active text based communication between providers and users.

Text to Long Code Context

In a further embodiment of the application, an alert is presented to the provider proxy upon receipt of a SMS text message from a user initiating a text conversation from an online notice. The SMS text was sent by the user selecting a link in a published notice from a mobile phone with a micro-browser; that link directly launched the SMS client on the mobile phone. In one embodiment, the alert will include contextual information about the user including information such as user name, selection path, selection location, and details of the notice from which the user selected.

The System supports this presentation of user context, in cases when such context would otherwise be unavailable. The System may provide this context via a "context matching" algorithm. When the SMS link is selected in the mobile notice, the online notice may send an electronic notification, or "post back," to the System that includes the provider identifier, search context, details of the notice including the SMS "to" number of the Provider and then launch the SMS client on the mobile phone. Then when the user composes the SMS text message and sends a message to the "to" number of the Provider, that contextual information may be matched to the SMS and presented in the alert window.

SMS Text Follow Up

In a further embodiment of the application, an alert is presented to the provider proxy upon conclusion of a real time, 2-way communication session with a user in which the user disclosed a mobile telephone number. The alert may include notification that the telephone number provided by the user is a mobile number. In one embodiment, the alert will include an option for the provider proxy to initiate a text-based communication session with that user. In one embodiment, the option to initiate a text-based communication will be pre-configured with "opt in" messaging text to ensure compliance with applicable regulations and industry best practices for proactive text based communications.

The alert is conditionally sent at the conclusion of a 2-way communication session. First the messages sent from the user in the 2-way communication are analyzed, with pattern matching technology, to determine if a telephone number was provided. If a phone number is detected, that number is evaluated to determine if it is a mobile phone number. That evaluation may be done using commercially available services that identify phone types based on the telephone number. Thus an alert is only sent in those cases in which the user disclosed a mobile phone number in the 2-way communication session.

In one embodiment, the alert contains pre-defined text messages to be sent to the user that request permission of the user to consent to further text-based communications between the provider/provider proxy and the user. Such opt in messages will ensure compliance with applicable law concerning pro-active text based communication between providers and users.

Tracked Call Alert with SMS Invitation

Figure 14A:
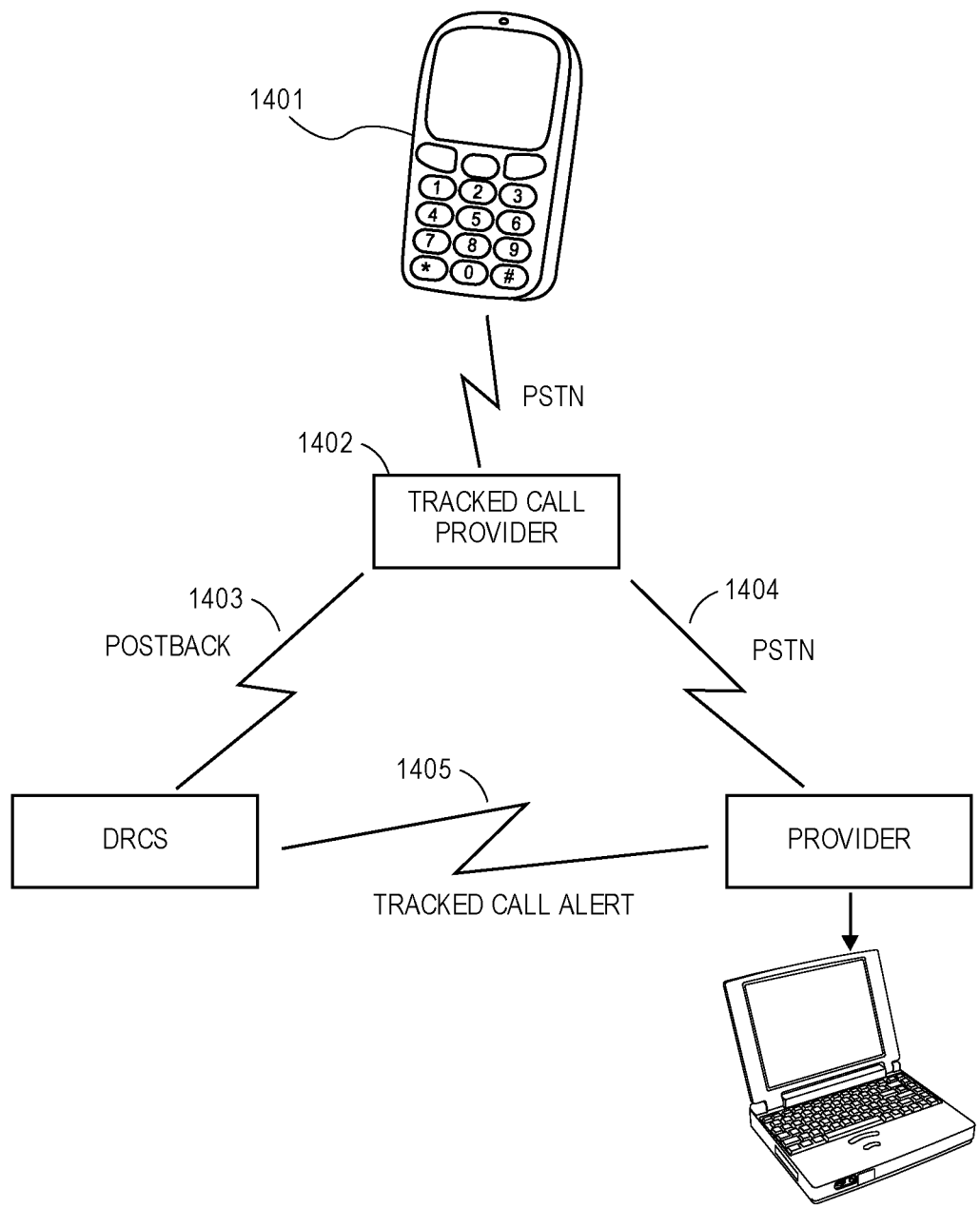
FIG. 14A-FIG. 14C are diagrams depicting tracked call alert with SMS invitation.

FIG. 14A illustrates how the DRCS may provide relevant context, in the form of an alert window 14A05 to a provider proxy 14A06 receiving a telephone call from a user 14A01 placed over the Public Switched Telephone Network (PSTN) to a Tracked Call Provider 14A02. The Tracked Call Provider issues an electronic notification, or postback, to the DRCS with telephone call information including the calling number and the called number SA03. The Tracked Call Provider completes the telephone call to the Provider 14A04. The DRCS sends an alert window to the Provider Proxy 14A05.

Figure 14B:
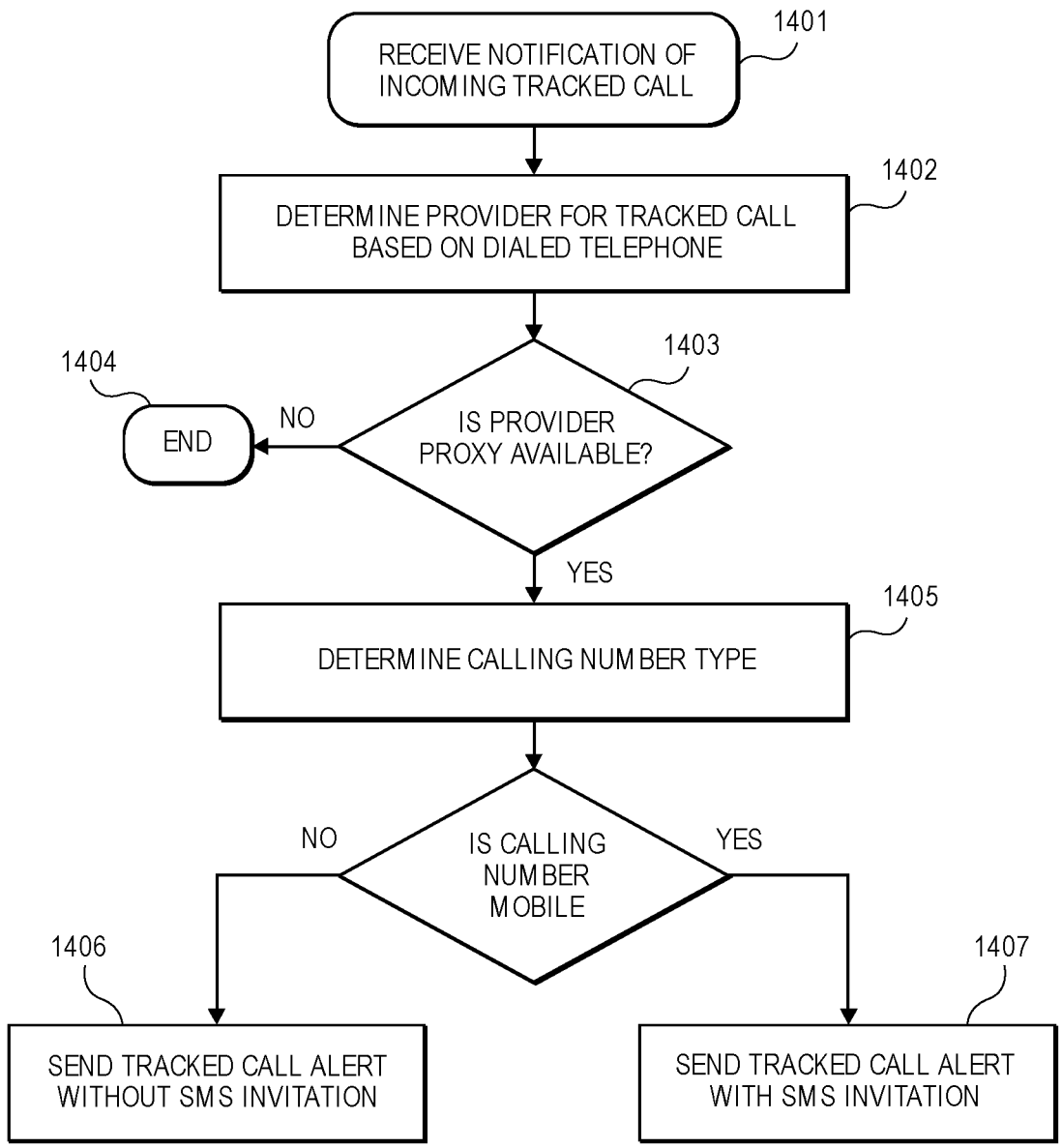

FIG. 14B is a diagram showing a flowchart that generally descries an embodiment of the present application. In the embodiment, a user has placed a telephone call to a "tracked number," widely available from many commercial tracked number providers. The tracked call provider submits an electronic notification, or "post back," 14B01 to the DRCS at the outset of the telephone call that includes such contextual information as the user's telephone number and the dialed telephone number of the provider. In this embodiment, the dialed number is evaluated 14B02 to determine the provider to which the user phone call is routed. The System determines if provider proxies are available 14B03. When the evaluation determines that provider proxies are available the process continues 14B05. When the evaluation determines that no provider proxies are available, the process ends 14B04. The user's phone number is evaluated 14B05 with commercially available information services that provide information about a given phone number including specifically if the phone number is a mobile phone number. When the evaluation determines the user's phone number is not a mobile phone number and thus not likely capable of receiving SMS or MINIS messages, the tracked call alert 14B06 that does not include an SMS or MINIS invitation option is sent to the provider proxy. When the evaluation determines the user's phone number is a mobile phone number and thus likely capable of receiving SMS or MINIS messages, the tracked call alert 14B07 that includes an SMS or MMS invitation option is sent to the provider proxy.

Figure 14C:
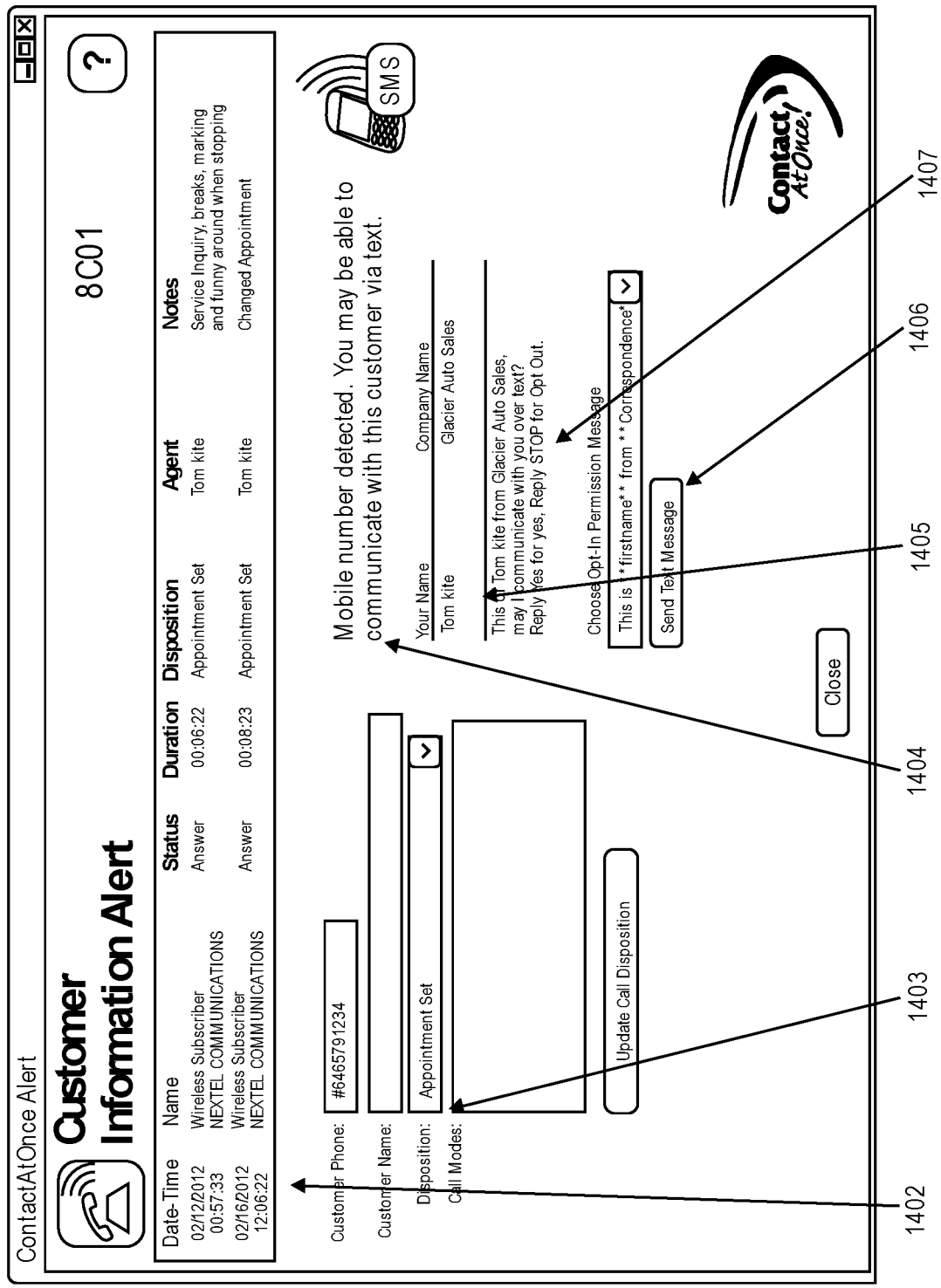

FIG. 14C is a diagram showing further details of the Tracked Call alert window 14C01. In one implementation, the alert window 14C01 includes a call history section 14C02, a user identification section 14C03, an indicator that the calling number is mobile phone number 14C04, prepopulated request to consent to text based communications section 14C05, a prepopulated section for the provider proxy to identify himself in the request to consent 14C06 and a method 14C07 for the provider proxy to submit to the user an SMS or MINIS request to consent to text based communications.

Text to Long Code Context

Figure 15A:
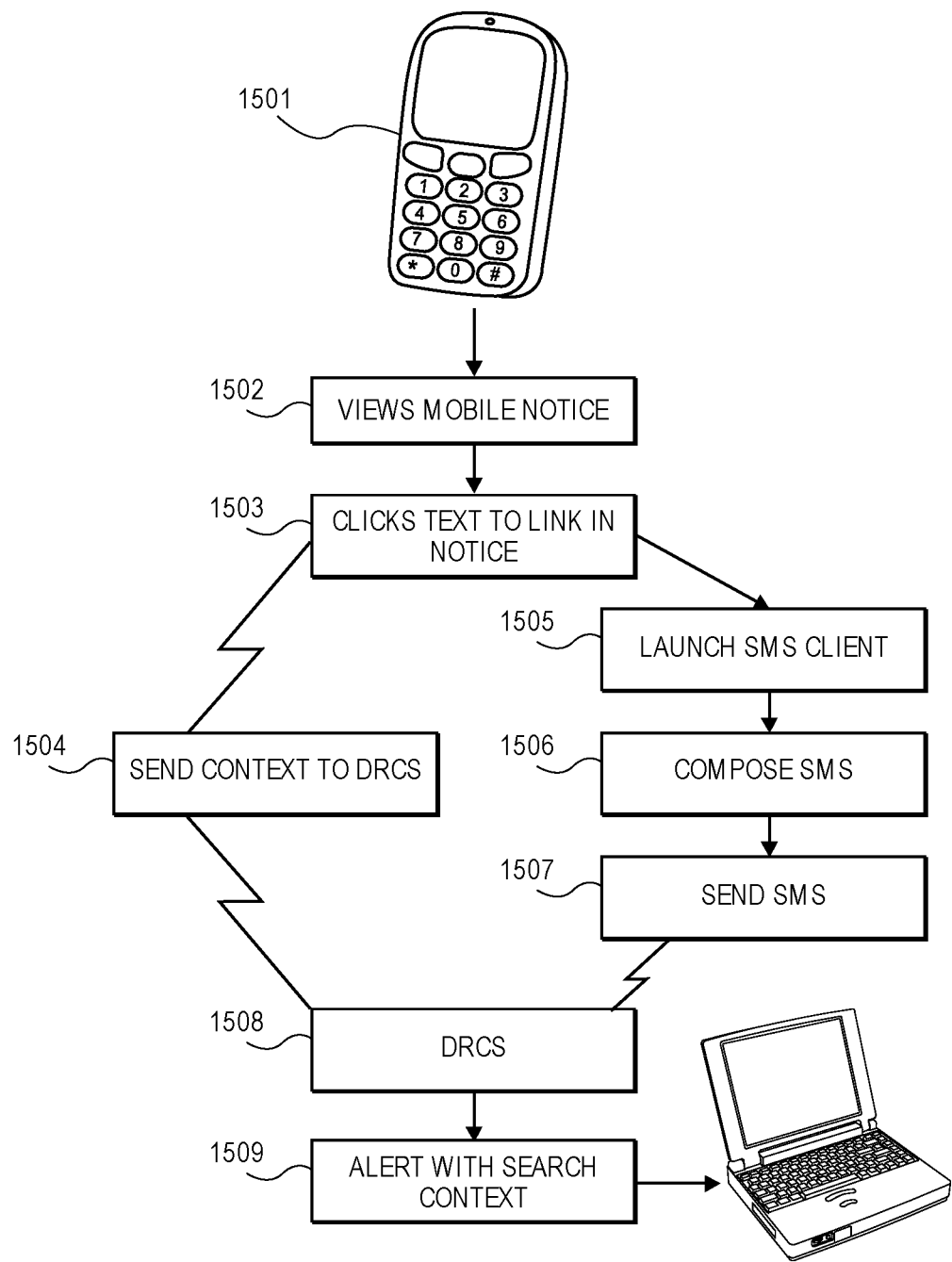
FIG. 15A-FIG. 15C are diagrams depicting text to long code context.

FIG. 15A illustrates how the DRCS may provide user search context 15A09 to a provider proxy conducting a real-time 2-way communication session with a user using a mobile phone 15A01 as the Message Capable Device. The user initiated the 2-way communication session by viewing a notice 15A02 optimized for viewing on a mobile device and selecting a link to "Text with the Provider" 15A03 in the notice. Upon selection of the "Text with the Provider," the notice is configured to send an electronic notification with the user's search context 15A04 to the DRCS and to start the mobile device's SMS/MMS client 15A05. The SMS/MMS client may be prepopulated with information such as the "SMS to" number and an initial text message. The user composes a SMS/MMS message 15A06 and sends the SMS to the DRCS 15A07. The DRCS receives the user SMS/MMS message 15A08 and sends the user message along with the search context as an alert 15A09 to the provider proxy.

Figure 15B:
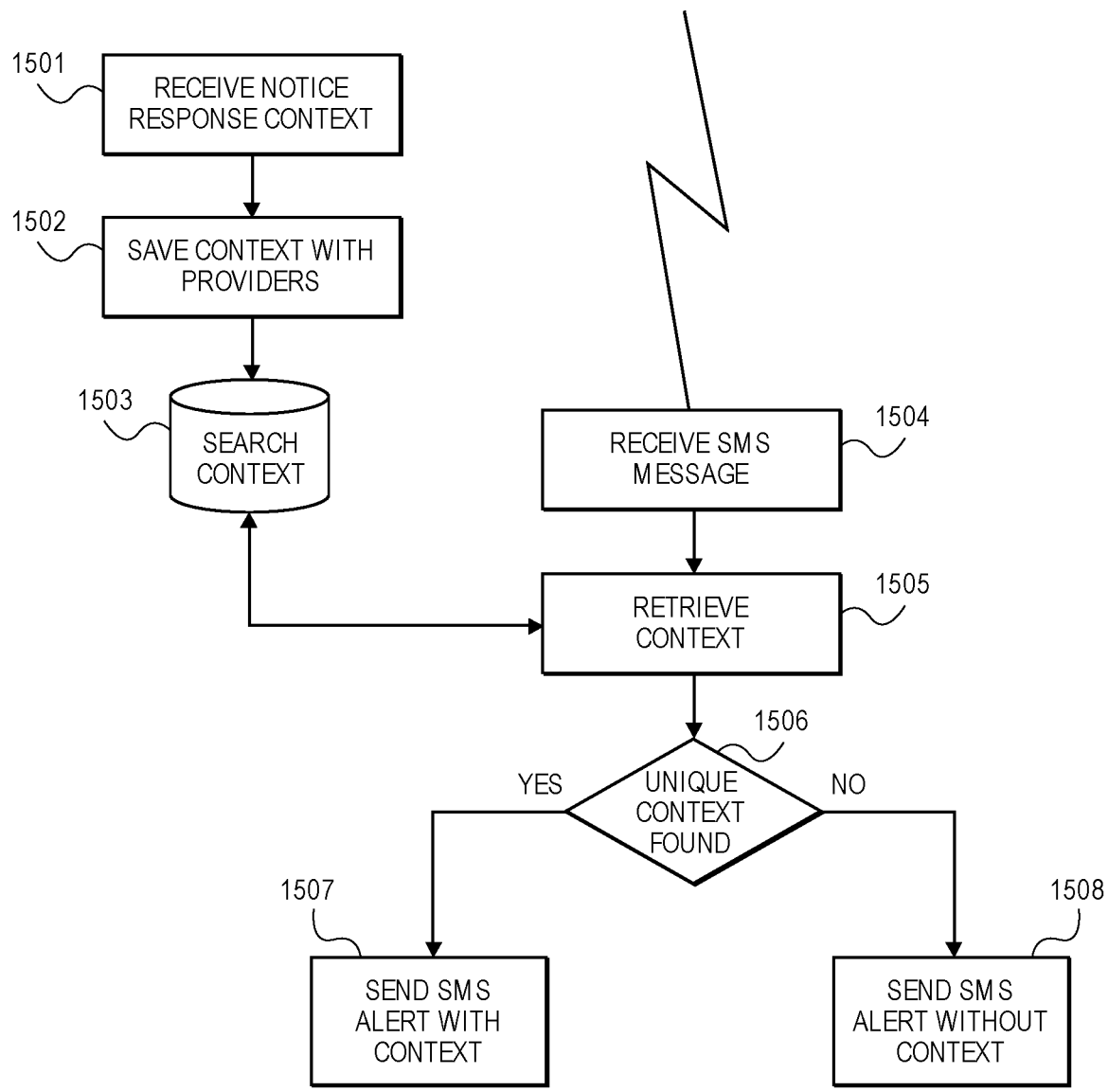

FIG. 15B is a diagram showing a flowchart that generally describes an embodiment of the present application. In the embodiment, a user has initiated a real-time 2-way communication session by selecting a "text to provider" link in a notice optimized for presentation on a mobile device. The notice is configured to send search context to the DRCS when the user selects the "text to provider" link. DRCS receives this search context 15B01, in the form of an electronic notification. The search context may include information such as the notice identification, provider identification, search terms used, time on site, opportunity quality score, notices viewed and other relevant contextual information that may be valuable to the provider. DRCS saves this search context 15B02 in a Search Context data store 15B03. Subsequent to this, the user sends a SMS/MMS message to the Provider and that message is received by DRCS 15B04. DRCS searches 15B05 the Search Context data store for recent search context for that provider and provider site. When unique context is found in the Search Context data store for this user and notice, an alert with the user's search context 15B07 is sent to the provider proxy pool enabling the provider proxies to respond to the user inquiry. When no unique context is found in the Search Context data store for this user and notice, an alert that does not include the user's search context 15B08 is sent to the provider proxy pool.

Figure 15C:
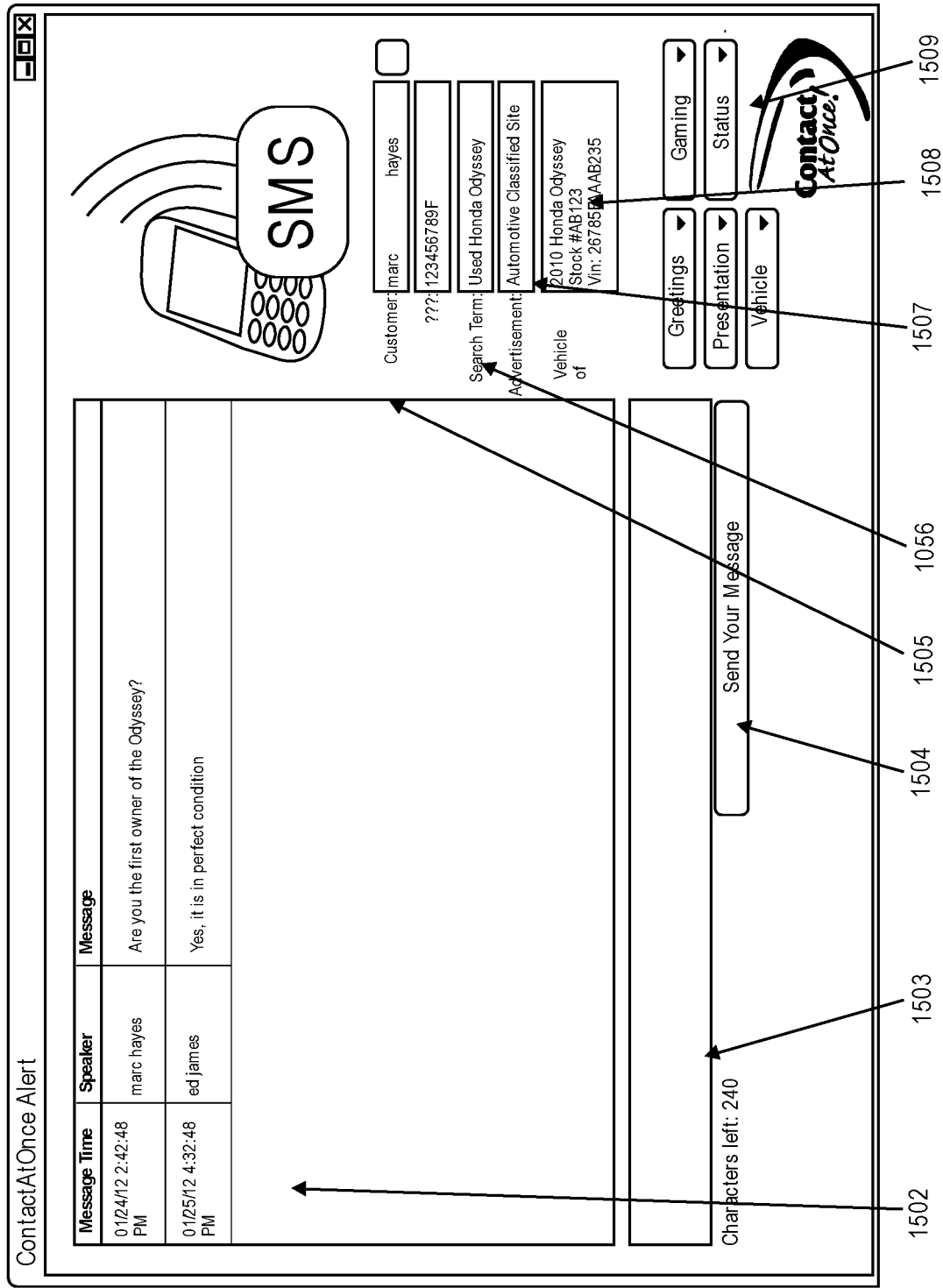

FIG. 15C is a diagram showing further details of an alert window with user search context 15C01. In one implementation, the alert window 15C01 includes a text history section 15C02, a message composition section 15C03, method 15C04 for the provider proxy to submit to the user an SMS or MMS response, a user identification section 15C05, a user search terms section 15C06, a notice id section 15C07, a notice context section 15C08 and predefined responses to assist the provider proxy composing a response 15C09.

Text Follow Up Alert

Figure 16A:
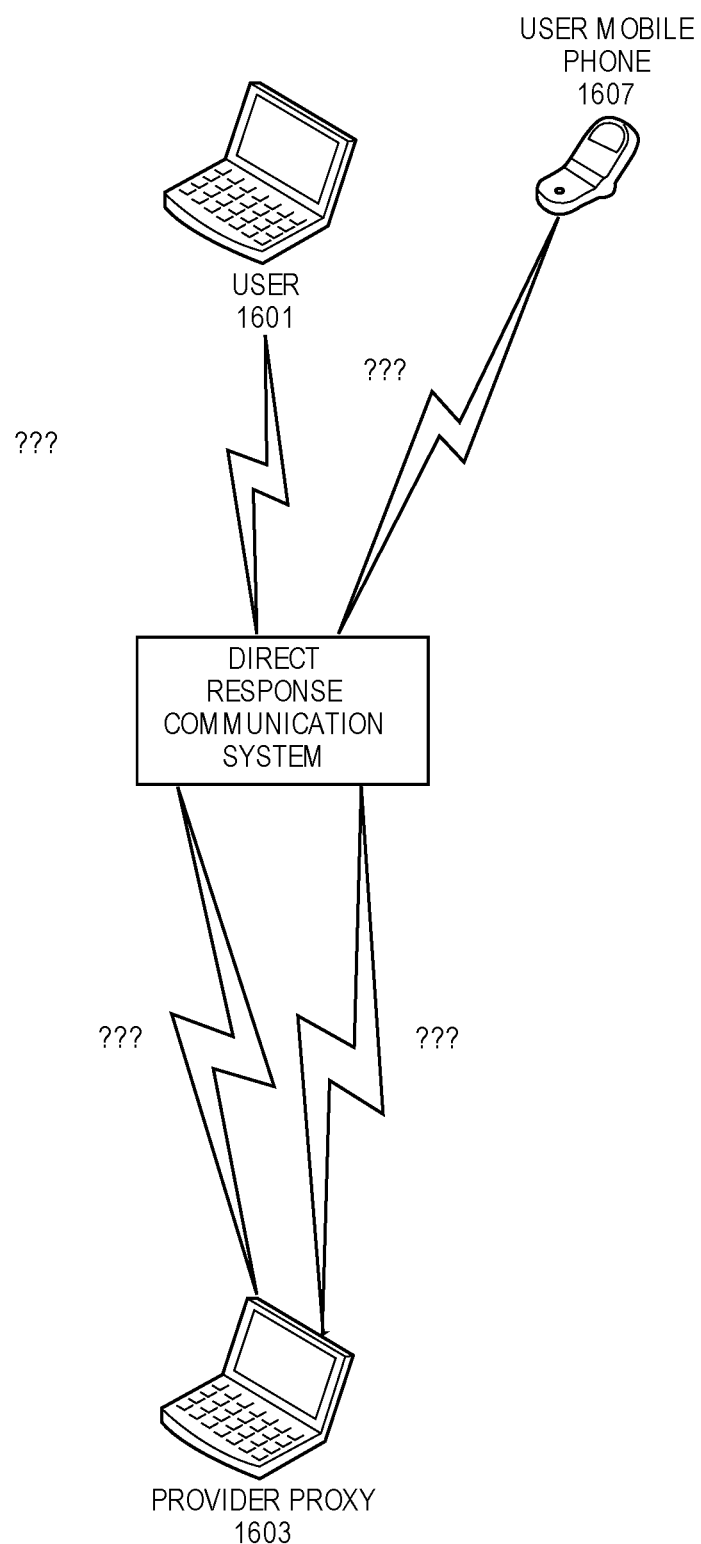
FIG. 16A-16C are diagrams depicting text follow up alert.

FIG. 16A illustrates how the DRCS may be connected with a user 16A01 conducting a real time, 2-way communication session, such as an instant messaging session 16A02 with a provider proxy 16A03. The DRCS may send an alert 16A04 to the provider proxy at the conclusion of the instant messaging session indicating that a telephone number communicated by the user in the instant messaging session is a mobile telephone number. The provider proxy may respond to the alert by initiating an opt-in consent message 16A05 to the DRCS which is forwarded as an SMS or MIMS message 16A06 to the user's mobile phone 16A07.

Figure 16B:
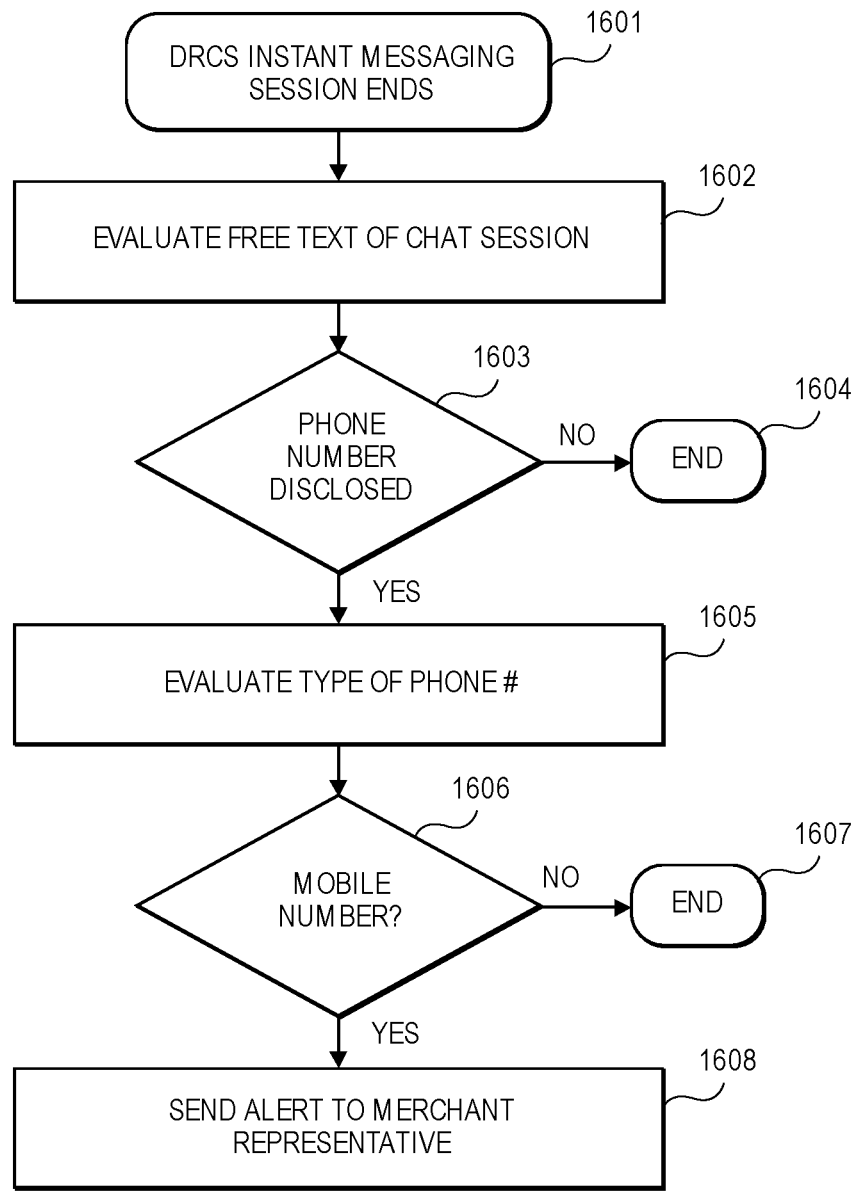

FIG. 16B is a diagram showing a flowchart that generally describes an embodiment of the present application. In the embodiment, a user and a provider proxy have conducted and concluded 16B01 real-time 2-way communication session. In this embodiment, the text content of messages sent by the user in the real-time two-way communication session is evaluated 16B02, using pattern recognition techniques, to determine if the user disclosed a telephone number. When the evaluation determines that a phone number was disclosed, the process continues 16B03. When the evaluation determines that no phone number was disclosed, the process ends 16B04. When a phone number is detected, the type of phone number is evaluated 16B05. The type of phone number is evaluated with commercially available information services that provide information about a given phone including specifically if the phone number is a mobile phone number. When the evaluation determines that disclosed phone number is not a mobile telephone number and thus likely not capable of receipt of SMS or MMS messages, the process ends 16B07. When the evaluation determines that disclosed phone number is a mobile telephone number and thus likely capable of receipt of SMS or MMS messages, an alert is sent to the provider proxy 16B08.

Figure 16C:
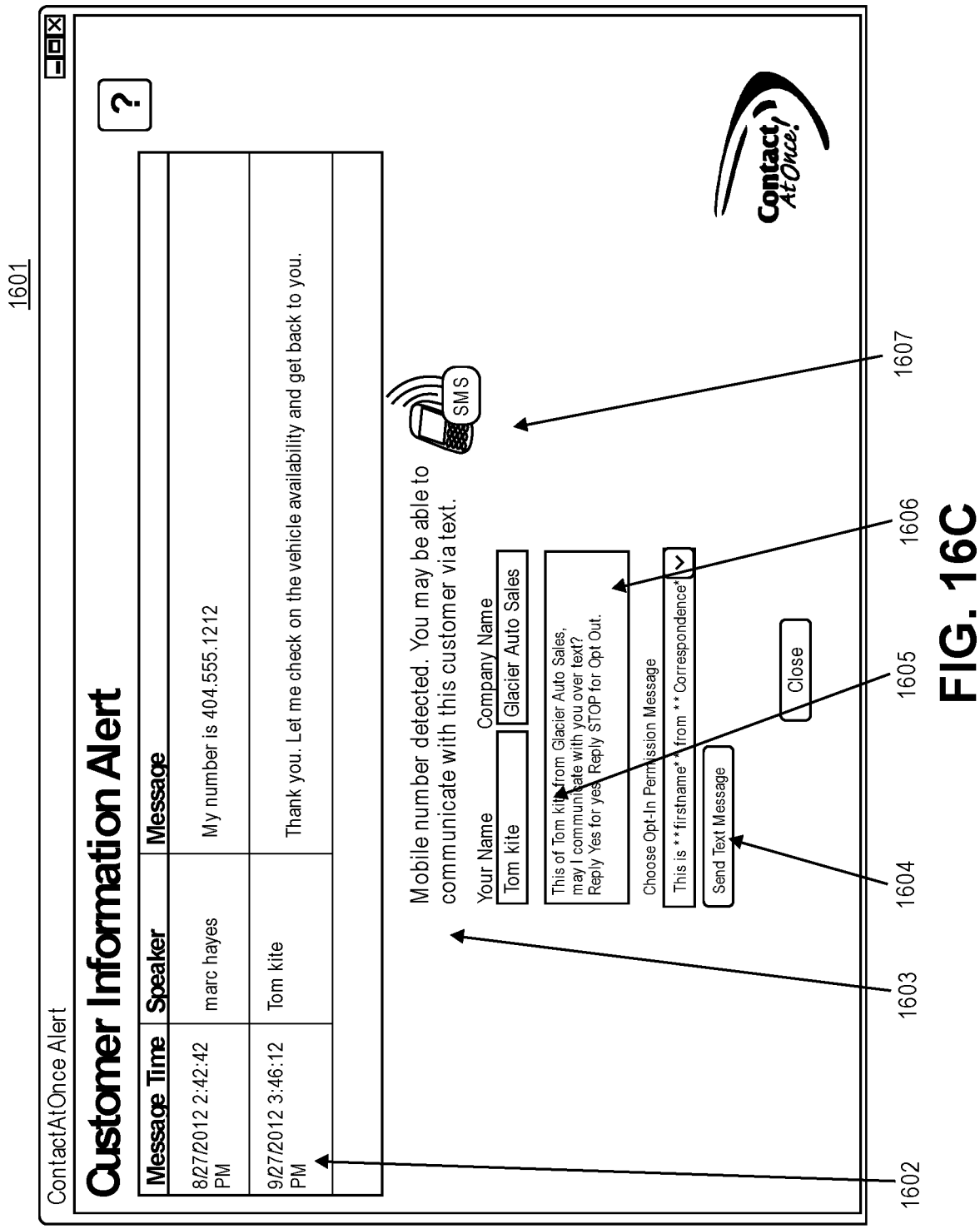

FIG. 16C is a diagram showing further details of the Text Follow Up alert window 16C01. In one implementation, the alert window 16C01 includes a transcript of the real-time 2-way communication session in which the user disclosed a mobile telephone number 16C02, a text notice that a mobile telephone number was detected 16C03, and a method for the provider proxy to submit to the user an SMS or MMS request to consent to text based communications on the user's mobile phone 16C04, a prepopulated section with the provider proxies name 16C05, a prepopulated request to consent to text based communications section 16C06, and a graphic notification that the user disclosed a mobile telephone number 16C07.

The flow charts of FIGS. 9B, 10, 11A, 11D, 12A, 12B, 12C, 13A, 13B, 13C, 14B, 15A, 15B and/or 16B show the architecture, functionality, and operation of possible implementations of the software 858 (FIG. 8C). In this regard, each block represents a module, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in. the reverse order, depending upon the functionality involved. The software program stored as software 858, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It will be recognized by those skilled in the art, that while certain aspects of the application have been described in terms of hardware, it is possible and fully anticipated that such. aspects can be implemented in software, and vice-a-versa. All such variations or implementations are fully contemplated by the present application and are intended to full within the scope of the application.

It should be emphasized that the above-described embodiments of the present application, particularly, any embodiments, are merely possible examples of implementations, merely set forth for a clear understanding of the principles of the application. Many variations and modifications may be made to the above-described embodiment(s) of the application without departing substantially from the spirit, principles and scope of the application. As used herein, a notice may also be referred to herein as an advertisement. A provider may also be referred to herein as a merchant or an advertiser, and an agent or provider proxy may be referred to herein as a merchant representative or provider representative. A user may also be referred to herein as a consumer. An opportunity may also be referred to as a lead or a sales lead. An item may also be referred to herein as a product or a good. As used herein, publication of an item or a notice can indicate that the item or notice is published online. In some examples, a selection-based system is also known as a pay-per-selection or pay-per-click system, and an opportunity-based system is also known as a pay-per-lead system. In some examples, a select-through-rate is also known as a click-through-rate. In some instances, results may also be known as search results based on a user's inquiry. An inquiry may also be referred to as a search or a query performed using a search engine or other technique.

All such modifications and variations are fully intended to be included herein within. the scope of the present application and protected by the following claims.

What is claimed is:

1. A computer-implemented method comprising:
facilitating a two-way communication session between an agent device and a user computing device;
automatically analyzing one or more messages exchanged during the two-way communication session, wherein analyzing is performed using pattern recognition;
automatically detecting a telephone number from the one or more messages exchanged during the two-way communication session, wherein detecting is performed using the pattern recognition;
dynamically determining whether the telephone number is a mobile telephone number; and
automatically facilitating an agent initiated text communication between the agent device and the user computing device when the telephone number is determined to be the mobile telephone number, wherein automatically facilitating the agent initiated text communication includes generating a provider proxy interface associated with a provider proxy, the provider proxy interface including an indicator associated with determining that the telephone number is the mobile telephone number.

2. The computer-implemented method of claim 1, wherein determining whether the telephone number is the mobile telephone number further comprises:
transmitting the telephone number; and
receiving provided information about the telephone number indicating whether the telephone number is the mobile telephone number.

3. The computer-implemented method of claim 1, wherein determining whether the telephone number is the mobile telephone number further comprises:
transmitting a query including the telephone number, wherein when the query is received at an independent information service, the independent information service generates provided information about the telephone number indicating whether the telephone number is the mobile telephone number; and
receiving provided information about the telephone number.

4. The computer-implemented method of claim 1, wherein automatically facilitating the agent initiated text communication further comprises:
prepopulating a request to consent to the agent initiated text communication; and
transmitting the request to consent to the agent initiated text communication.

5. The computer-implemented method of claim 1, wherein automatically facilitating the agent initiated text communication further comprises:
prepopulating a provider proxy name associated with the agent initiated text communication; and
receiving consent to text based communications associated with the agent initiated text communication.

6. The computer-implemented method of claim 1, wherein the agent initiated text communication is a Multimedia Messaging Service (MMS) communication.

7. A system, comprising:
a memory; and
one or more processors coupled to the memory, the one or more processors configured to perform operations including:

facilitating a two-way communication session between an agent device and a user computing device;

automatically analyzing one or more messages exchanged during the two-way communication session, wherein analyzing is performed using pattern recognition;

automatically detecting a telephone number from the one or more messages exchanged during the two-way communication session, wherein detecting is performed using the pattern recognition;

dynamically determining whether the telephone number is a mobile telephone number; and automatically facilitating an agent initiated text communication between the agent device and the user computing device when the telephone number is determined to be the mobile telephone number, wherein automatically facilitating the agent initiated text communication includes generating a provider proxy interface associated with a provider proxy, the provider proxy interface including an indicator associated with determining that the telephone number is the mobile telephone number.

8. The system of claim 7, wherein determining whether the telephone number is the mobile telephone number further comprises:

transmitting the telephone number; and receiving provided information about the telephone number indicating whether the telephone number is the mobile telephone number.

9. The system of claim 7, wherein determining whether the telephone number is the mobile telephone number further comprises:

transmitting a query including the telephone number, wherein when the query is received at an independent information service, the independent information service generates provided information about the telephone number indicating whether the telephone number is the mobile telephone number; and receiving provided information about the telephone number.

10. The system of claim 7, wherein automatically facilitating the agent initiated text communication further comprises:

prepopulating a request to consent to the agent initiated text communication; and transmitting the request to consent to the agent initiated text communication.

11. The system of claim 7, wherein automatically facilitating the agent initiated text communication further comprises:

prepopulating a provider proxy name associated with the agent initiated text communication; and receiving consent to text based communications associated with the agent initiated text communication.

12. The system of claim 7, wherein the agent initiated text communication is a Multimedia Messaging Service (MMS) communication.

13. A non-transitory computer readable medium comprising instructions that, when executed by one or more processors of a device, cause the device to perform operations comprising:

facilitating a two-way communication session between an agent device and a user computing device;

automatically analyzing one or more messages exchanged during the two-way communication session, wherein analyzing is performed using pattern recognition;

automatically detecting a telephone number from the one or more messages exchanged during the two-way communication session, wherein detecting is performed using the pattern recognition;

dynamically determining whether the telephone number is a mobile telephone number; and automatically facilitating an agent initiated text communication between the agent device and the user computing device when the telephone number is determined to be the mobile telephone number, wherein automatically facilitating the agent initiated text communication includes generating a provider proxy interface associated with a provider proxy, the provider proxy interface including an indicator associated with determining that the telephone number is the mobile telephone number.

14. The non-transitory computer readable medium of claim 13, wherein determining Whether the telephone number is the mobile telephone number farther comprises:

transmitting the telephone number; and receiving provided information about the telephone number indicating whether the telephone number is the mobile telephone number.

15. The non-transitory computer readable medium of claim 13, wherein determining whether the telephone number is the mobile telephone number further comprises:

transmitting a query including the telephone number; wherein when the query is received at an independent information service, the independent information service generates provided information about the telephone number indicating if the telephone number is the mobile telephone number; and receiving provided information about the telephone number.

16. The non-transitory computer readable medium of claim 13, wherein automatically facilitating the agent initiated text communication further comprises:

prepopulating a request to consent to the agent initiated text communication; and transmitting the request to consent to the agent initiated text communication.

17. The non-transitory computer readable medium of claim 13, wherein automatically facilitating the agent initiated text communication further comprises:

prepopulating a provider proxy name associated with the agent initiated text communication; and receiving consent to text based communications associated with the agent initiated text communication.

18. The non-transitory computer readable medium of claim 13, wherein the agent initiated text communication is a Multimedia Messaging Service (MMS) communication.

* * * * *